(12) United States Patent
Toma et al.

(10) Patent No.: US 10,257,486 B2
(45) Date of Patent: *Apr. 9, 2019

(54) PLAYBACK METHOD ACCORDING TO FUNCTION OF PLAYBACK DEVICE

(71) Applicant: Panasonic Intellectual Property Management Co., Ltd., Osaka (JP)

(72) Inventors: Tadamasa Toma, Osaka (JP); Masayuki Kozuka, Osaka (JP); Hiroshi Yahata, Osaka (JP); Takahiro Nishi, Nara (JP); Kengo Terada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,190

(22) Filed: May 16, 2017

(65) Prior Publication Data

US 2017/0251190 A1  Aug. 31, 2017

Related U.S. Application Data

(63) Continuation of application No. 15/386,038, filed on Dec. 21, 2016, now Pat. No. 10,063,828, which is a
(Continued)

(30) Foreign Application Priority Data

Jun. 4, 2015 (JP) ................................. 2015-114328

(51) Int. Cl.
*H04N 21/431* (2011.01)
*G11B 20/10* (2006.01)
(Continued)

(52) U.S. Cl.
CPC ............. *H04N 9/8715* (2013.01); *G06F 3/14* (2013.01); *G11B 20/10* (2013.01); *H04N 7/015* (2013.01);
(Continued)

(58) Field of Classification Search
CPC ........................... H04N 11/002; H04N 9/8715
(Continued)

(56) References Cited

U.S. PATENT DOCUMENTS

2015/0245004 A1* 8/2015 Guo ......................... H04N 5/46
348/453

FOREIGN PATENT DOCUMENTS

JP   2008-167418   7/2008
WO  2012/147010   11/2012
WO  2013/046095   4/2013

OTHER PUBLICATIONS

International Search Report of PCT application No. PCT/JP2015/003050 dated Aug. 11, 2015.
(Continued)

*Primary Examiner* — Thai Q Tran
*Assistant Examiner* — Jose M Mesa
(74) *Attorney, Agent, or Firm* — Wenderoth, Lind & Ponack, L.L.P.

(57) ABSTRACT

A method to be performed by a playback device includes determining whether the playback device has a function for converting first graphics in a second luminance range narrower than a first luminance range to second graphics in the first luminance range, when the playback device has the function, converting the first graphics to the second graphics, and displaying a video in the first luminance range with the second graphics being superimposed on the video, and when the playback device does not have the function,
(Continued)

displaying the video with third graphics different from the second graphics being superimposed on the video.

5 Claims, 43 Drawing Sheets

Related U.S. Application Data continuation of application No. PCT/JP2015/003050, filed on Jun. 18, 2015.

(60) Provisional application No. 62/018,912, filed on Jun. 30, 2014.

(51) Int. Cl.
*H04N 9/87* (2006.01)
*G06F 3/14* (2006.01)
*H04N 7/015* (2006.01)
*H04N 11/24* (2006.01)
*H04N 7/01* (2006.01)
*H04N 9/64* (2006.01)

(52) U.S. Cl.
CPC ........... *H04N 7/0125* (2013.01); *H04N 9/642* (2013.01); *H04N 9/87* (2013.01); *H04N 11/002* (2013.01); *H04N 21/431* (2013.01)

(58) Field of Classification Search
USPC ........................................................ 386/200
See application file for complete search history.

(56) References Cited

OTHER PUBLICATIONS

Extended European Search Report dated May 5, 2017 in European Patent Application No. 15815800.6.

* cited by examiner

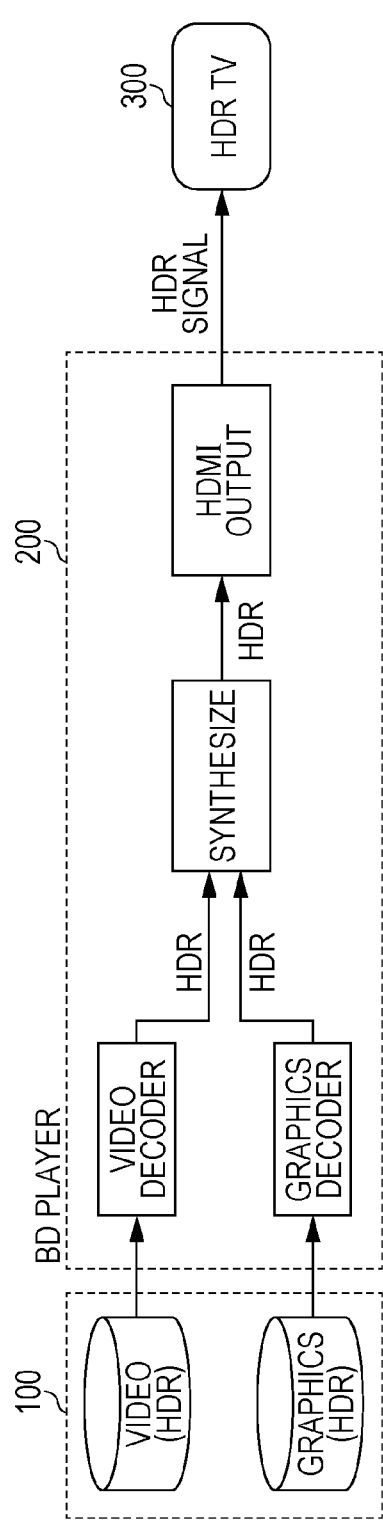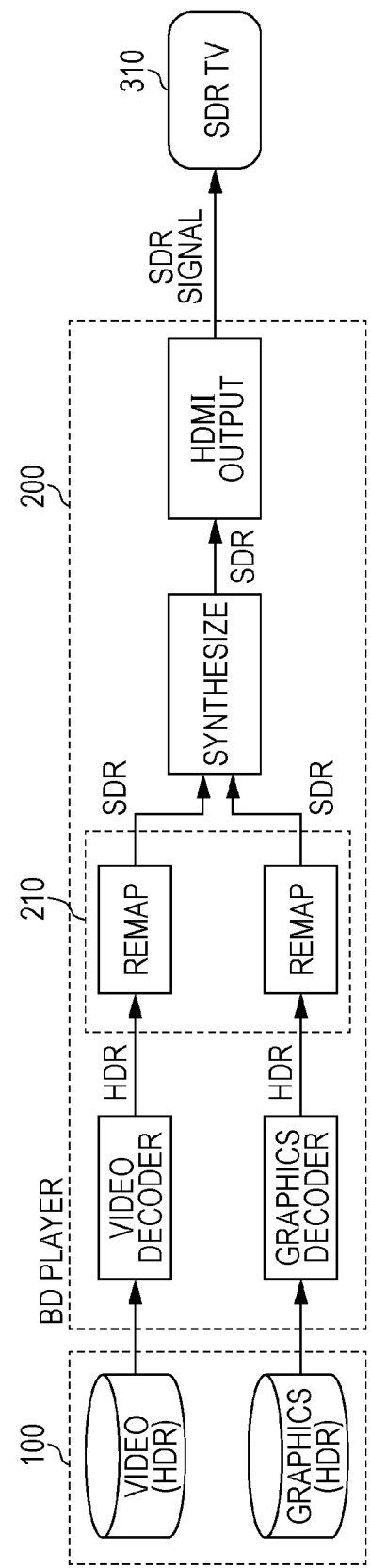

FIG. 8

|  |  | VIDEO MASTER | |
|---|---|---|---|
|  |  | HDR | SDR |
| GRAPHICS MASTER | SDR | ✓ | ✓ |
| | HDR | ✓ | ✓ |

FIG. 9

|  |  | VIDEO MASTER | |
|---|---|---|---|
|  |  | HDR | SDR |
| GRAPHICS MASTER | COMMON BETWEEN SDR AND HDR | ✓ | ✓ |

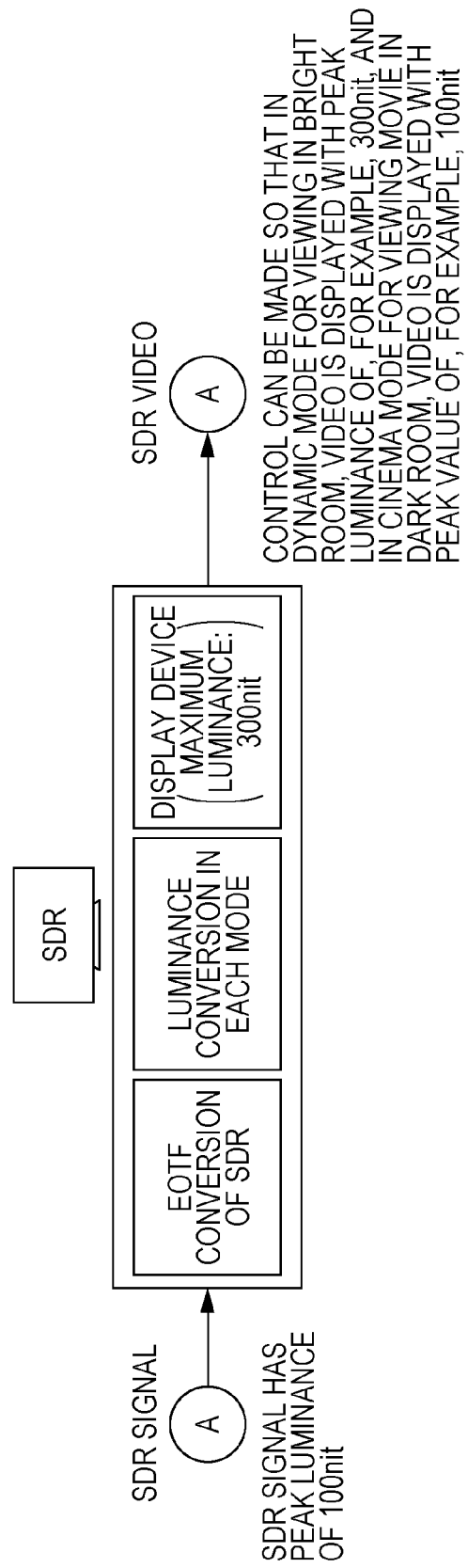

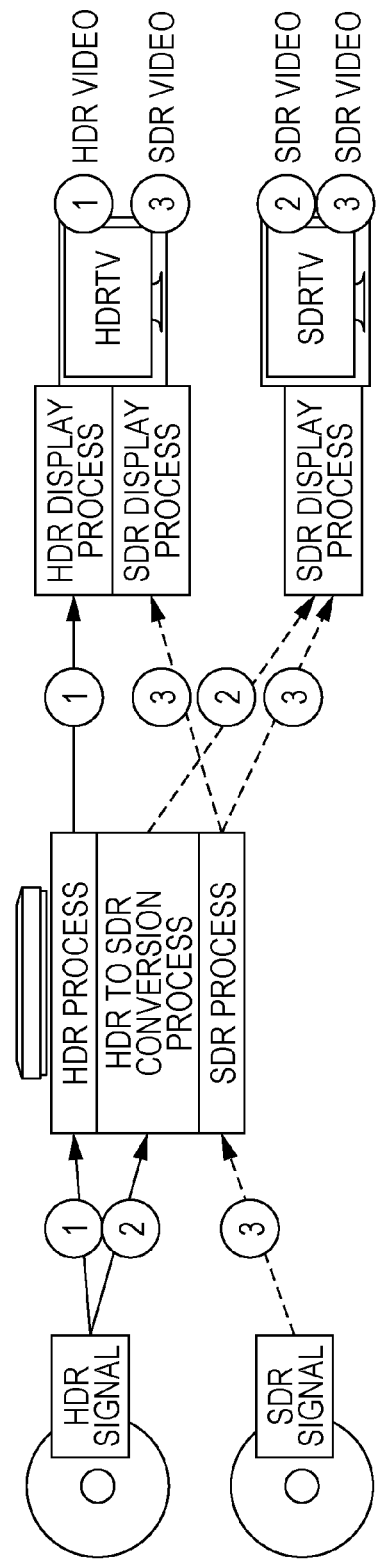

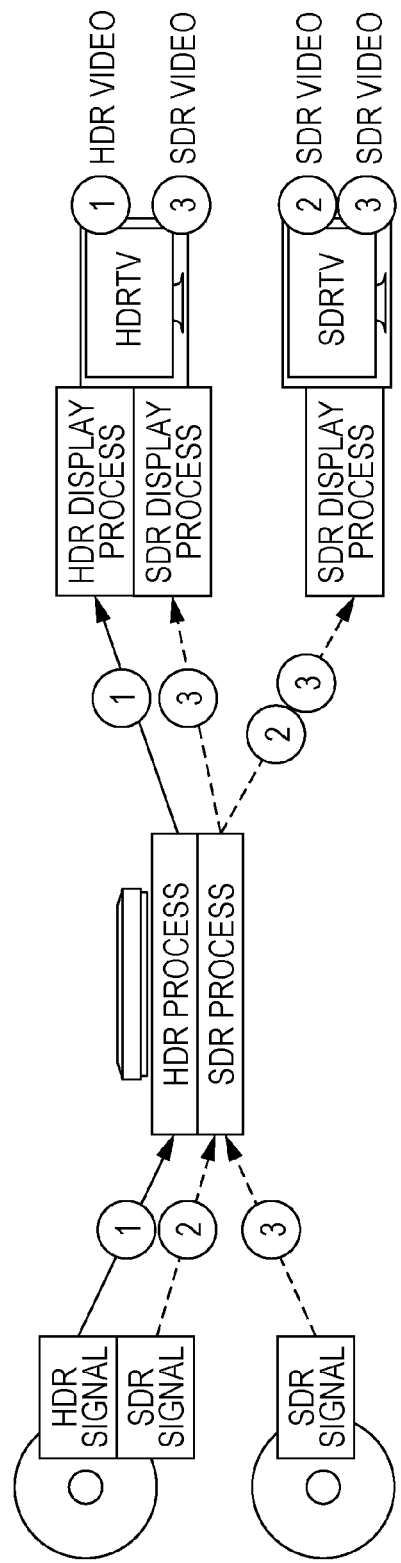

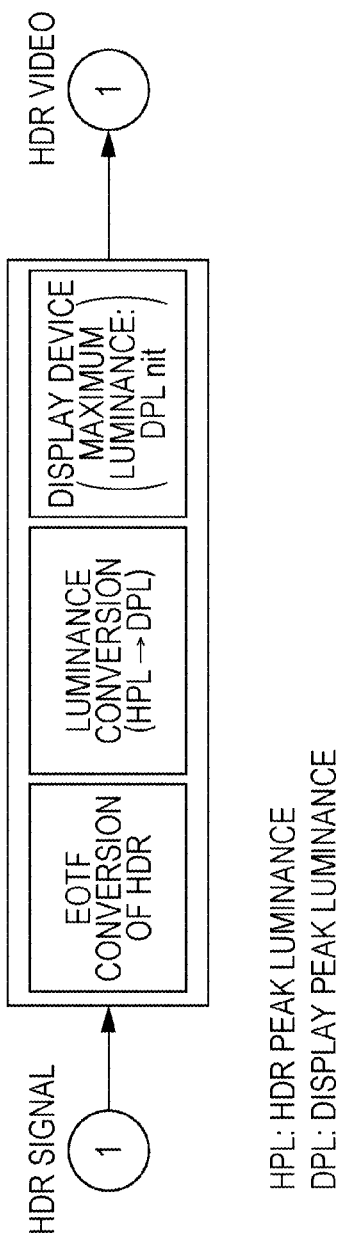

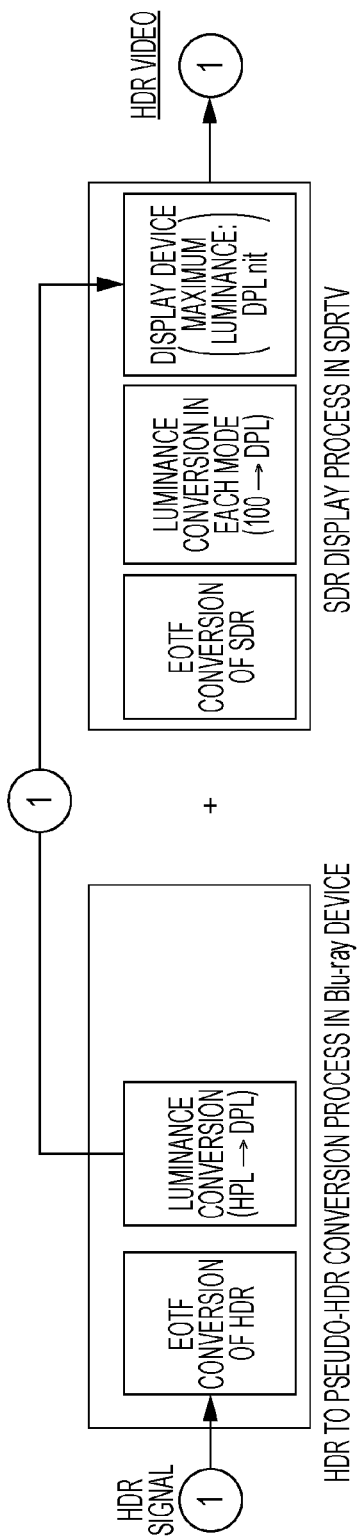

HPL: HDR PEAK LUMINANCE
DPL: DISPLAY PEAK LUMINANCE
CPL: CONTENT PEAK LUMINANCE
CAL: CONTENT AVERAGE LUMINANCE

HPL: HDR PEAK LUMINANCE
DPL: DISPLAY PEAK LUMINANCE
CPL: CONTENT PEAK LUMINANCE
CAL: CONTENT AVERAGE LUMINANCE

FIG. 29

|  | SDR (FIRST LUMINANCE RANGE) | HDR (SECOND LUMINANCE RANGE) |
|---|---|---|
| 2K (FIRST RESOLUTION) | 2K_SDR-COMPATIBLE BD | 2K_HDR-COMPATIBLE BD |
| 4K (SECOND RESOLUTION) | 4K_SDR-COMPATIBLE BD | 4K_HDR-COMPATIBLE BD |

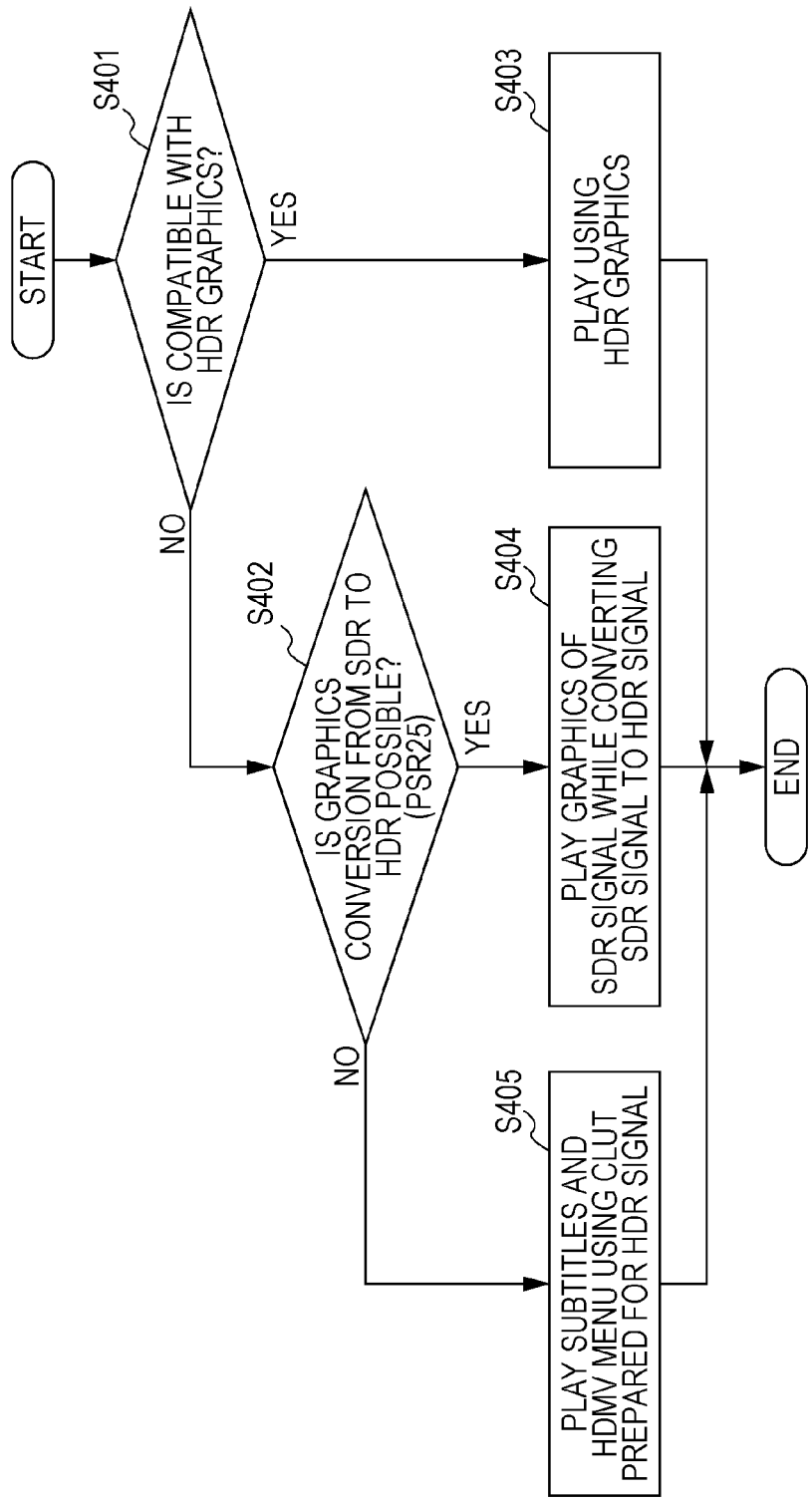

PLAYBACK METHOD ACCORDING TO FUNCTION OF PLAYBACK DEVICE

BACKGROUND

1. Technical Field

The present disclosure relates to a data playback method and a data playback device.

2. Description of the Related Art

Conventionally, an image signal processing device for improving displayable luminance levels is disclosed (see, for example, Unexamined Japanese Patent Publication No. 2008-167418).

SUMMARY

The conventional technique has required further improvement.

In one general aspect, the techniques disclosed here feature a method to be performed by a playback device, including: determining whether the playback device has a function for converting first graphics in a second luminance range narrower than a first luminance range to second graphics in the first luminance range; when the playback device has the function, converting the first graphics to the second graphics, and displaying a video in the first luminance range with the second graphics being superimposed on the video; and when the playback device does not have the function, displaying the video with third graphics different from the second graphics being superimposed on the video.

Note that these general or specific aspects may be implemented using a system, a method, an integrated circuit, a computer program, or a computer-readable recording medium such as a CD-ROM, or may be implemented using an arbitrary combination of a system, a method, an integrated circuit, a computer program, and a recording medium.

The above mode can implement further improvement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5A is a diagram illustrating an example where a BD player and a TV are connected by using an HDMI (registered trademark; the same applies hereinafter), and a case where the TV is compatible with HDR display;

FIG. 5B is a diagram illustrating an example where the BD player and the TV are connected by using the HDMI, and a case where the TV is not compatible with HDR display;

FIG. 8 is a diagram illustrating an example of combinations of an HDR (High Dynamic Range) and an SDR (Standard Dynamic Range) in a case where content includes one video stream and one graphics stream;

FIG. 9 is a diagram illustrating generation of a graphics master using an EOTF (Electro-Optical Transfer Function) shared by a video master;

FIG. 15B is a diagram for describing an SDR display process in the SDRTV with peak luminance of 300 nit;

FIG. 17A is a diagram for describing Case 1 in which an HDR disc stores only an HDR signal compatible with the HDR;

FIG. 17B is a diagram for describing Case 2 in which an HDR disc stores an HDR signal compatible with the HDR and an SDR signal compatible with the SDR;

FIG. 20A is a diagram illustrating one example of a display process for converting an HDR signal and performing HDR display in an HDRTV;

FIG. 20B is a diagram illustrating one example of a display process for performing HDR display using an HDR-compatible playback device and the SDRTV;

FIG. 29 is a diagram illustrating types of BDs;

FIG. 39 is a flowchart illustrating a process in the playback device.

DETAILED DESCRIPTION

Figure 1:
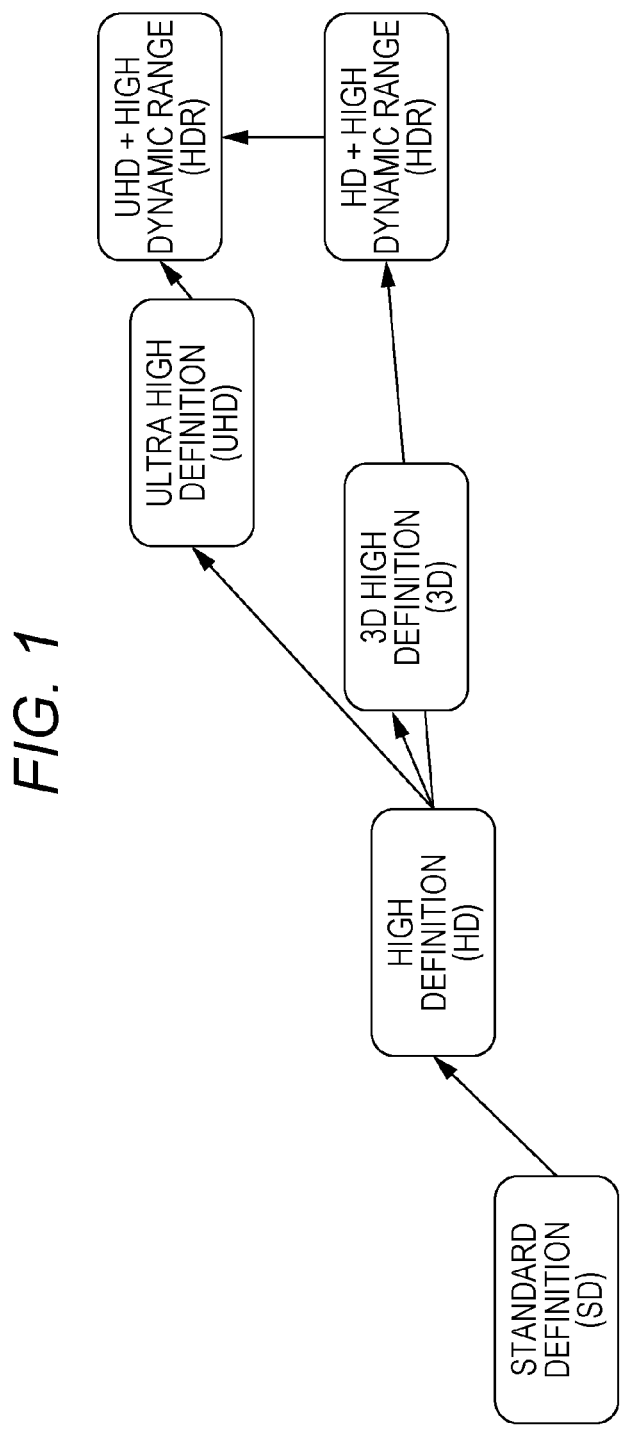
FIG. 1 is a diagram for describing video technology evolution.

A method according to one aspect of the present disclosure is a method to be performed by a playback device, including: determining whether the playback device has a function for converting first graphics in a second luminance range narrower than a first luminance range to second graphics in the first luminance range; when the playback device has the function, converting the first graphics to the second graphics, and displaying a video in the first luminance range with the second graphics being superimposed on the video; and when the playback device does not have the function, displaying the video with third graphics different from the second graphics being superimposed on the video.

As a result, in the playback method, the playback device can perform different operations according to whether the device has the function for changing the luminance range of graphics. As a result, in the playback method, an appropriate operation can be performed according to the function of the playback device.

For example, the method may further include when the playback device does not have the function, generating the third graphics by using a color conversion table for the first luminance range.

As a result, difficulty in visual recognition of a graphics video can be restrained.

For example, the third graphics may be the first graphics.

For example, the determining may include a playback control program to determine whether the playback device has the function is.

For example, the playback control program may determine whether the playback device has the function by checking a register that stores information representing whether the playback device has the function.

Further, a playback device according to one aspect of the present disclosure is a playback device including: one or memories; and circuitry which, in operation performs: determining whether the playback device has a function for converting first graphics in a second luminance range narrower than a first luminance range to second graphics in the first luminance range; when the playback device has the function, converting the first graphics to the second graphics, and display a video in the first luminance range with the second graphics being superimposed on the video; and when the playback device does not have the function, displaying the video with third graphics different from the second graphics being superimposed on the video.

As a result, the playback device can perform different operations according to whether the playback device has a function for changing the luminance range of graphics. As a result, the playback device can perform an appropriate operation according to the function of the playback device.

Note that these general or specific aspects may be implemented using a system, a method, an integrated circuit, a computer program, or a computer-readable recording medium such as a CD-ROM, or may be implemented using an arbitrary combination of a system, a method, an integrated circuit, a computer program, and a recording medium.

Further, the above characteristics will be described mainly in [5-3. Operation in Playback Device].

Each of exemplary embodiments which will be described below illustrates one specific example of the present disclosure. Numerical values, shapes, materials, components, disposing positions and connecting forms of the components, steps, and an order of the steps described in the following embodiments are examples, and thus are not intended to limit the present disclosure. In addition, in components of the following exemplary embodiments, components, which are not described in independent claims representing the broadest concept, will be described as optional components.

The playback method and the playback device according to one aspect of the present disclosure will be specifically described below with reference to the accompanying drawings.

Each of exemplary embodiments which will be described below illustrates specific examples of the present disclosure. Numerical values, shapes, materials, components, disposing positions and connecting forms of the components, steps, and an order of the steps described in the following embodiments are examples, and thus are not intended to limit the present disclosure. In addition, in components of the following exemplary embodiments, components, which are not described in independent claims representing the broadest concept, will be described as optional components.

First Exemplary Embodiment

The present disclosure relates to an image conversion/playback method and an image conversion/playback device each for displaying an HDR (High Dynamic Range) signal which is a high luminance signal in a high luminance range on a display device such as a TV, a projector, a tablet, or a smartphone that is compatible with an SDR (Standard Dynamic Range) signal which is a normal luminance signal in a luminance range with a maximum luminance value of 100 nit.

[1-1. Background]

First, video technology transitions will be described with reference to FIG. 1. FIG. 1 is a diagram for describing video technology evolution.

As an achievement of a high image quality of a video, primary attention has been focused on an increase in a number of display pixels so far, and videos ranging from video with 720×480 pixels of Standard Definition (SD) to so-called 2K video with 1920×1080 pixels of High Definition (HD) has been widely used.

In recent years, with the aim of achieving a higher image quality of a video, introduction of so-called 4K video with 3840×1920 pixels of Ultra High Definition (UHD) or with 4096×1920 pixels of 4K has started.

Then, it is considered that image quality of a video is heightened by, for example, expanding dynamic range or color gamut or adding or improving a frame rate as well as by increasing video resolution through the introduction of 4K.

Among them, for the dynamic range, attention is focused on an HDR (High Dynamic Range) as a method that is compatible with a luminance range whose maximum luminance value is increased to express bright light using brightness closer to the real one, while dark part gradations of conventional videos are maintained. The bright light is, for example, specular reflected light that cannot be expressed by current TV signals. Specifically, a method for a luminance range compatible with TV signals used so far is called an SDR (Standard Dynamic Range), and has a maximum luminance value of 100 nit. On the other hand, it is assumed that a maximum luminance value of the HDR is increased to 1000 nit or more. Standardization of the HDR is in progress in SMPTE (Society of Motion Picture & Television Engineers), ITU-R (International Telecommunications Union Radiocommunications Sector), etc.

For specific application of the HDR, as with an HD and a UHD, it is assumed to use the HDR in broadcasting, packaged media (Blu-ray Discs, etc.), Internet delivery, etc.

In the following, in a video compatible with the HDR, luminances of the video have luminance values in an HDR luminance range, and a luminance signal obtained by quantizing the luminance values of the video is called an HDR signal. In a video compatible with the SDR, luminances of the video have luminance values in an SDR luminance range, and a luminance signal obtained by quantizing the luminance values of the video is called an SDR signal.

[1-2. For EOTF]

An EOTF will be described with reference to FIG. 2.

Figure 2:
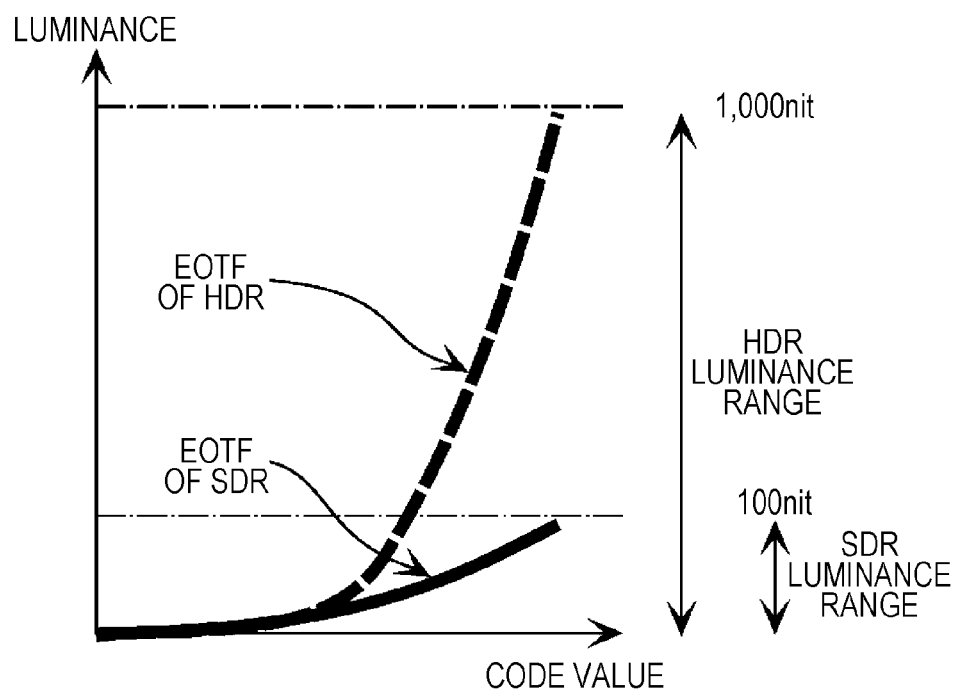
FIG. 2 is a diagram illustrating examples of an EOTF (Electro-Optical Transfer Function)

FIG. 2 is a diagram illustrating examples of EOTFs (Electro-Optical Transfer Functions) compatible with HDR and SDR.

An EOTF is generally called a gamma curve, and represents a correspondence between a code value and a luminance value, and is for quantizing a luminance value so as to convert the luminance value to a code value. That is to say, the EOTF is relationship information representing a correspondence relationship between a luminance value and a plurality of code values. For example, when a luminance value of a video compatible with an SDR is expressed by an 8-bit gradation code value, luminance values in a luminance range of up to 100 nit are quantized and mapped to 256 integer values ranging from 0 to 255. That is to say, the luminance values in the luminance range of up to 100 nit (the luminance values of the video compatible with the SDR) are converted to an SDR signal having 8-bit code values by performing quantization based on the EOTF. In an EOTF compatible with the HDR (hereinafter, referred to as the "HDR EOTF"), higher luminance values than an EOTF compatible with the SDR (hereinafter, referred to as the "SDR EOTF") can be expressed. For example, in FIG. 2, a maximum value of luminance (peak luminance) is 1000 nits. That is to say, the HDR luminance range includes the entire SDR luminance range, and HDR peak luminance is higher than SDR peak luminance. The HDR luminance range is a luminance range where a maximum value is increased from 100 nit which is a maximum value in the SDR luminance range to 1000 nit. Further, the HDR signal is expressed by, for example, 10-bit gradation.

[1-3. How to Use the EOTF]

Figure 3:
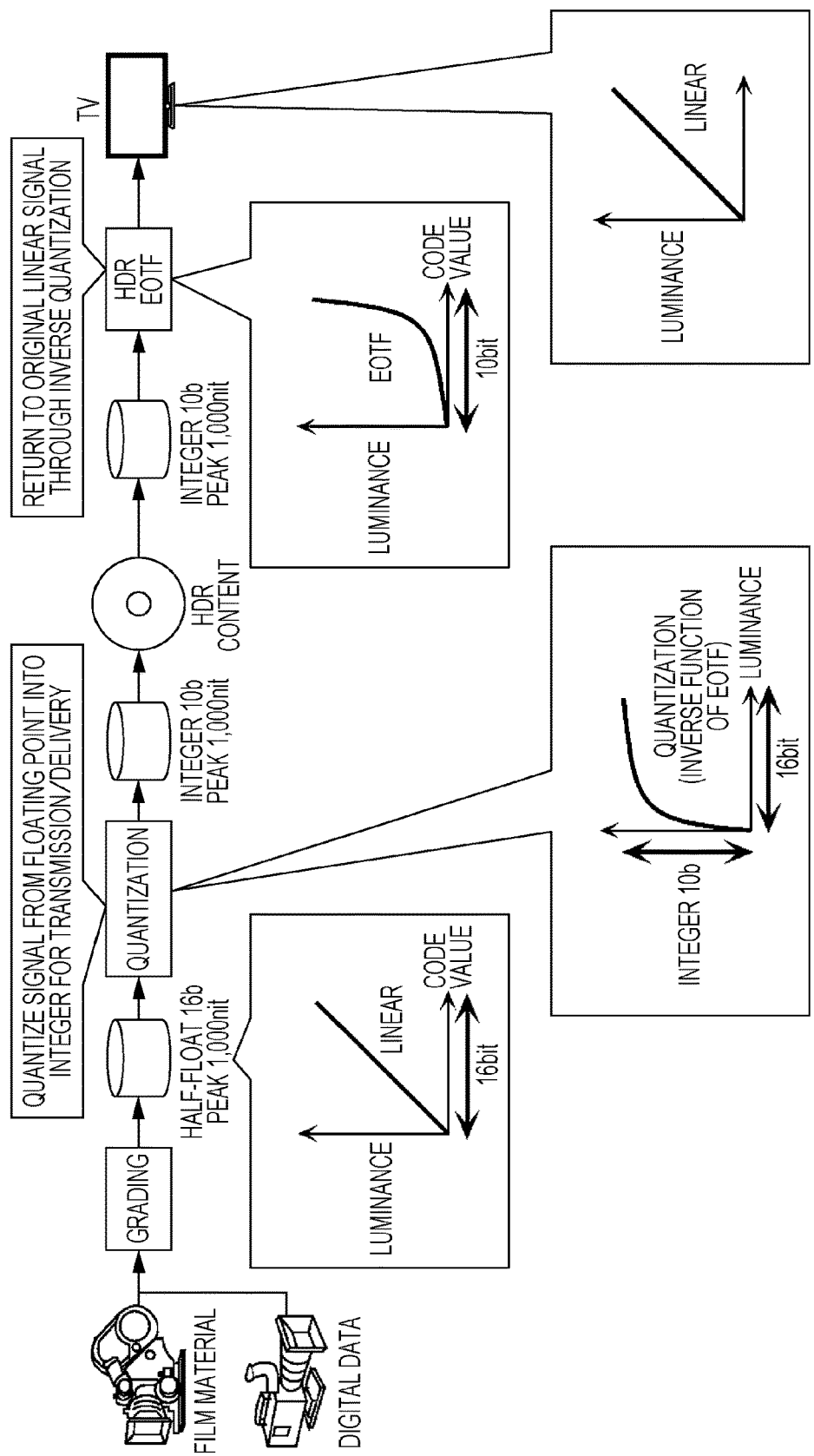
FIG. 3 is an explanatory diagram of a method for deciding a code value of a luminance signal stored in content, and a process of restoring a luminance value from a code value upon playback.

FIG. 3 is an explanatory diagram of a method for deciding a code value of a luminance signal stored in content, and a process for restoring a luminance value from a code value upon playback.

A luminance signal representing luminance in the present example is an HDR signal compatible with the HDR. An image obtained after grading is quantized by an inverse function of the HDR EOTF, by which code values corresponding to luminance values of the image are decided. The image is coded based on the code values so that elementary streams of a video and graphics are generated. Upon playback, decoded results of the elementary streams are inversely quantized based on the HDR EOTF so that a luminance value for each pixel is restored.

[1-4. Configuration of Stream of BD]

The above has described that the HDR might be used in optical discs such as a BD or in broadcasting. The BD that is an example of a medium using the HDR will be described below with reference to FIG. 4.

Figure 4:
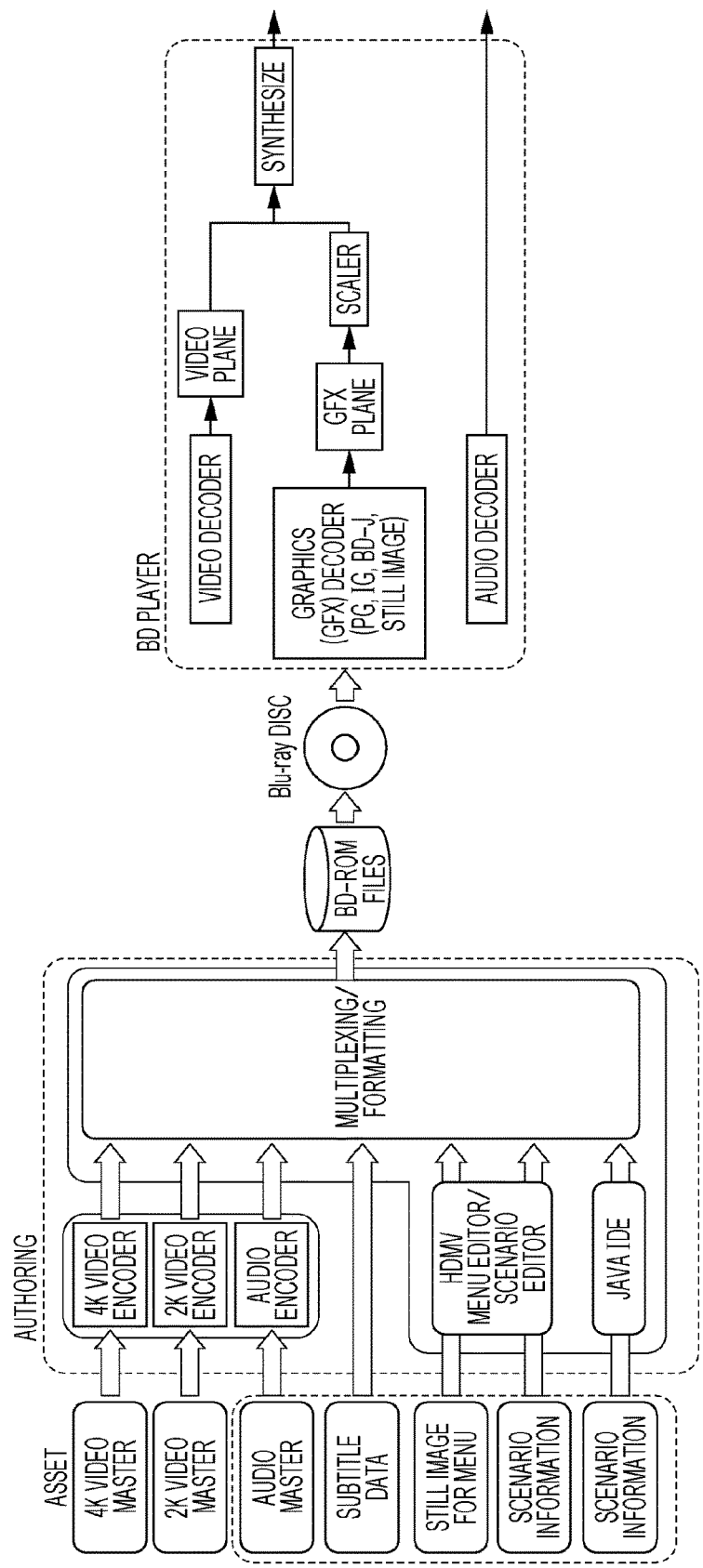
FIG. 4 is an explanatory diagram of a player that creates a BD (Blu-ray (registered trademark; the same applies hereinafter) Disc) and plays BD.

FIG. 4 is an explanatory diagram of a player that creates a BD and plays a BD.

As illustrated in FIG. 4, the creating process includes authoring of Blu-ray content, and creation of a BD storing the authored Blu-ray content. The Blu-ray content includes graphics data for generating subtitles and a menu and scenario data for providing interactivity in menu display and user's operations besides a video and an audio. The scenario data has an HDMV (High Definition Movie) format that makes a control according to a specific command or a BD-J (Blu-ray Disc Java) format that makes a control according to a Java (registered trademark; the same applies hereinafter) program. In the authoring, a video and an audio are coded, these coded streams and graphics data representing subtitles and a menu are multiplexed to a transport stream of an M2TS format, and management information, such as a playlist and an EP map, necessary for playback control is generated. The data generated by the authoring are stored in a BD.

In a BD player, the elementary streams of the video and the audio necessary for playback are separated from the graphics data by referring to the management information, and are decoded so as to be output. The video and the graphics such as the subtitles and the menu are output after planes of the video and the graphics are synthesized. When resolution of the video is different from resolution of the graphics, the graphics are up-converted according to the resolution of the video, and then the video and the graphics are synthesized with each other.

[1-5. Configuration of the Device]

When content (a video) compatible with the HDR is played back, a display such as a TV receives an output signal from a playback device such as a BD player and display it. Hereinafter, display of the video compatible with the HDR will be described as "HDR display, and display of the video compatible with the SDR is described as "SDR display". At this time, when the display is compatible with the HDR display, an output signal to be output by the playback device may be also still an HDR signal compatible with the HDR. On the other hand, when the display is not compatible with the HDR display, the playback device converts the output signal to an SDR signal compatible with the SDR so as to output the converted signal. The display is not compatible with the HDR display only when display is compatible only with the SDR display.

FIG. 5A and FIG. 5B illustrate examples where BD player 200 and TVs 300, 310 are connected by an HDMI. FIG. 5A illustrates a case where TV 300 is compatible with the HDR display, and FIG. 5B illustrates a case where TV 310 is not compatible with the HDR display. BD player 200 in FIG. 5A and BD player 200 in FIG. 5B have different configurations. FIG. 5A is the diagram illustrating a case where remapping, described later, is not performed, and a configuration of conversion device 210 for performing the remapping is omitted.

In FIG. 5A, BD player 200 reads the video and the graphics from medium 100 so as to decode the video and the graphics. BD player 200 synthesizes the decoded video with HDR data of the graphics, and outputs an HDR signal obtained by the synthesis to TV 300 compatible with HDR display by the HDMI.

On the other hand, in FIG. 5B, since TV 310 is not compatible with the HDR display, BD player 200 remaps the HDR data of the video and the graphics into SDR data using the HDR EOTF and the SDR EOTF before the video and the graphics are synthesized with each other. BD player 200 synthesizes the remapped SDR data of the video and the graphics with each other, and outputs an SDR signal obtained by the synthesis to TV 310 incompatible with the HDR display using the HDMI.

When two kinds of EOTFs including a first EOTF and a second EOTF are present, the remapping is a process for converting a first code value in the first EOTF to a second code value in the second EOTF. In FIG. 5B, the remapping is a process for converting a code value in the HDR EOTF to a code value in the SDR EOTF in conversion from the HDR to SDR.

That is to say, in FIG. 5B, BD player 200 includes conversion device 210 having an obtainer and a converter. The obtainer obtains a first luminance signal (an HDR signal) compatible with a first luminance range (HDR). The converter decides code values associated with code values represented by the first luminance signal, which is obtained by the obtainer, by quantization for a second luminance range (SDR) as converted code values using the HDR EOTF and the SDR EOTF, and converts the first luminance signal to a second luminance signal representing the converted code values. More specifically, the converter decides second code values associated with the code values represented by the first luminance signal obtained by the obtainer as the converted code values using the first EOTF and the second EOTF in the conversion to the second luminance signal. BD player 200 carries out a converting method for performing steps related to respective parts of conversion device 210. FIG. 5B illustrates a case where conversion device 210 converts the HDR signal to the SDR signal so as to output the SDR signal, but the device may convert the SDR signal to the HDR signal and output the HDR signal as described later.

Since luminance that exceeds 100 nit cannot be expressed in the SDR, the conversion from the HDR to the SDR to be made by conversion device 210 should be made based on a suitable process according to at least a conversion table where association between luminance that exceeds 100 nit in the HDR signal and the SDR code values associated with that luminance is defined in advance, or luminance distribution of an image in the content. Further, in the conversion process, it is assumed that different conversion rules are necessary for data where a luminance value is discrete like subtitles, and a video. Further, since remapping is generated for each frame, a processing amount is large particularly in an image with high resolution such as 4K. Further, since the luminance value varies before and after the remapping, an image after the remapping might be different from an image that is intended by a creator.

When an HDR signal of an HDR-compatible video (content) is converted to an SDR signal so as to output the SDR signal, remapping similar to the case of the video is necessary for graphics. When the remapping is made on both the video and the graphics, a processing amount of the remapping becomes large, and conversion to a luminance value that is not intended by a creator might be made.

[1-6. Conversion Method and Conversion Device]

Figure 6:
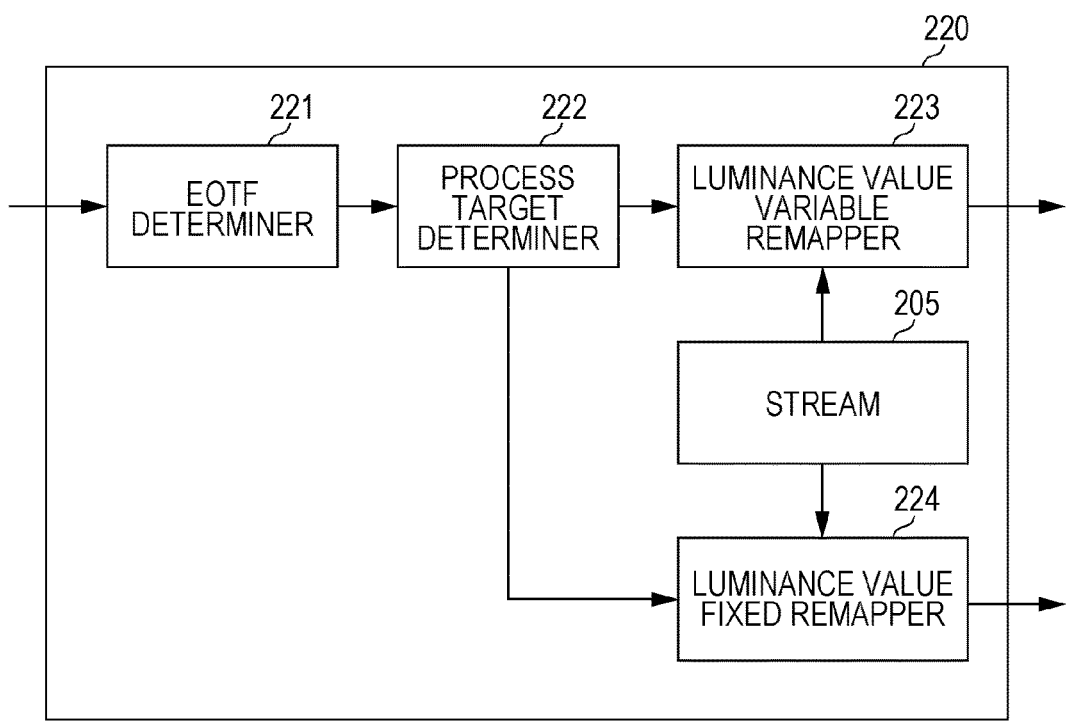
FIG. 6 is a block diagram illustrating a configuration of a remap processor in a conversion device.

FIG. 6 is a block diagram illustrating a configuration of a remap processor in a conversion device.

Remap processor 220 is included in conversion device 210. As illustrated in FIG. 6, remap processor 220 has EOTF determiner 221, process target determiner 222, luminance value variable remapper 223, and luminance value fixed remapper 224, storage 225 that temporarily stores a stream of content (a video).

EOTF determiner 221 determines whether the EOTF compatible with a signal of content (a video and graphics) read from media 100 is different from the EOTF compatible with output signals to be output to displays of TVs 300 and 310 that display videos. The EOTF compatible with an output signal is the EOTF of an output signal that is associated with a display of TV and can be displayed on the display.

Process target determiner 222 determines whether a process target is a video (graphics).

Luminance value variable remapper 223 converts a signal of a stream stored in storage 225 to a signal associated with the EOTF of an output signal according to the luminance value variable remapping (second remapping).

Luminance value fixed remapper 224 converts the stream signal stored in storage 225 to a signal associated with the EOTF of the output signal according to the luminance value fixed remapping (first remapping).

Figure 7:
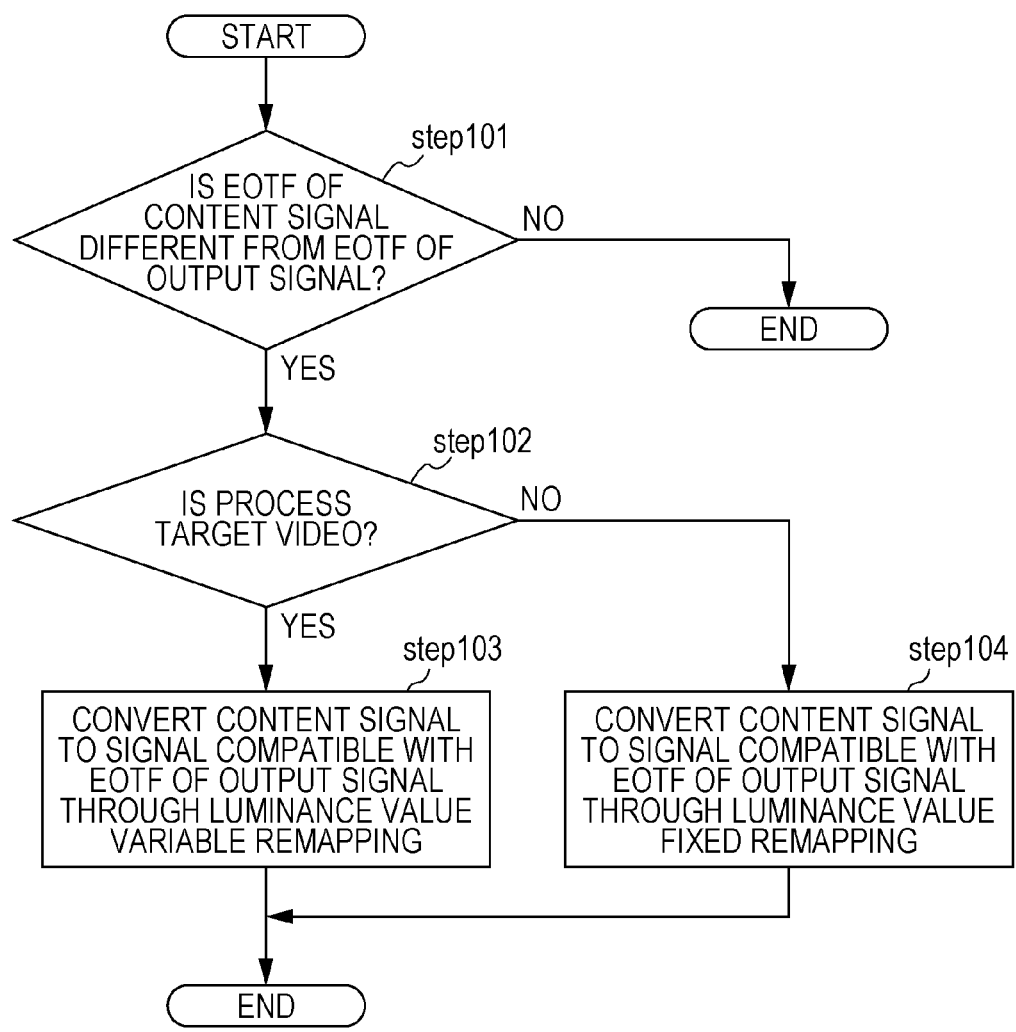
FIG. 7 is a diagram illustrating a flowchart of a remap process in the conversion device.

FIG. 7 is a diagram illustrating a flowchart of a remap process in the conversion device.

In the remap process, EOTF determiner 221 determines whether an EOTF compatible with a signal of obtained content (a video and graphics) is different from an EOTF compatible with an output signal to be output to the display as illustrated in FIG. 7 (step 101). When the determination is made as "Yes" at step 101, processes at step 102 to step 104 are executed in order to convert a system of the luminance range associated with the content signal to the EOTF compatible with the output signal. On the other hand, the determination is made as "No" at step 101, the remap process is ended, and the content signal is output without remapping. Step 101 is executed so that the format of the output signal is decided based on whether the display such as a TV that displays a video is compatible with the HDR display. The format of the output signal may be decided so as to be compatible with a main video such as a main feature.

Process target determiner 222, then, determines whether a process target is a video (graphics) (step 102). When the determination is made as "Yes" at step 102, luminance value variable remapper 223 converts the content signal to a signal compatible with the EOTF of the output signal according to the luminance value variable remapping (the second remapping) (step 103).

On the other hand, when the determination is made as "No" at step 102, luminance value fixed remapper 224 converts the content signal to a signal compatible with the EOTF of the output signal according to the luminance value fixed remapping (the first remapping) (step 104).

When the content (the video) is a video, the second remapping is made, and when the content (the video) is graphics, the first remapping is made.

In the luminance value variable remapping at step 103 and the luminance value fixed remapping at step 104, tables that represent an association relationship between the HDR and SDR luminance values are prepared respectively. The association relationship between the luminance values with the code values in the HDR EOTF and the SDR EOTF may be described in each of the tables. As a result, the code values that are associated with the luminance values of the EOTF after the remapping are always present. For this reason, when a code value that is associated with a luminance value is not present, a code value having a luminance value closest to that luminance value does not have to be searched for.

Further, in the luminance value variable remapping (the second remapping), a plurality of tables may be adaptively switched based on a luminance distribution in an image or in each scene or an optimum table may be sequentially created for each content. That is to say, for example, in the decision of the second luminance value that is the luminance value after the remapping, relational information according to a video scene is selected from plural pieces of relational information (tables) representing relationships between the luminance values in the first luminance range and the luminance values in the second luminance range. The second luminance value may be decided based on the decided first luminance value by using the selected relational information.

In the luminance value variable remapping at step 103, the process is executed in the following procedure. In this case, the conversion is made from the first luminance signal associated with the first EOTF to the second luminance signal associated with the second EOTF.

(1) The first luminance value associated with the code value of the first EOTF (the luminance value before the remapping) is decided.

(2) The second luminance value of the second EOTF associated with the first luminance value decided in (1) (the luminance value after the remapping) is decided.

(3) A code value of the second EOTF associated with the second luminance value decided in (2) is decided.

In the luminance value fixed remapping at step 104, the process is executed in the following procedure. In this case, the conversion is made from the first luminance signal associated with the first EOTF to the second luminance signal associated with the second EOTF.

(1) The luminance value associated with the code value of the first EOTF is decided.

(2) The code value of the second EOTF associated with the luminance value decided in (1) is decided.

*In the luminance value fixed remapping, since the luminance value does not change before and after the remapping, the process (2) at step 103 is not necessary.

After the completion of step 103 and step 104 in the remap process, conversion device 210 synthesizes the video and the graphics so as to output them. That is to say, conversion device 210 may further make the first remapping and the second remapping so as to synthesize and output the video and the graphics that are converted to the second luminance signal.

Further, when outputting the signal to the display through an interface such as an HDMI, conversion device 210 may transmit information for identifying the EOTF of the output signal as meta-information. That is to say, conversion device 210 may further output the second luminance signal converted from the obtained first luminance signal as well as the meta-information for identifying the second EOTF.

[1-7. Effects, Etc.]

In the first exemplary embodiment, in the playback of content, a decision is made whether an HDR signal or an SDR signal is output according to compatibility of an output destination of a video with the HDR or the SDR. The process for remapping the video and the graphics from the SDR to the HDR or from the HDR to the SDR is executed according to the output format. A luminance value fixed remap process where the luminance value does not change before and after the remapping is applied to the graphics, and a luminance value variable remap process where the luminance value might be changed before and after the remapping is applied to the video.

Since the luminance of the graphics does not change before and after the remapping, image quality intended by a creator can be maintained. Further, the luminance values do not have to be associated between the EOTFs before and after the conversion, and thus the processing amount for the remapping can be reduced.

Second Exemplary Embodiment

[2-1. Content Creating Method]

The creation of a video master and a graphics master needs a grading step illustrated in FIG. 3. At this step, luminance and color shade of a digital image captured by a camera or a scanned image of a film are corrected in each pixel such that creator's intention is reflected. The grading requires advanced know-how, and a great number of necessary steps. Therefore, it is desirable to repress a number of masters to be created as small as possible. On the other hand, since the peak luminance is different between the HDR and the SDR, different masters should be generally created for the HDR and the SDR respectively. FIG. 8 is a diagram illustrating an example of combinations of the HDR and the SDR when content includes one video stream and one graphics stream. In this example, four combinations are present, and the HDR master and the SDR master are necessary for a video and graphics.

On the other hand, a greatest effect of the HDR in video content is considered to be exerted on a video such as a main feature of a movie, and an effect to be exerted on graphics such as subtitles is smaller than the effect on the video. Nevertheless, when the HDR master and the SDR master are created also for the graphics similarly to the video, a load on the creation of content is large.

Therefore, in the creation of the graphics master in the present disclosure, a master is shared in the SDR and the HDR as illustrated in FIG. 9. FIG. 9 is a diagram illustrating that a graphics master is created by using an EOTF shared with a video master. A luminance range in the graphics master is made to match with an SDR luminance range. That is to say, peak luminance in the graphics master is less than or equal to an upper limit value of the SDR luminance range. When graphics data in the content is mapped into an SDR signal compatible with the SDR, code values for respective pixels are decided based on the SDR EOTF. When the graphics data is mapped into an HDR signal compatible with the HDR, code values for respective pixels are decided based on the HDR EOTF.

Figure 10A:
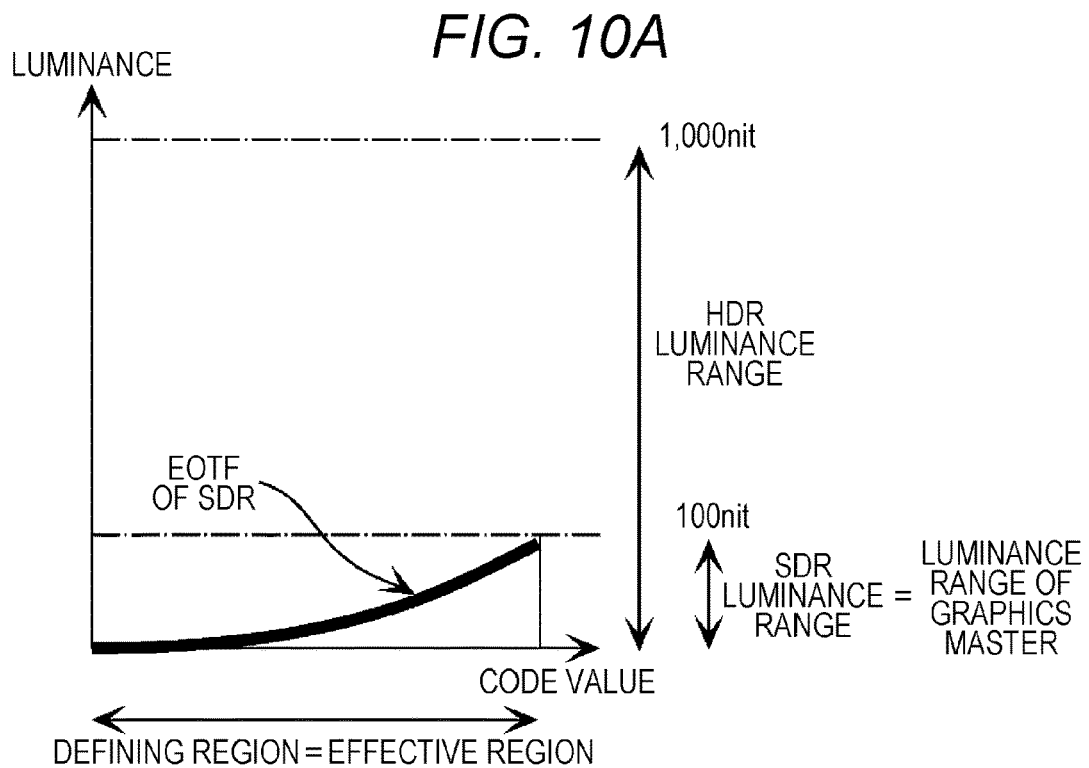
FIG. 10A is a diagram for describing a case of mapping on an SDR signal in the generation of the graphics master.

FIG. 10A is a diagram for describing a case of mapping on an SDR signal in the generation of the graphics master. In this case, since the SDR luminance range matches with the luminance range of the graphics master, a defining region of the code values in the SDR EOTF is entirely effective.

Figure 10B:
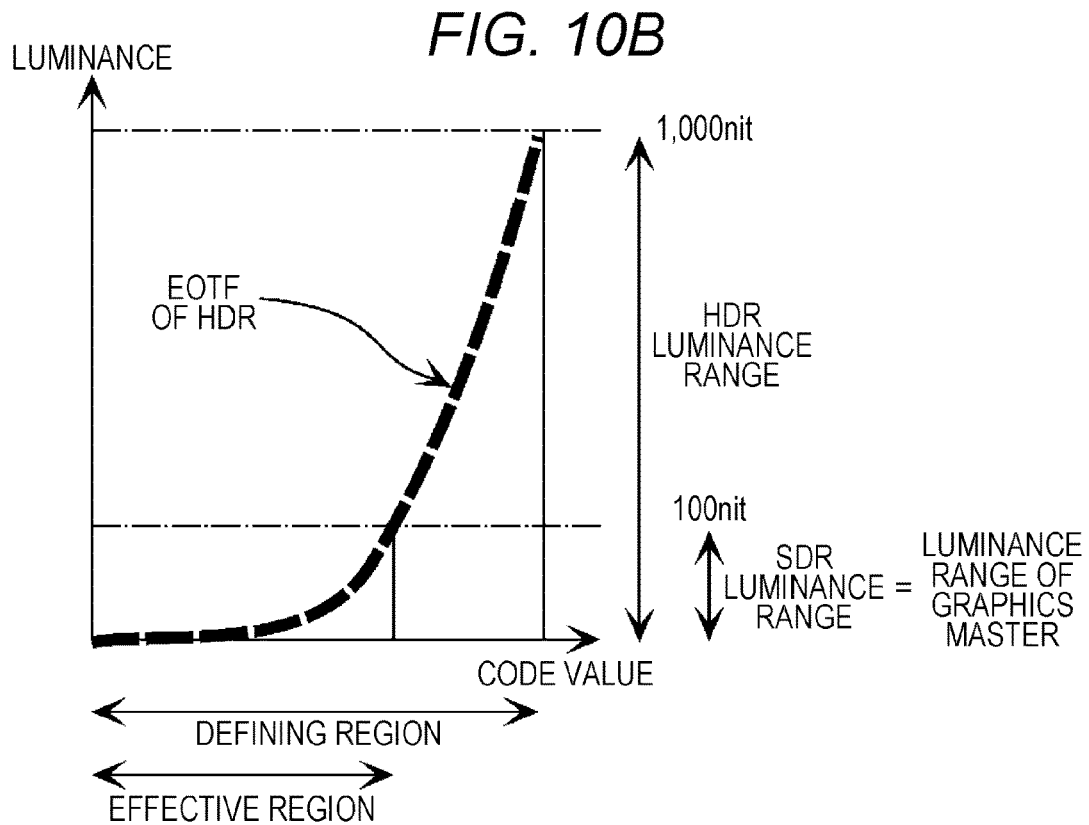
FIG. 10B is a diagram for describing a case of mapping on an HDR signal in the generation of the graphics master.

FIG. 10B is a diagram for describing a case of mapping on the HDR signal when the graphics master is created. In this case, only code values that are less than or equal to the code value corresponding to the peak luminance of SDR are effective.

When the graphics master is mapped into the HDR signal, identification information representing that the peak luminance is within the SDR luminance range may be stored in an elementary stream or management information such as a playlist. In the above remap process, a decision can be made based on the identification information which of the luminance value fixed remapping or the luminance value variable remapping is applied. Further, when output is carried out by an interface such as HDMI, the identification information may be stored as meta-information of the output interface.

An EOTF of the graphics can be decided according to a video. That is to say, when the video is an HDR video, the graphics data is also HDR data, and when the video is an SDR video, the graphics data is also SDR data. In another manner, the graphics data may be always an SDR data.

The similar consideration can be applied also to a case where a plurality of videos is present. For example, when a sub-video that is displayed with it being superimposed on a main video or in parallel with the main video, an EOTF of the sub-video can be matched with an EOTF of the main video.

[2-2. Data Creating Method and Apparatus]

Figure 11:
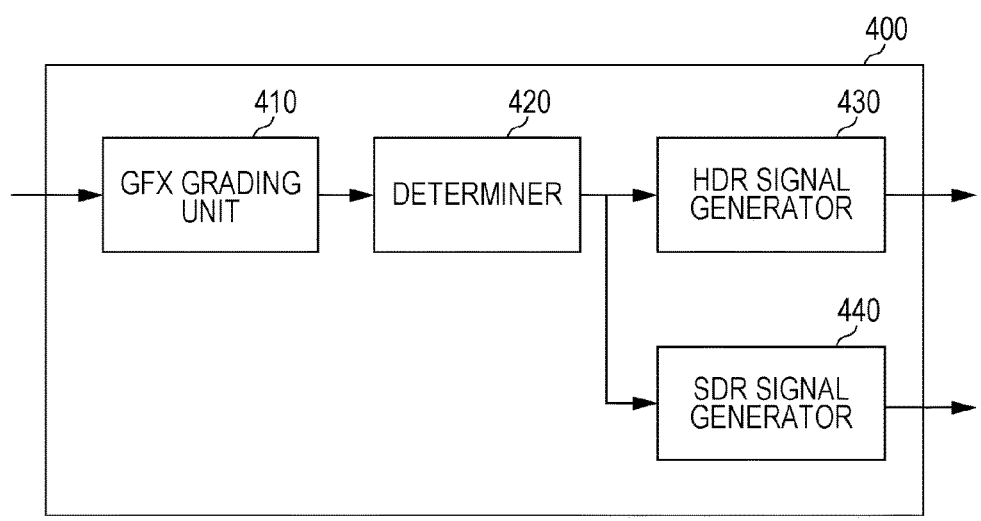
FIG. 11 is a block diagram illustrating a configuration of a generator that generates a graphics signal in authoring.

FIG. 11 is a block diagram illustrating a configuration of a generator that generates a graphics signal on authoring.

Generator 400 includes GFX (graphics effect) grading part 410, determiner 420, HDR signal generator 430, and SDR signal generator 440.

GFX grading part 410 grades a graphics master such that the luminance value is less than or equal to the SDR peak luminance.

Determiner 420 determines whether a video to be displayed together with a graphics is an HDR video.

When determiner 420 determines that the video to be displayed together with the graphics is an HDR video, HDR signal generator 430 converts a luminance value of the graphics to a code value using the HDR EOTF.

When determiner 420 determines that the video to be displayed together with the graphics is not an HDR video (namely an SDR video), SDR signal generator 440 converts the luminance value of the graphics to a code value using the SDR EOTF.

Figure 12:
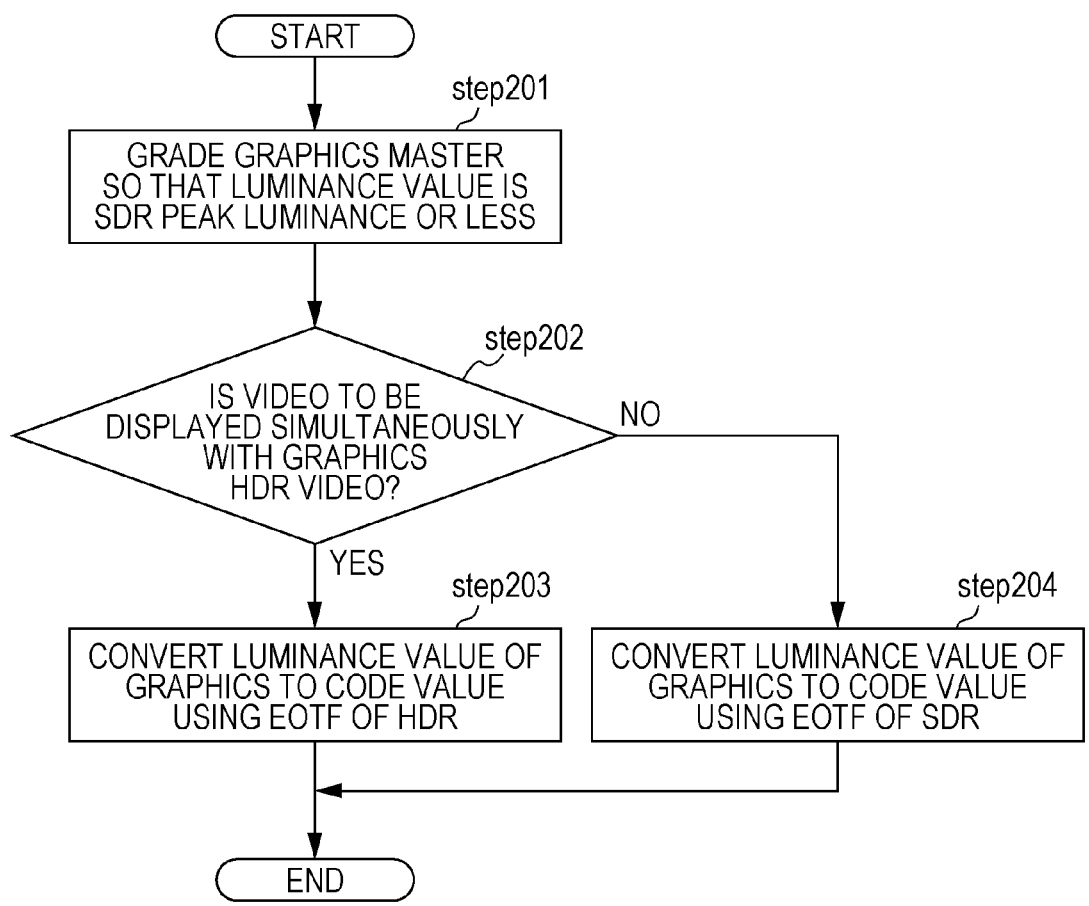
FIG. 12 is a flowchart illustrating a method for generating the graphics signal in the authoring.

FIG. 12 is a flowchart illustrating a method for generating the graphics signal on authoring.

GFX grading part 410 grades a graphics master such that the luminance value is less than or equal to the SDR peak luminance (step 201).

Determiner 420 determines whether the video to be displayed simultaneously with the graphics is an HDR video (step 202).

When the determination is made as "Yes" at step 202, HDR signal generator 430 converts the luminance value of the graphics to a code value using the HDR EOTF (step 203).

When the determination is made as "No" at step 202, SDR signal generator 440 converts the luminance value of the graphics to a code value using the SDR EOTF (step 204).

The determination is made at step 202 whether the graphics are displayed simultaneously with the video. At this time, when the graphics are, for example, subtitles, the video on which the subtitles are to be superimposed is determined. Further, the graphics such as a menu that is not displayed simultaneously with the video may be determined based on whether the video of a main feature is an HDR video. Since the graphics use a conventional format for conventional 2K, the graphics are converted always using the SDR EOTF. Therefore, the determining process at step 202 is not executed, and the process at step 204 may be always executed.

In such a manner, the luminance range of the graphics is set to be less than or equal to the SDR peak luminance, so that the luminance value fixed remapping can be made without changing the luminance value before and after the remapping.

The grading can be carried out also on data other than graphics such that the luminance of the HDR master is within the SDR range. Particularly in graphics such as subtitles, a merit of using a luminance value higher than the SDR peak luminance is insignificant. Therefore, the luminance value fixed remapping may be applied to the remapping from the SDR to the HDR regardless of whether the grading is within the SDR range.

[2-3. Effects, Etc.]

In the creating apparatus and the creating method according to the second exemplary embodiment, when content that includes video data such as graphics as well as a video is authored, a common master is used for the video data other than the video in the HDR and the SDR. For this reason, grading is carried out such that the peak luminance in a master is within the SDR luminance range.

As a result, since the master excluding the video can be commonized in the HDR and the SDR, a number of steps relating to the creation of a master can be reduced.

Other Exemplary Embodiments

As described above, the exemplary embodiments are described as exemplification of techniques disclosed in the present application. However, the techniques of the present disclosure are not limited thereto, and are also applicable to exemplary embodiments where changes, replacements, additions, omissions, etc. are appropriately made. Further, the components described in the exemplary embodiments are combined so as to provide a new exemplary embodiment.

Therefore, other exemplary embodiments are described below.

For example, in the above exemplary embodiments, two kinds of formats that are the HDR and the SDR are described as a format of the output signal to be output from conversion device 210. At a time of output to the HDMI, output is carried out in the HDR or the SDR as a standard specification. For example, when a TV contains a BD player or broadcasting is received and reproduced by the TV, or an OTT service is viewed on a tablet, a signal can be directly output from conversion device 210 to a display device.

At this time, when the peak luminance in an HDR standard is different from the displayable peak luminance on the display device, a remap process may be executed on data in content compatible with the HDR according to the EOTF of the display device. Further, the remap process may be again executed on SDR and HDR signals input into the display device by using the HDMI for the EOTF according to the peak luminance of the display device. That is to say, in this case, the obtained first luminance signal may be converted to a second luminance signal by using the first EOTF, and the second EOTF where the displayable luminance range on the display device as an output destination of the second luminance signal is a second luminance range.

Further, in the exemplary embodiments, not described, but in authoring of a BD, a video and an audio to be played back by unit of a play item in a playlist, or graphics can be specified. When a video and an audio to be played back in units of play items, or graphics are specified, the resetting process is executed on a boundary of play items by switching between the HDR and the SDR in units of play items in the interface such as the HDMI. As a result, seamless playback cannot be occasionally carried out. Therefore, when the switching between the HDR and the SDR is made between play items that are seamlessly connected, the remap process may be executed in the conversion device provided to the BD player such that the EOTF of an output signal is the same as the EOTF of the previous play item. In another manner, the switching of the EOTF is prohibited between the play items that are seamlessly connected, and identification information that represents that the EOTF is not switched may be stored in management information such as the playlist.

Further, the authoring or the converting method in the exemplary embodiments can be applied not only to package media such as optical discs but also to broadcasting and an OTT (Over The Top) service. For example, in broadcasting, besides a main feature of a broadcasting program, data broadcasting to be transmitted by broadcasting, and content obtained via a communication network can be superimposed on a video of a main feature and displayed. At this time, it is expected that an HDR program and an SDR program are mixed in a main feature of a video. A restriction of the peak luminance and the remap process can be carried out also on graphics and a video in content obtained separately from the main feature by the above-described method.

Third Exemplary Embodiment

[3-1. Relationship Among Master Creation, Delivery Methods, and Display Devices]

Figure 13:
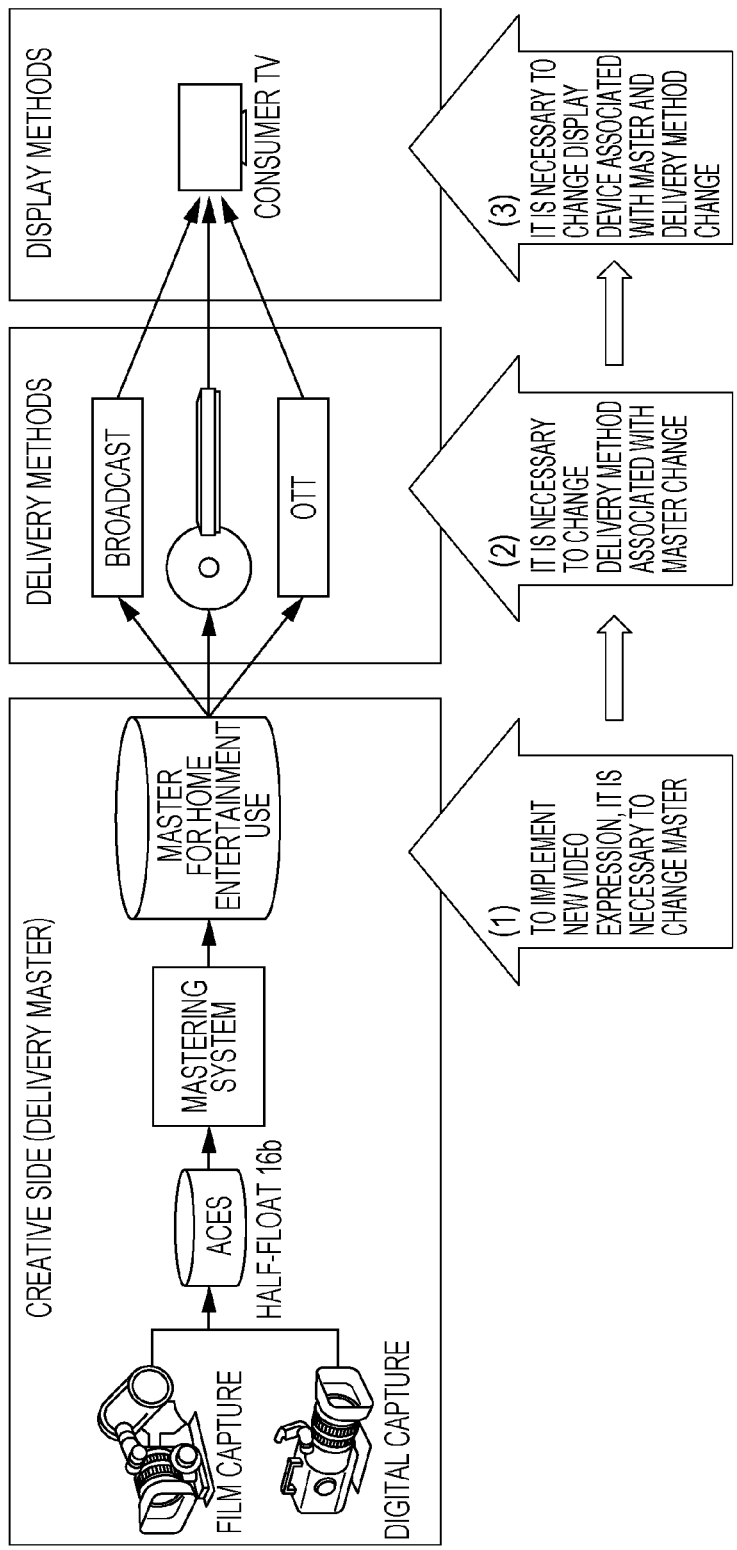
FIG. 13 is a diagram for describing a relationship among video creation, delivery methods, and display devices when new video expression is introduced into content.

FIG. 13 is a diagram for describing a relationship among video creation, delivery methods, and display devices for when new video expression is introduced into content.

When new video expression (an increase in the number of pixels, etc.) is introduced to achieve a high image quality of a video, as illustrated in FIG. 13, (1) a master for Home Entertainment used on a video creative side should be changed. Accordingly, (2) delivery methods such as broadcasting, communication, and packaged media, and (3) display devices such as a TV and a projector that display the video should be updated.

[3-2. Relationship Among Master, Delivery Methods, and Display Devices upon Introduction of HDR]

In order that a user enjoys content compatible with new video expression (e.g., high-luminance video content (HDR content)) at home, the user needs to newly introduce both an HDR compatible delivery method and an HDR compatible display device. That is to say, to enjoy the content compatible with new video expression at home, the user needs to prepare a delivery method and a display device compatible with the new video expression. This fact has been unavoidable also when new video expression is introduced, such as when a transition is made from an SD video to an HD video, from an HD video to a 3D video, and from an HD video to an UHD (4K) video.

Hence, a change to new video expression depends on wider use of display devices (e.g., TVs) having a new function. Such a change requires new purchases of TVs, and replacement of TVs is not easy in terms of high prices as well as size, weight, etc. Since both a medium side and a content side cannot make large investments at the beginning, in many cases, the new video expression comes into wide use slowly.

Figure 14:
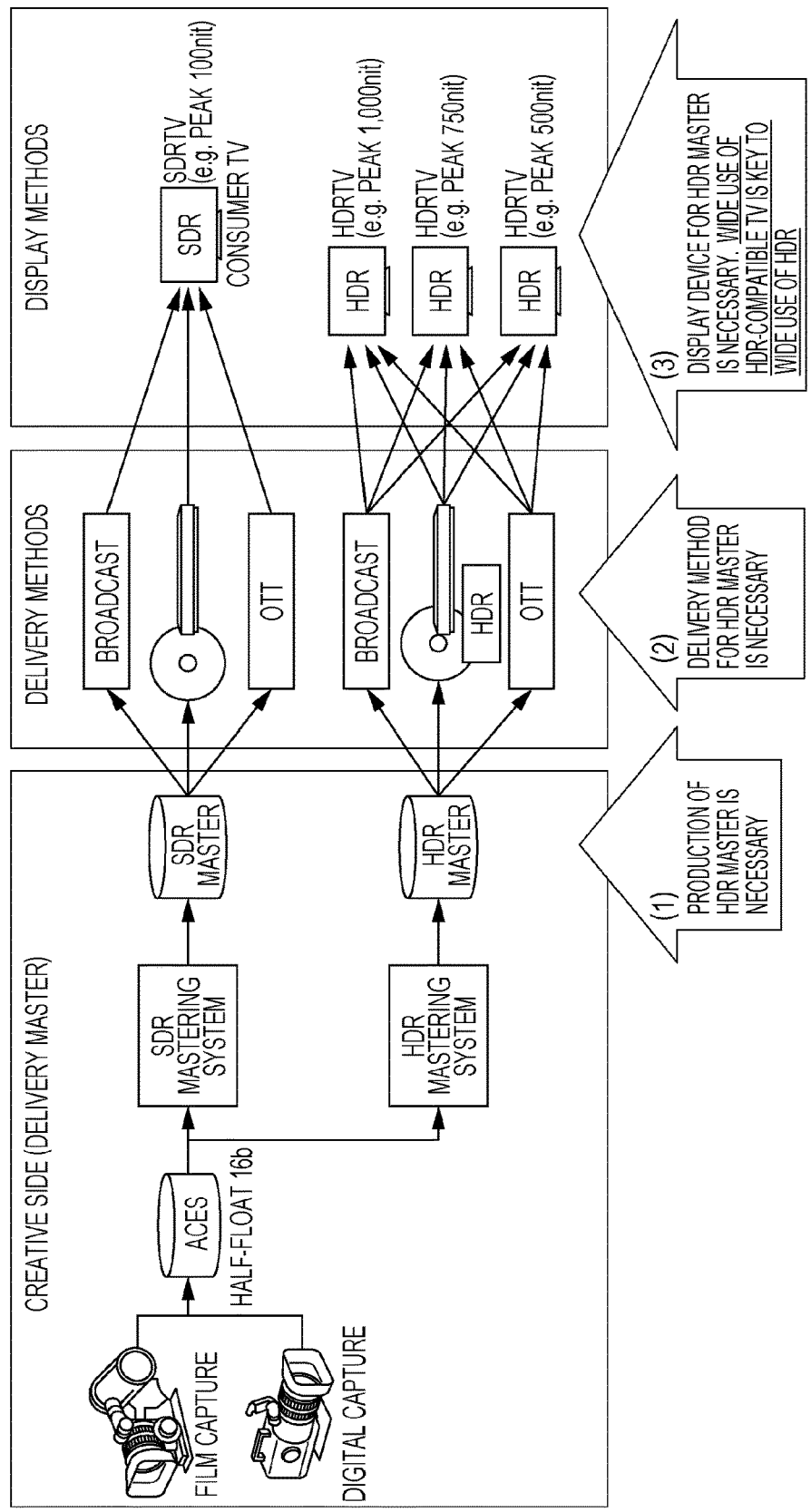
FIG. 14 is a diagram for describing a relationship among a master, delivery methods, and display devices when the HDR is introduced.

Thus, as illustrated in FIG. 14, for the HDR, too, in order to fully make use of original video expression of the HDR, it is expected that TVs (hereinafter, referred to as "HDRTVs") compatible with display of HDR-compatible video (hereinafter, referred to as "HDR display") should be newly purchased.

[3-3. SDRTV]

To a TV (hereinafter, referred to as an "SDRTV") that is compatible with only display of SDR-compatible video (hereinafter, referred to as "SDR display"), normally, an input signal with luminance values of up to 100 nit is input. For this reason, when a display capability of the SDRTV is 100 nit, then it is sufficient for the SDRTV to represent the luminance values of the input signal. However, in practice, many SDRTVs have a function for playing a video with optimum luminance values according to a viewing environment (a dark room: a cinema mode, and a bright room: a dynamic mode, etc.), and thus are capable of expressing a video with 200 nit or more. That is to say, such SDRTVs can display a video with up to a maximum luminance (e.g., 300 nit) of the display capability through selection of the display mode decided according to the viewing environment.

Figure 15A:
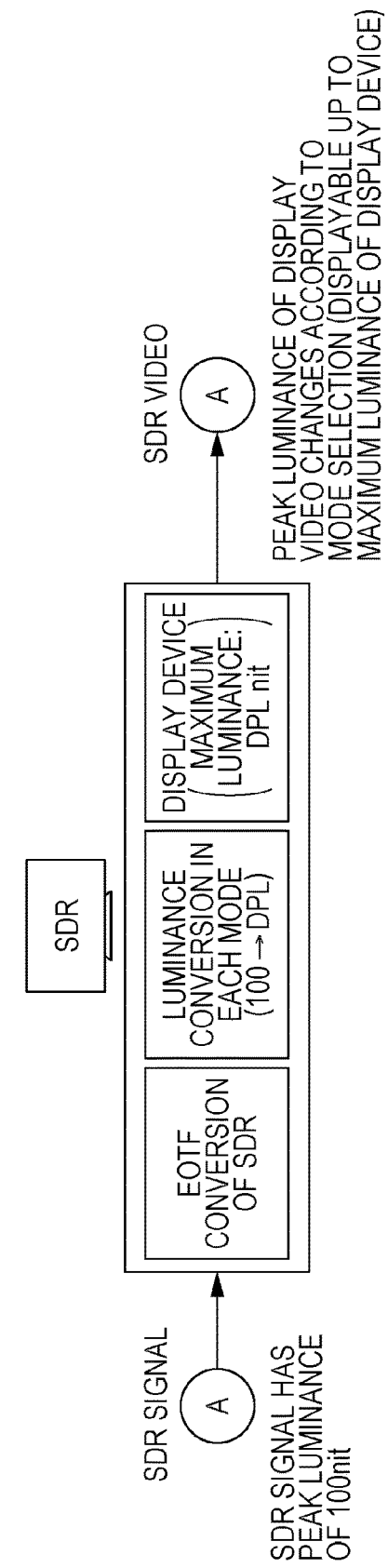
FIG. 15A is a diagram for describing an SDR display process in an SDRTV.

However, for an input signal of an SDR method to be input to the SDRTV, upper-limit luminance of the input signal is decided to be 100 nit. Thus, it is difficult to use an SDRTV's high-luminance video playback capability which exceeds 100 nit for playback of an HDR signal, as long as an input interface of the SDR method is used as a conventional manner (see FIGS. 15A and 15B).

[3-4. HDR to SDR Conversion]

Figure 16:
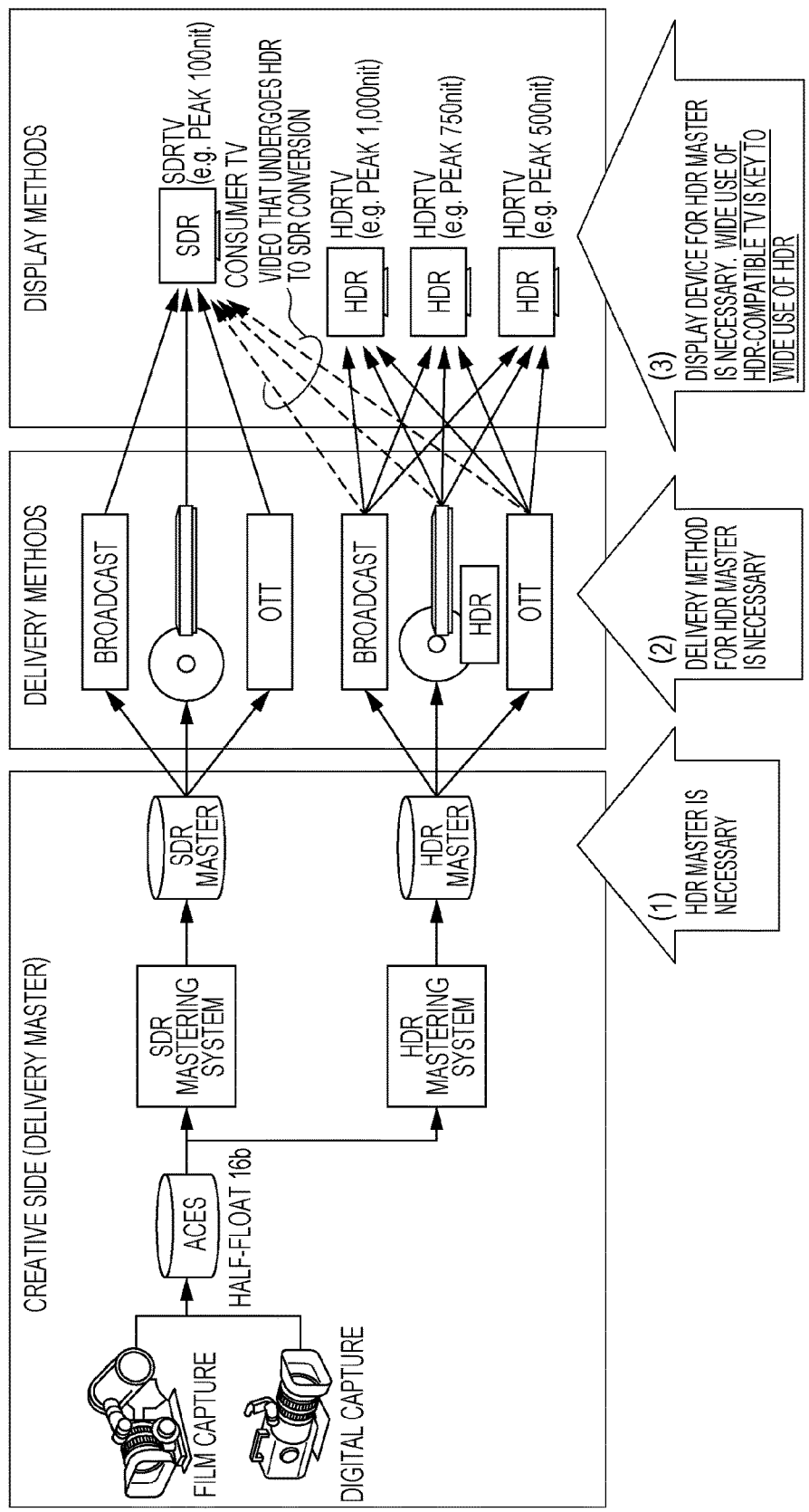
FIG. 16 is a diagram for describing conversion from the HDR to the SDR.

It is assumed that high-luminance video content (hereinafter, also referred to as "HDR content" or an "HDR video") delivered by HDR compatible broadcasting or a delivery method, such as moving image delivery through a communication network or an HDR compatible packaged medium (e.g., an HDR compatible Blu-ray Disc), is output by an SDRTV through an HDR compatible playback device (e.g., a communication STB (Set Top Box), a Blu-ray device, or an IPTV playback device). When the HDR content is played on the SDRTV, "HDR to SDR conversion", where an HDR signal compatible with the HDR is converted to an SDR signal in the SDR luminance range with a maximum value of 100 nit, is implemented such that the SDRTV can properly display a video. As a result, the SDRTV can perform display of an SDR video which is obtained by conversion from an HDR video (see FIG. 16) using the converted SDR signal.

However, in this case, too, despite the fact that a user has purchased HDR compatible content (e.g., a Blu-ray Disc or HDR IPTV content) and an HDR compatible playback device (e.g., a Blu-ray device or an HDR compatible IPTV playback device), the user can only enjoy a video with SDR video expression (SDR expression) on the SDRTV. That is to say, even when the user prepares HDR content and a playback device compatible with the HDR, the user, who does not have a display device compatible with the HDR (e.g., an HDRTV) and only has an SDRTV, cannot view a video with HDR video expression (the HDR expression).

Thus, even when the user purchases HDR content and a transmission medium (a playback device), unless the user prepares an HDRTV, the user does not understand a value of the HDR (i.e., superiority of the HDR over SDR in high image quality of the HDR). As such, since the user does not understand the value of the HDR without an HDRTV, it can be said that wide use of HDR content and HDR compatible delivery methods is decided according to a speed at which HDR TVs come into wide use.

[3-5. Two Methods that Implement HDR to SDR Conversion]

When an HDR signal is sent to a TV using a Blu-ray disc (BD), two cases can be assumed as illustrated in FIGS. 17A and 17B. FIG. 17A is a diagram for describing Case 1 in which an HDR compatible BD stores only an HDR signal compatible with the HDR. FIG. 17B is a diagram for describing Case 2 in which an HDR compatible BD stores an HDR signal compatible with the HDR and an SDR signal compatible with the SDR.

As illustrated in FIG. 17A, in Case 1, when an HDRTV is allowed to display a video obtained by playing a BD in a Blu-ray device, the Blu-ray device outputs a luminance signal stored on the BD to the HDRTV as it is without converting the luminance signal, regardless of whether the Blu-ray device plays an HDR-compatible BD (hereinafter, referred to as an "HDRBD") or an SDR-compatible BD (hereinafter, referred to as an "SDRBD"). Then, since the HDRTV can execute a display process on both an HDR signal and an SDR signal, the HDRTV executes the display process according to the input luminance signal so as to display an HDR video or an SDR video.

On the other hand, in Case 1, when an SDRTV is allowed to display a video obtained by playing a BD in the Blu-ray device, at a time of playing the HDRBD, the Blu-ray device executes a conversion process for converting an HDR signal to an SDR signal, and outputs the SDR signal obtained by the conversion process to the SDRTV. Further, when the SDRBD is played, the Blu-ray device outputs the SDR signal stored in the BD to the SDRTV as it is without converting the SDR signal. As a result, the SDRTV displays the SDR video.

Further, as illustrated in FIG. 17B, in Case 2, the HDRTV is allowed to display a video obtained by playing a BD in the Blu-ray device similarly to Case 1.

On the other hand, in Case 2, when the SDRTV is allowed to display a video obtained by playing a BD in the Blu-ray device, the Blu-ray device outputs an SDR signal stored on the BD to the SDRTV as it is without converting the SDR signal, regardless of whether the Blu-ray device plays an HDRBD or an SDRBD.

In both Case 1 and Case 2, even when a user purchases the HDRBD and the Blu-ray device compatible with the HDR, the user can only enjoy an SDR video without the HDRTV. Therefore, an HDRTV is required for the user to view an HDR video and thus wide use of HDR-compatible Blu-ray devices or the HDRBDs is expected to take a time.

[3-6. HDR to Pseudo-HDR Conversion]

Figure 18:
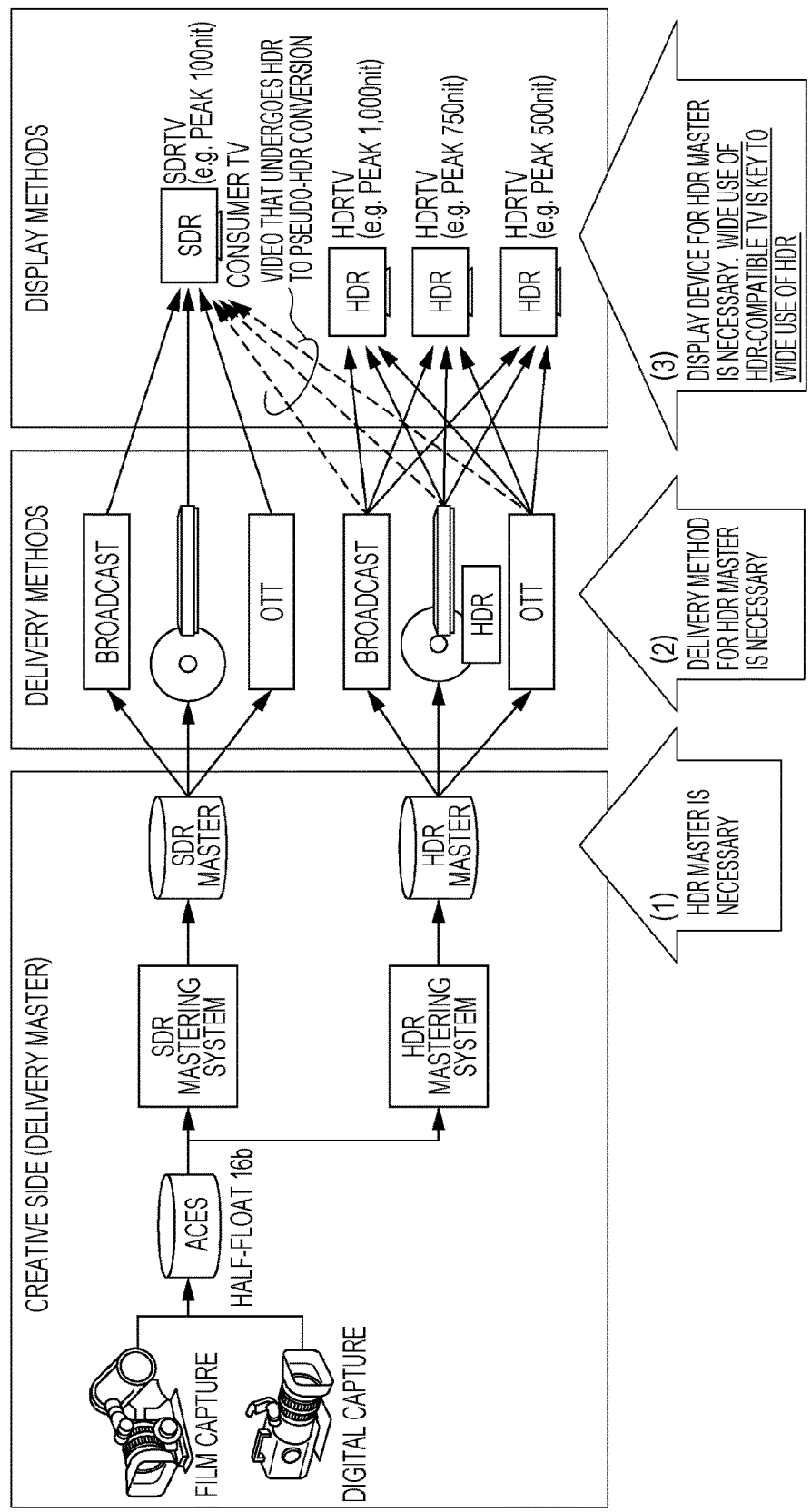
FIG. 18 is a diagram for describing a conversion process from the HDR to a pseudo-HDR.

From the above fact, in order to accelerate wide use of the HDR, it can be said to be important that commercialization of HDR content and delivery methods can be promoted without waiting for wide use of HDRTVs. For this purpose, when an user can be allowed to view an HDR signal on an existing SDRTV, not as an SDR video but as an HDR video or a pseudo-HDR video which is closer to the HDR video than an SDR video, the user can view a higher image quality video which is close to the HDR video and obviously different from an SDR video without purchasing an HDRTV. That is to say, when the user can view the pseudo-HDR video on the SDRTV, just preparation of HDR content and an HDR delivery device enables the user to view a higher image quality video than an SDR video simply without preparing an HDRTV. In short, allowing the user to view a pseudo-HDR video on the SDRTV might motivate a user to purchase HDR content and an HDR delivery device (see FIG. 18).

To achieve display of a pseudo-HDR video on the SDRTV, instead of converting an HDR signal to an SDR video signal, an "HDR to pseudo-HDR conversion process" should be achieved such that the SDRTV can properly display a video of HDR content when the HDR content is played in a configuration in which the SDRTV is connected to an HDR delivery method. The HDR to pseudo-HDR conversion process" enables a pseudo-HDR signal for displaying a video with a maximum luminance of an SDRTV's display capability, e.g., 200 nit or more to be generated by using an input of a video signal with a maximum value of 100 nit of the SDRTV, and the generated pseudo-HDR signal to be sent to the SDRTV.

[3-7. For EOTFs]

EOTFs will be described here with reference to FIGS. 19A and 19B.

Figure 19A:
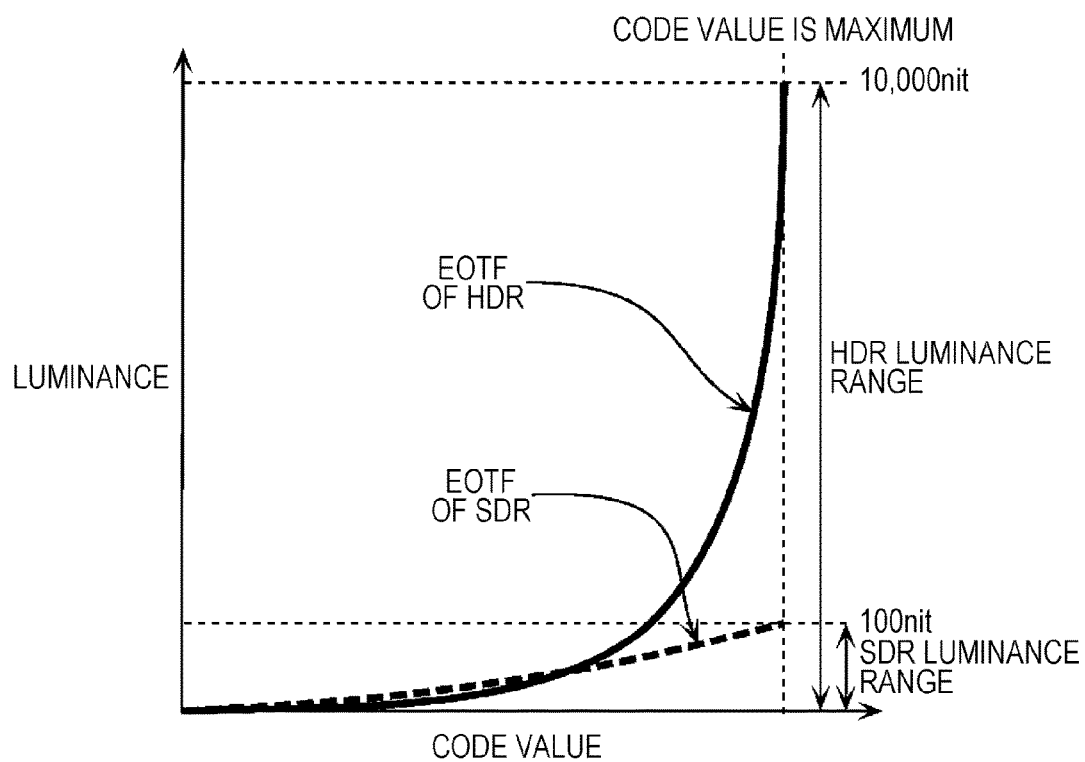
FIG. 19A is a diagram illustrating examples of EOTFs (Electro-Optical Transfer Functions) for the HDR and the SDR.

FIG. 19A is a diagram illustrating examples of EOTFs (Electro-Optical Transfer Functions) compatible with the HDR and the SDR.

An EOTF is generally called a gamma curve, and represents a correspondence between a code value and a luminance value, and is to convert a code value to a luminance value. That is to say, the EOTF is relationship information representing a correspondence relationship between a plurality of code values and luminance values.

Figure 19B:
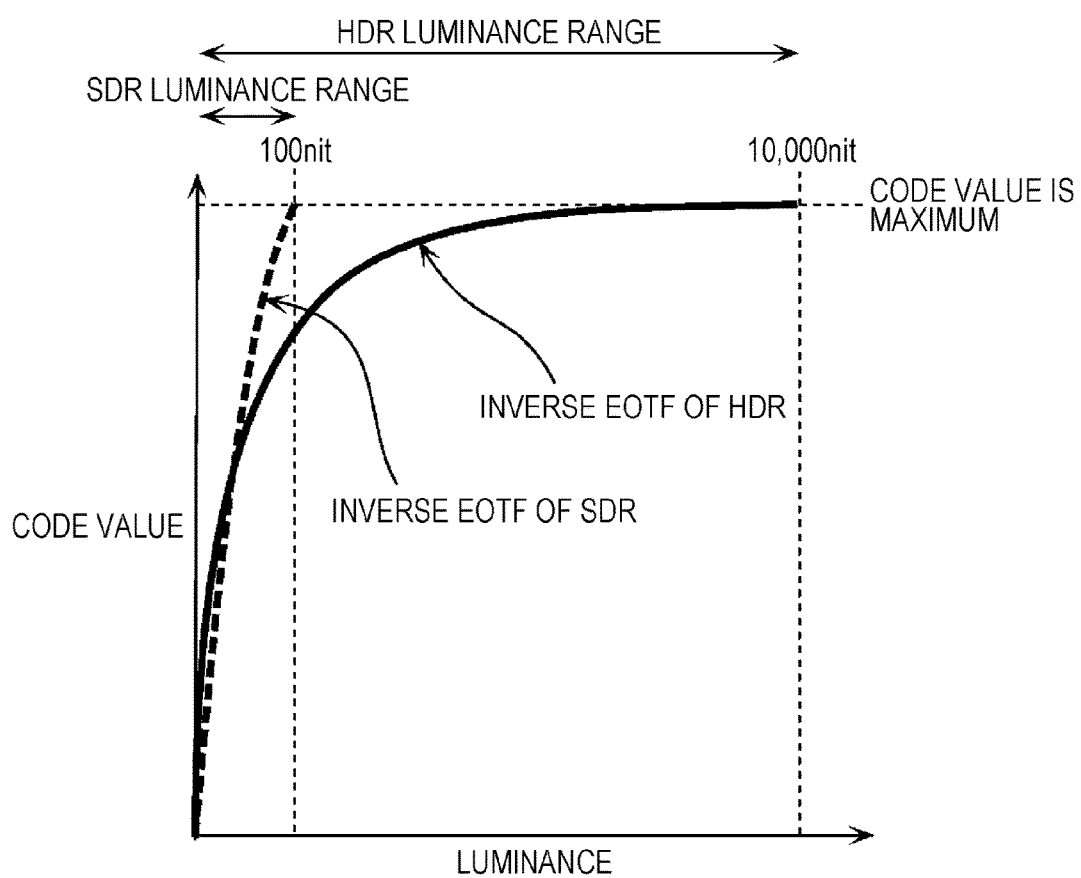
FIG. 19B is a diagram illustrating examples of inverse EOTFs compatible with the HDR and the SDR.

Further, FIG. 19B is a diagram illustrating examples of inverse EOTFs compatible with the HDR and the SDR.

An inverse EOTF represents a correspondence between a luminance value and a code value, and is to convert a luminance value to a code value by quantizing the luminance value inversely with respect to the EOTF. That is to say, the inverse EOTF is relationship information representing a correspondence relationship between luminance values and a plurality of code values. For example, when luminance values of a video compatible with the HDR are represented by 10-bit gradation code values, luminance values in an HDR luminance range of up to 10,000 nit are quantized and mapped to 1024 integer values ranging from 0 to 1023. That is to say, the luminance values in the luminance range of up to 10,000 nit (the luminance values of the video compatible with the HDR) are converted to an HDR signal having 10-bit code values by performing the quantization based on the inverse EOTF. An EOTF compatible with the HDR (hereinafter, referred to as an "HDR EOTF") or an inverse EOTF compatible with the HDR (hereinafter, referred to as an "HDR inverse-EOTF") can represent higher luminance values than an EOTF compatible with the SDR (hereinafter, referred to as an "SDR EOTF") or an inverse EOTF compatible with the SDR (hereinafter, referred to as an "SDR inverse-EOTF"). For example, in FIGS. 19A and 19B, a maximum value of luminance (peak luminance) is 10,000 nit. That is to say, the HDR luminance range includes the entire SDR luminance range, and HDR peak luminance is higher than SDR peak luminance. The HDR luminance range is a luminance range where a maximum value is increased from 100 nit, which is a maximum value of the SDR luminance range, to 10,000 nit.

For example, an example of the HDR EOTF and the HDR inverse-EOTF includes SMPTE 2084 standardized by the United States Society of Motion Picture and Television Engineers (SMPTE).

In the following specification, a luminance range, illustrated in FIGS. 19A and 19B, from 0 nit to 100 nit as the peak luminance is occasionally described as a first luminance range. Likewise, a luminance range, illustrated in FIGS. 19A and 19B, from 0 nit to 10,000 nit as the peak luminance is occasionally described as a second luminance range.

[3-8. Necessity of Pseudo-HDR]

Next, necessity of a pseudo-HDR will be described with reference to FIGS. 20A to 20C.

FIG. 20A is a diagram illustrating an example of a display process for converting an HDR signal and performing HDR display in an HDRTV.

As illustrated in FIG. 20A, when an HDR video is displayed, even if a display device is an HDRTV, the display device cannot occasionally display a maximum value in the HDR luminance range (peak luminance (HPL (HDR Peak Luminance): e.g., 1500 nit)) as it is. In this case, luminance conversion is performed to adjust a linear signal obtained after performing inverse quantization using the HDR EOTF to a maximum value in a luminance range of the display device (peak luminance (DPL (Display Peak Luminance): e.g., 750 nit)). A video signal obtained by performing the luminance conversion is, then, input into the display device, so that the display device can display an HDR video that is adjusted to the luminance range with the maximum value which is a limitation of the display device.

FIG. 20B is a diagram illustrating an example of a display process for performing HDR display using the HDR-compatible playback device and the SDRTV.

As illustrated in FIG. 20B, when an HDR video is displayed, and a display device is an SDRTV, "HDR EOTF conversion" and "luminance conversion" which are performed in an HDRTV are performed in an "HDR to pseudo-HDR conversion process" in the HDR-compatible playback device (Blu-ray device) in FIG. 20B by using a fact that a maximum value in a luminance range (peak luminance (DPL: e.g., 300 nit)) of the SDRTV that performs display exceeds 100 nit. The "luminance conversion" uses the DPL (e.g., 300 nit) which is the maximum value in the luminance range of the SDRTV. When a signal obtained by performing the "luminance conversion" can be directly input into a "display device" of the SDRTV, the same effect as that obtained by the HDRTV can be achieved even by using the SDRTV.

However, since the SDRTV does not have any means for directly accepting as input such a signal from an external source, the same effect cannot be achieved.

Figure 20C:
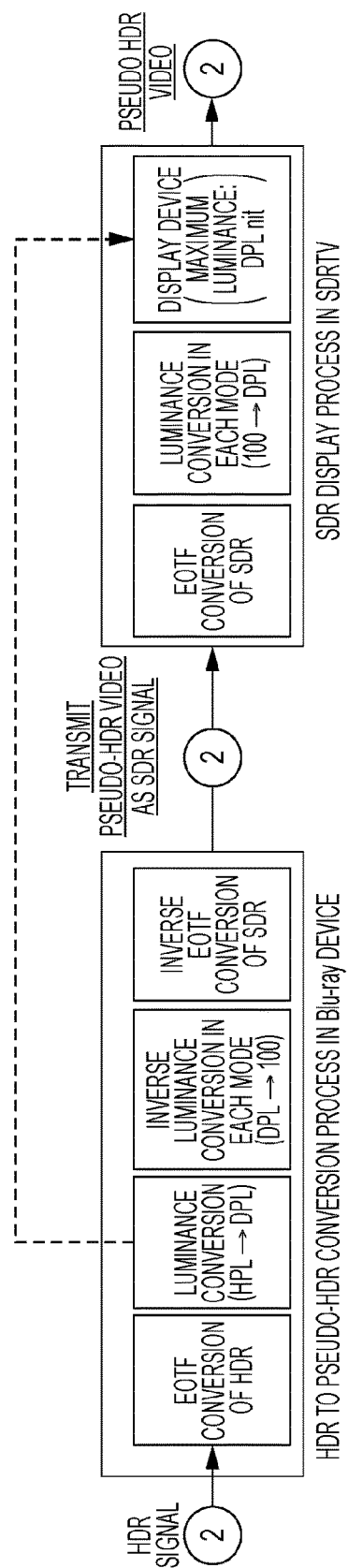
FIG. 20C is a diagram illustrating one example of a display process for performing HDR display using an HDR-compatible playback device and the SDRTV which are connected to each other through a standard interface.

FIG. 20C is a diagram illustrating an example of a display process for performing HDR display using an HDR-compatible playback device and an SDRTV which are connected to each other through a standard interface.

As illustrated in FIG. 20C, normally, such a signal that can obtain the effect of FIG. 20B should be input into the SDRTV by using an input interface (HDMI etc.) included in the SDRTV. On the SDRTV, the signal that has been input through the input interface passes through "SDR EOTF conversion", "mode-by-mode luminance conversion", and a "display device" in this order, and a video that is adjusted to a luminance range with a maximum value of the display device is displayed. For this reason, an HDR-compatible Blu-ray device generates such a signal (a pseudo-HDR signal) that can cancel out the "SDR EOTF conversion" and the "mode-by-mode luminance conversion" through which the signal passes immediately after the input interface on the SDRTV. That is to say, in the HDR-compatible Blu-ray device, the "mode-by-mode inverse luminance conversion" and the "inverse SDR EOTF conversion" are performed immediately after "HDR EOTF conversion" and "luminance conversion" that uses a peak luminance (DPL) of the SDRTV. As a result, the same effect as that achieved when a signal obtained immediately after the "luminance conversion" is input to the "display device" (a dashed line arrow in FIG. 20C) is achieved in a pseudo manner.

[3-9. Conversion Device and Display Device]

Figure 21:
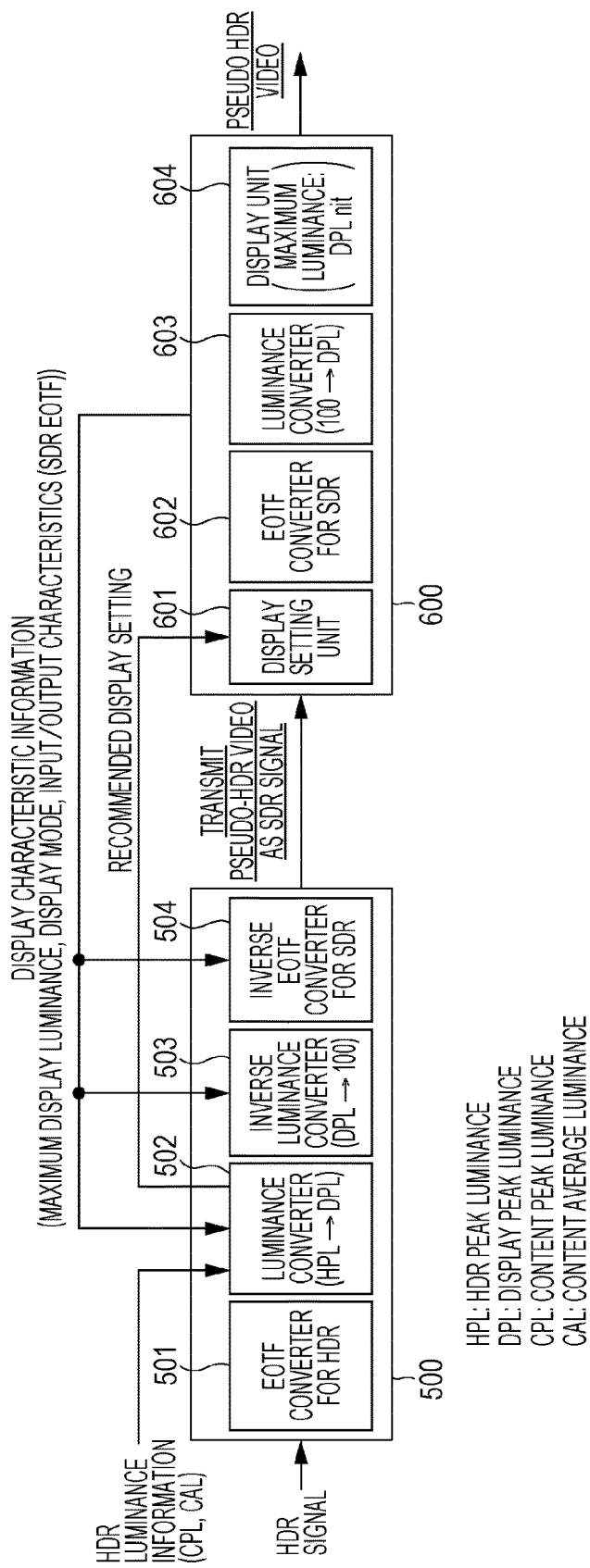
FIG. 21 is a block diagram illustrating configurations of the conversion device and the display device according to an exemplary embodiment.
Figure 22:
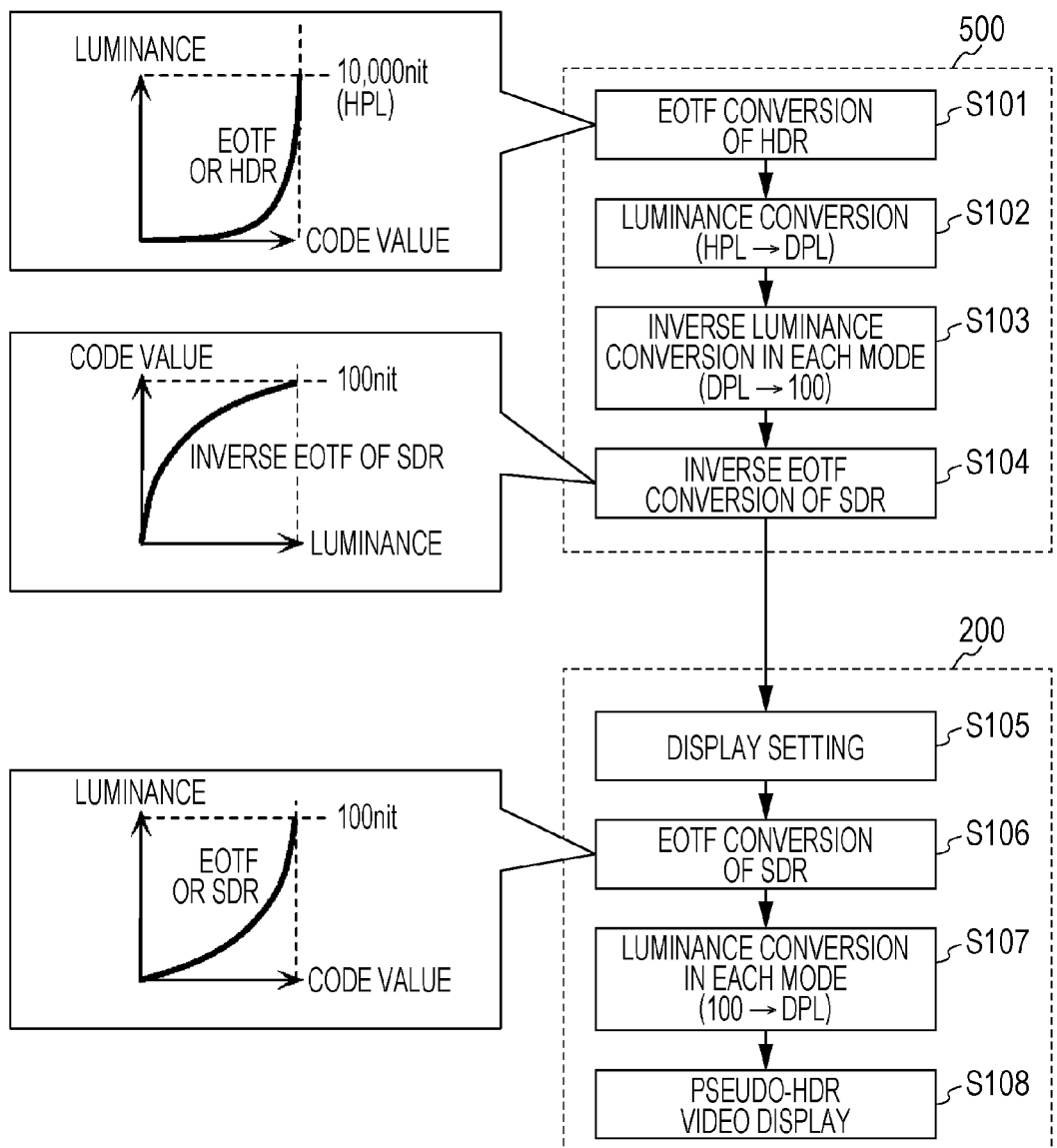
FIG. 22 is flowcharts illustrating a conversion method and a display method which are performed by the conversion device and the display device according to the exemplary embodiment.

FIG. 21 is a block diagram illustrating configurations of the conversion device and the display device of the exemplary embodiment. FIG. 22 is flowcharts illustrating a conversion method and a display method which are performed by the conversion device and the display device of the exemplary embodiment.

As illustrated in FIG. 21, conversion device 500 includes HDR EOTF converter 501, luminance converter 502, inverse luminance converter 503, and inverse SDR EOTF converter 504. Further, display device 600 includes display setting unit 601, SDR EOTF converter 602, luminance converter 603, and display unit 604.

Details of components in conversion device 500 and display device 600 will be described in description of a conversion method and a display method.

[3-10. Conversion Method and Display Method]

A conversion method to be performed by conversion device 500 will be described with reference to FIG. 22. The conversion method includes steps S101 to S104 which will be described below.

First, HDR EOTF converter 501 of conversion device 500 obtains an HDR video that has been subjected to inverse HDR EOTF conversion. HDR EOTF converter 501 of conversion device 500 performs the HDR EOTF conversion on an HDR signal of the obtained HDR video (S101). As a result, HDR EOTF converter 501 converts the obtained HDR signal to a linear signal representing luminance values. An example of the HDR EOTF includes SMPTE 2084.

Luminance converter 502 of conversion device 500, then, performs first luminance conversion for converting the linear signal converted by HDR EOTF converter 501 using display characteristics information and content luminance information (S102). In the first luminance conversion, the luminance values set in the HDR luminance range (hereinafter, referred to as "HDR luminance values") are converted to luminance values set in a display luminance range (hereinafter, referred to as "display luminance values"). Details will be described later.

From the above-described fact, HDR EOTF converter 501 functions as an obtainer that obtains an HDR signal serving as a first luminance signal that represents code values obtained by quantizing luminance values of a video. Further, HDR EOTF converter 501 and luminance converter 502 function as a converter that converts the code values represented by the HDR signal which is obtained by the obtainer to display luminance values set in the display luminance range with a maximum value (DPL) which is smaller than a maximum value of the HDR luminance range (HPL) and larger than 100 nit. The display luminance range is decided based on a luminance range of the display (display device 600).

More specifically, at step S101, HDR EOTF converter 501 decides HDR luminance values which are associated with the HDR code values in the HDR EOTF for HDR code values serving as first code values represented by the obtained HDR signal using the obtained HDR signal and the HDR EOTF. The HDR signal represents HDR code values obtained by quantizing luminance values of a video (content) using an HDR inverse-EOTF where luminance values in the HDR luminance range are associated with a plurality of HDR code values.

Further, luminance converter 502 decides display luminance values set in the display luminance range which are associated in advance with the HDR luminance values for the HDR luminance values decided at step S101, and performs first luminance conversion at step S102. In the first luminance conversion, the HDR luminance values set in the HDR luminance range are converted to display luminance values set in the display luminance range.

Further, prior to step S102, conversion device 500 obtains content luminance information as information about the HDR signal. The content luminance information includes at least one of a maximum luminance value of the video (content) (CPL: Content Peak Luminance) and an average luminance value of the video (CAL: Content Average Luminance). The CPL (first maximum luminance value) is, for example, a maximum value of luminance values of a plurality of images forming an HDR video. Further, the CAL is, for example, an average luminance value which is an average of the luminance values of the plurality of images forming the HDR video.

Further, prior to step S102, conversion device 500 obtains display characteristics information of display device 600 from display device 600. The display characteristics information is information representing display characteristics of display device 600, such as a maximum value of luminance (DPL) that can be displayed by display device 600, a display mode of display device 600 (see description made later), and input and output characteristics (EOTF compatible with the display device).

Further, conversion device 500 may transmit recommended display setting information (see description made later; hereinafter, also referred to as "setting information") to display device 600.

Inverse luminance converter 503 of conversion device 500 performs inverse luminance conversion decided according to the display mode of display device 600. As a result, inverse luminance converter 503 performs second luminance conversion for converting the luminance values set in the display luminance range to luminance values set in the SDR luminance range (0 to 100 [nit]) (S103). Details will be described later. Specifically, inverse luminance converter 503 decides SDR-compatible luminance values (hereinafter, referred to as "SDR luminance values") serving as third luminance values set in the SDR luminance range with a maximum value of 100 nit, which are associated in advance with the display luminance values, for the display luminance values obtained at step S102, and performs second luminance conversion. In the second luminance conversion, the display luminance values set in the display luminance range are converted to SDR luminance values set in the SDR luminance range.

Inverse SDR EOTF converter 504 of conversion device 500, then, performs inverse SDR EOTF conversion so as to generate pseudo-HDR video (S104). Specifically, inverse SDR EOTF converter 504 quantizes the decided SDR luminance values using an SDR (Standard Dynamic Range) inverse-EOTF (Electro-Optical Transfer Function) which is third relationship information where the luminance values in the HDR luminance range are associated with a plurality of third code values, and decides third code values obtained by the quantization. Inverse SDR EOTF converter 504, then, converts the SDR luminance values set in the SDR luminance range to an SDR signal serving as a third luminance signal that represents the third code values so as to generate a pseudo-HDR signal. The third code values are SDR-compatible code values and are hereinafter referred to as "SDR code values". That is to say, the SDR signal is represented by SDR code values obtained by quantizing the luminance values of the video using the SDR inverse-EOTF where the luminance values in the SDR luminance range are associated with a plurality of SDR code values. Conversion device 500, then, outputs the pseudo-HDR signal (SDR signal) generated at step S104 to display device 600.

Conversion device 500 performs first luminance conversion and second luminance conversion on HDR luminance values which are obtained by inversely quantizing an HDR signal so as to generate SDR luminance values compatible with pseudo-HDR. Conversion device 500, then, quantizes the SDR luminance values using the SDR EOTF so as to generate an SDR signal compatible with pseudo-HDR. The SDR luminance values are numerical values in an SDR-compatible luminance range of 0 nit to 100 nit, but since conversion based on the display luminance range is performed, the SDR luminance values are numerical values different from luminance values in the SDR-compatible luminance range of 0 nit to 100 nit, which are obtained by performing luminance conversion on the HDR luminance values using the HDR EOTF and the SDR EOTF.

A display method to be performed by display device 600 will be described below with reference to FIG. 22. The display method includes steps S105 to S108 which will be described below.

First, display setting unit 601 of display device 600 sets display settings of display device 600 using setting information obtained from conversion device 500 (S105). Display device 600 is an SDRTV. The setting information is information representing display settings to be recommended to the display device, and is information representing how pseudo-HDR video should be subjected to an EOTF and what settings are used to beautifully display the pseudo-HDR video (i.e., information for switching the display settings of display device 600 to optimal display settings). The setting information includes, for example, a gamma curve characteristic for output of the display device, a display mode such as a living mode (a normal mode) or a dynamic mode, and a numerical value of a backlight (brightness). Further, a message urging a user to change the display settings of display device 600 through a manual operation may be displayed on display device 600 (hereinafter, also referred to as an "SDR display"). Details will be described later.

Prior to step S105, display device 600 obtains an SDR signal (a pseudo-HDR signal) and setting information representing display settings to be recommended to display device 600 for video display.

Further, display device 600 only needs to obtain an SDR signal (a pseudo-HDR signal) before step S106 or may obtain the SDR signal after step S105.

SDR EOTF converter 602 of display device 600, then, performs the SDR EOTF conversion on the obtained pseudo-HDR signal (S106). Specifically, SDR EOTF converter 602 inversely quantizes the SDR signal (the pseudo-HDR signal) using an SDR EOTF. As a result, SDR EOTF converter 602 converts SDR code values represented by the SDR signal to SDR luminance values.

Then, luminance converter 603 of display device 600 performs luminance conversion decided according to the display mode set on display device 600. As a result, luminance converter 603 performs third luminance conversion for converting the SDR luminance values set in the SDR luminance range (0 to 100 [nit]) to display luminance values set in the display luminance range (0 to DPL [nit]) (S107). Details will be described later.

At steps S106 and S107, display device 600 converts third code values represented by the obtained SDR signal (the pseudo-HDR signal) into display luminance values set in the display luminance range (0 to DPL [nit]) using the setting information obtained at step S105.

More specifically, in conversion from the SDR signal (the pseudo-HDR signal) to the display luminance values, at step S106, SDR luminance values associated with the SDR code values in the SDR EOTF are decided for SDR code values represented by the obtained SDR signal by using an EOTF where the luminance values in the SDR luminance range are associated with a plurality of third code values.

In conversion to the display luminance values, display luminance values set in the display luminance range which are associated in advance with the decided SDR luminance values are decided, and third luminance conversion is performed at step S107. In the third luminance conversion, the SDR luminance values set in the SDR luminance range is converted to display luminance values set in the display luminance range.

Finally, display unit 604 of display device 600 displays a pseudo-HDR video on display device 600 based on the converted display luminance values (S108).

[3-11. First Luminance Conversion]

Figure 23A:
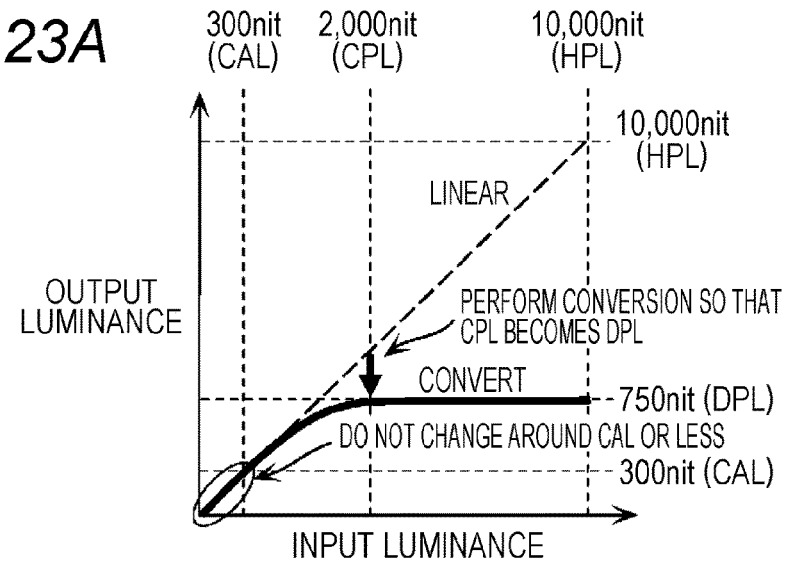
FIG. 23A is a diagram for describing first luminance conversion.

Details of the first luminance conversion (HPL to DPL) at step S102 will be described below with reference to FIG. 23A. FIG. 23A is a diagram for describing an example of the first luminance conversion.

Luminance converter 502 of conversion device 500 performs the first luminance conversion for converting a linear signal (HDR luminance values) obtained at step S101 using display characteristics information and content luminance information of a HDR video. In the first luminance conversion, the HDR luminance values (input luminance values) are converted to display luminance values (output luminance values) that do not exceed display peak luminance (DPL). The DPL is decided by using maximum luminance and a display mode of the SDR display which are display characteristics information. The display mode is, for example, mode information such as a theater mode in which darker display is performed on the SDR display, and a dynamic mode in which brighter display is performed. For example, when the maximum luminance of the SDR display is 1,500 nit and the display mode sets such brightness that is 50% of the maximum luminance, the DPL is 750 nit. Therefore, the DPL (a second maximum luminance value) is a maximum value of luminance that can be displayed by the SDR display in the currently set display mode. That is, in the first luminance conversion, the DPL serving as the second maximum luminance value is decided by using the display characteristics information which is information representing display characteristics of the SDR display.

Further, in the first luminance conversion, a CAL and a CPL included in the content luminance information are used, and luminance values smaller than or equal to near the CAL are left unchanged before and after the conversion, and only luminance values larger than or equal to near the CPL are changed. Specifically, as illustrated in FIG. 23A, in the first luminance conversion, when an HDR luminance value is smaller than or equal to the CAL, the HDR luminance value is not converted and is decided to be a display luminance value. When the HDR luminance value is larger than or equal to the CPL, the DPL serving as the second maximum luminance value is decided to be a display luminance value.

Further, in the first luminance conversion, peak luminance of the HDR video (CPL) included in the luminance information is used. When an HDR luminance value is the CPL, the DPL is decided to be a display luminance value.

Figure 23B:
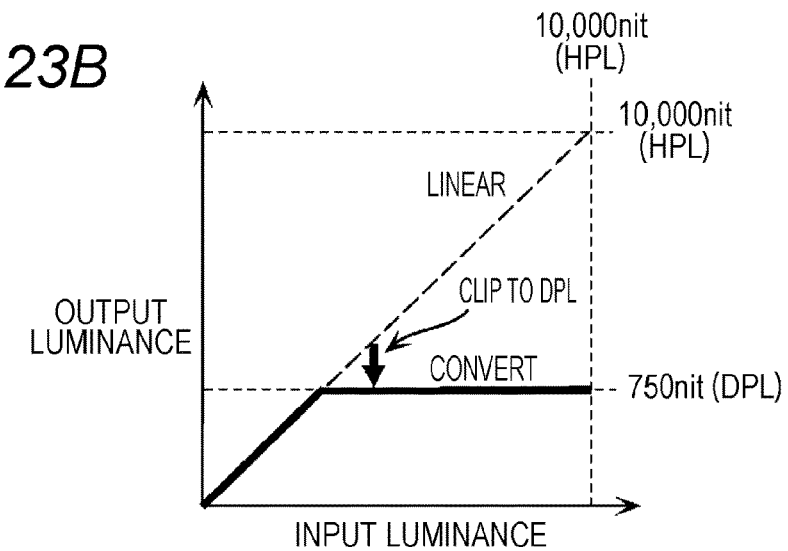
FIG. 23B is a diagram for describing another example of the first luminance conversion.

In the first luminance conversion, as illustrated in FIG. 23B, the linear signal (HDR luminance values) obtained at step S101 may be converted such that the HDR luminance values are clipped to values not exceeding the DPL. Such luminance conversion enables the processes in conversion device 500 to be simplified so that downsizing, a reduction in power, and an increase in a processing speed of the device can be achieved. FIG. 23B is a diagram for describing another example of the first luminance conversion.

[3-12. Second Luminance Conversion]

Figure 24:
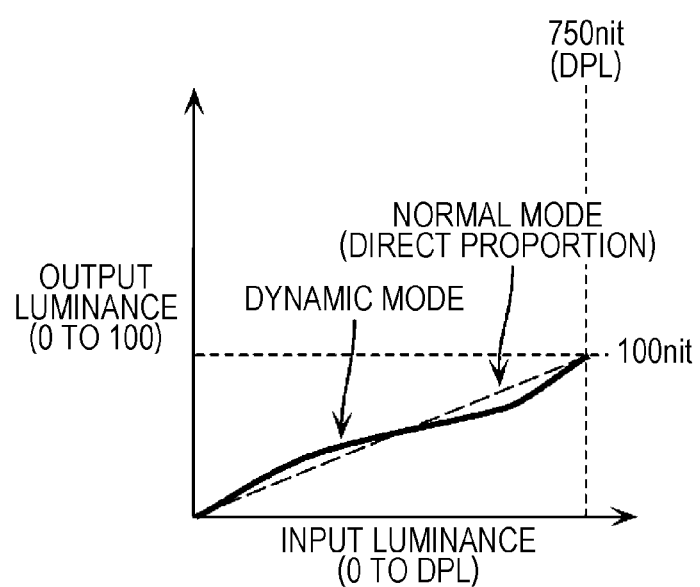
FIG. 24 is a diagram for describing second luminance conversion.

Details of the second luminance conversion (DPL to 100 [nit]) at step S103 will be described below with reference to FIG. 24. FIG. 24 is a diagram for describing the second luminance conversion.

Inverse luminance converter 503 of conversion device 500 performs inverse luminance conversion on the display luminance values in the display luminance range (0 to DPL [nit]), which are converted by the first luminance conversion at step S102, according to a display mode. The inverse luminance conversion is a process for enabling display luminance values in the display luminance range (0 to DPL [nit]) obtained after the process at step S102 to be obtained, when a luminance conversion process according to the display mode (step S107) by the SDR display is performed. That is to say, the second luminance conversion is inverse luminance conversion of the third luminance conversion.

In the second luminance conversion, the display luminance values (input luminance values) in the display luminance range are converted to SDR luminance values (output luminance values) in the SDR luminance range according to the above-described process.

In the second luminance conversion, a conversion formula is switched according to the display mode of the SDR display. For example, when the display mode of the SDR display is the normal mode, luminances are converted to directly proportional values which are directly proportional to the display luminance values. Further, in the second luminance conversion, when the display mode of the SDR display is a dynamic mode that makes high luminance pixels brighter than in the normal mode and makes low luminance pixels darker than in the normal mode, luminance conversion is performed by using an inverse function such that an SDR luminance value of a low luminance pixel is converted to a higher value than a directly proportional value which is directly proportional to a display luminance value, and an SDR luminance value of a high luminance pixel is converted to a lower value than a directly proportional value which is directly proportional to a display luminance value. That is to say, in the second luminance conversion, for the display luminance values decided at step S102, luminance values associated with the display luminance values are decided to be SDR luminance values by using luminance relationship information generated according to display characteristics information which is information representing the display characteristics of the SDR display, and the luminance conversion process is switched according to the display characteristics information. The luminance relationship information generated according to display characteristics information is, for example, information where display luminance values (input luminance values) are associated with SDR luminance values (output luminance values). The luminance relationship information is set for each display parameter (each display mode) of the SDR display as illustrated in FIG. 24.

[3-13. Display Setting]

Figure 25:
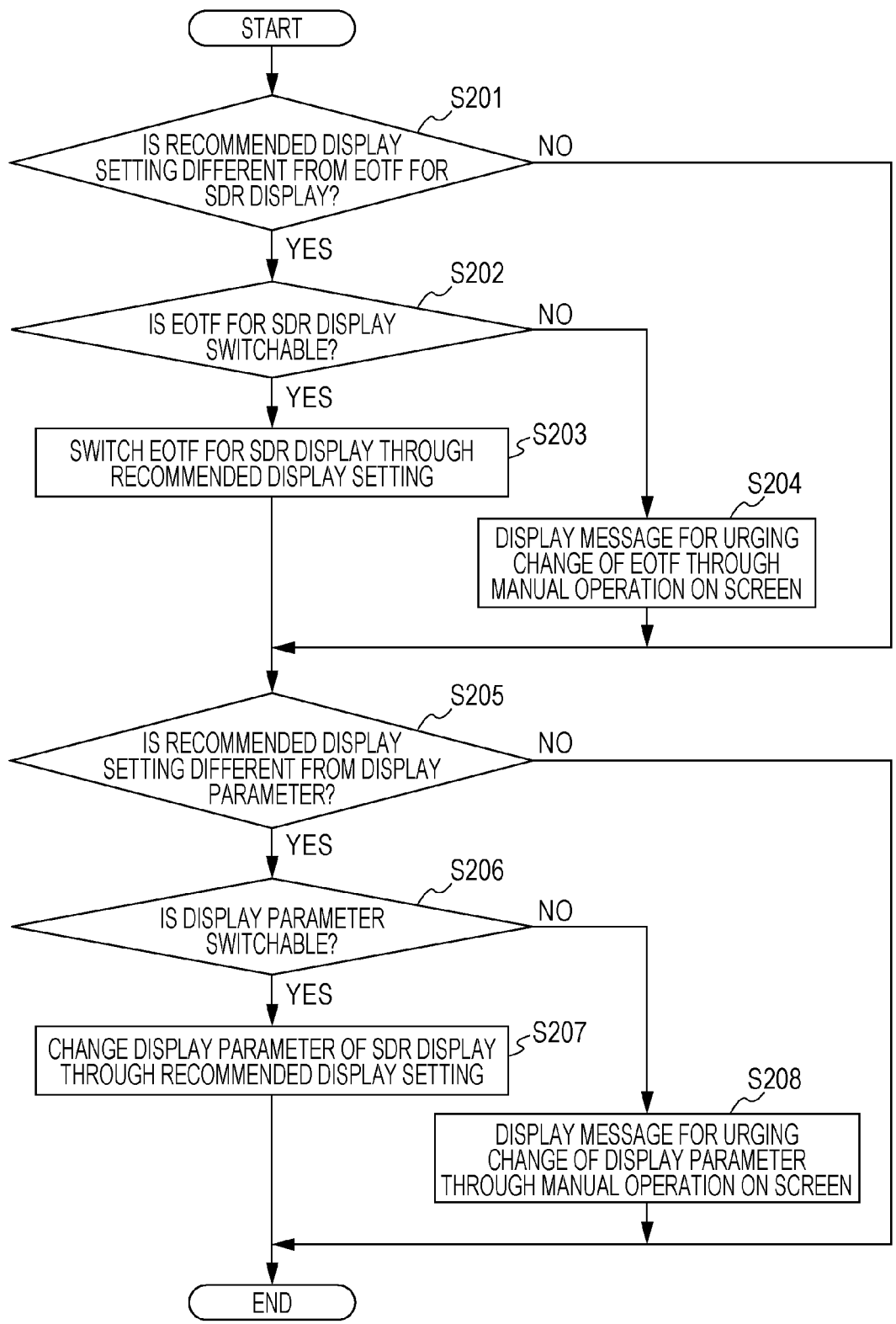
FIG. 25 is a flowchart illustrating a detailed process of display setting.

Details of display setting at step S105 will be described below with reference to FIG. 25. FIG. 25 is a flowchart illustrating a detailed process for display setting.

At step S105, display setting unit 601 of the SDR display performs the following processes at steps S201 to S208.

First, display setting unit 601 determines whether an EOTF set on the SDR display (SDR display EOTF) matches with an EOTF that is assumed upon generation of a pseudo-HDR video (an SDR signal) (S201) using setting information.

When display setting unit 601 determines that the EOTF set on the SDR display differs from the EOTF represented by the setting information (the EOTF that matches with the pseudo-HDR video) (Yes at S201), display setting unit 601 determines whether the SDR display EOTF can be switched on a system side (S202).

When display setting unit 601 determines that the SDR display EOTF can be switched, display setting unit 601 switches the SDR display EOTF to an appropriate EOTF, using the setting information (S203).

From steps S201 to S203, in the setting of display settings (S105), the EOTF set on the SDR display is set to a recommended EOTF decided according to the obtained setting information. As a result, at step S106 to be performed after step S105, SDR luminance values can be decided by using the recommended EOTF.

When the determination is made that the SDR display EOTF cannot be switched on the system side (No at S202), a message urging the user to change the EOTF through a manual operation is displayed on a screen (S204). For example, the message "Set display gamma to 2.4" is displayed on a screen. That is to say, in the setting of display settings (S105), when the EOTF set on the SDR display cannot be switched, display setting unit 601 displays a message urging the user to switch the EOTF set on the SDR display (the SDR display EOTF) to a recommended EOTF on the SDR display.

The SDR display, then displays a pseudo-HDR video (an SDR signal), but before the display, a determination is made by using the setting information, whether a display parameter of the SDR display matches with the setting information (S205).

When display setting unit 601 determines that the display parameter set on the SDR display differs from the setting information (Yes at S205), display setting unit 601 determines whether the display parameter of the SDR display can be switched (S206).

When display setting unit 601 determines that the display parameter of the SDR display can be switched (Yes at S206), display setting unit 601 switches the display parameter of the SDR display according to the setting information (S207).

At steps S204 to S207, in the setting of display settings (S105), the display parameter set on the SDR display is set to a recommended display parameter decided according to the obtained setting information.

When a determination is made that the display parameter of the SDR display cannot be switched on the system side (No at S206), a message urging the user to change the display parameter set on the SDR display through a manual operation is displayed on a screen (S208). For example, the message "Set the display mode to dynamic mode and set the backlight to a maximum value" is displayed on the screen. That is to say, in the setting (S105), when the display parameter set on the SDR display cannot be switched, a message urging the user to switch the display parameter set on the SDR display to a recommended display parameter is displayed on the SDR display.

[3-14. Third Luminance Conversion]

Figure 26:
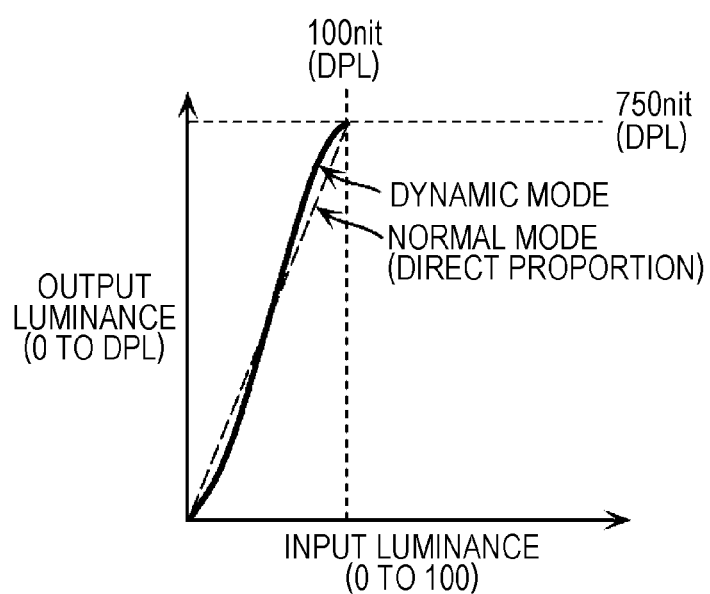
FIG. 26 is a diagram for describing third luminance conversion.

Details of the third luminance conversion (100 to DPL [nit]) at step S107 will be described below with reference to FIG. 26. FIG. 26 is a diagram for describing the third luminance conversion.

Luminance converter 603 of display device 600 converts the SDR luminance values in the SDR luminance range (0 to 100 [nit]) to the display luminance value (0 to DPL [nit]) according to the display mode set at step S105. This process is executed so as to be an inverse function of the mode-by-mode inverse luminance conversion at S103.

In the third luminance conversion, a conversion formula is switched according to the display mode of the SDR display. For example, when the display mode of the SDR display is the normal mode (i.e., when the set display parameter is a parameter corresponding to the normal mode), luminance conversion is performed such that display luminance values are converted to directly proportional values which are directly proportional to the SDR luminance values. Further, in the third luminance conversion, when the display mode of the SDR display is the dynamic mode that makes high luminance pixels brighter than in the normal mode and makes low luminance pixels darker than in the normal mode, luminance conversion is performed such that a display luminance value of a low luminance pixel is converted to a lower value than a directly proportional value which is directly proportional to an SDR luminance value, and a display luminance value of a high luminance pixel is converted to a higher value than a directly proportional value which is directly proportional to an SDR luminance value. That is to say, in the third luminance conversion, luminance values associated in advance with the SDR luminance values are decided to be display luminance values for the SDR luminance values decided at step S106 by using the luminance relationship information generated according to the display parameter representing the display setting of the SDR display, and the luminance conversion process is switched according to the display parameter. The luminance relationship information generated according to a display parameter is, for example, information where SDR luminance values (input luminance values) are associated with display luminance values (output luminance values). The luminance relationship information is set for each display parameter (each display mode) of the SDR display as illustrated in FIG. 26.

[3-15. Effects, Etc.]

A normal SDRTV has an input signal with 100 nit, but is capable of expressing a video with 200 nit or more, according to a viewing environment (a dark room: a cinema mode, and a bright room: a dynamic mode, etc.). However, since an upper-limit luminance of the input signal to the SDRTV is decided to be 100 nit, such a capability cannot be directly used.

In a case of displaying an HDR video on the SDRTV, instead of converting the HDR video to the SDR video with 100 nit or less, an "HDR to pseudo-HDR conversion process" is performed such that gradations in a luminance range exceeding 100 nit are maintained to a certain degree by using a fact that a peak luminance of the SDRTV that performs display exceeds 100 nit (normally, 200 nit or more). Hence, a pseudo-HDR video close to an original HDR can be displayed on the SDRTV.

Figure 27:
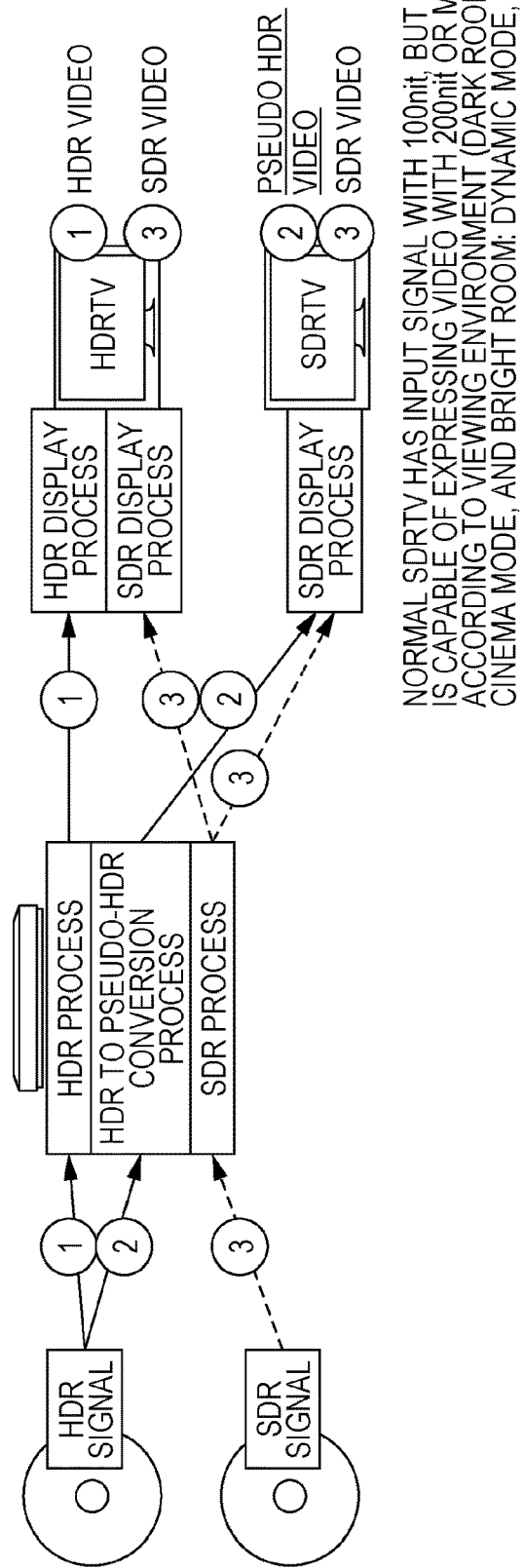
FIG. 27 is a diagram for describing the conversion process from the HDR to a pseudo-HDR.

In a state in which this "HDR to pseudo-HDR conversion process" technique is applied to Blu-ray, as illustrated in FIG. 27, when an HDR disc stores only an HDR signal and the SDRTV is connected to a Blu-ray device, the Blu-ray device performs the "HDR to pseudo-HDR conversion process" to convert the HDR signal to a pseudo-HDR signal and send the pseudo-HDR signal to the SDRTV. As a result, the SDRTV converts the received pseudo-HDR signal to luminance values and thus can display a video having a pseudo-HDR effect. When no HDR-compatible TV is provided, even the SDRTV can display the pseudo-HDR video having a higher image quality than SDR video only by preparing an HDR-compatible BD and an HDR-compatible Blu-ray device.

Therefore, although an HDR-compatible TV is considered to be required to view an HDR video, a user can view a pseudo-HDR video that allows the user to actually feel an HDR-like effect on an existing SDRTV. As a result, wide use of the HDR-compatible Blu-ray can be expected.

An HDR signal sent through broadcasting, a packaged medium such as a Blu-ray, or Internet delivery such as OTT is converted to a pseudo-HDR signal by performing an HDR to pseudo-HDR conversion process. As a result, the HDR signal can be displayed as a pseudo-HDR video on an existing SDRTV.

Fourth Exemplary Embodiment

As described above, the first exemplary embodiment is described as exemplification of techniques disclosed in the present application. However, the techniques of the present disclosure are not limited thereto, and are also applicable to the first exemplary embodiment where changes, replacements, additions, omissions, etc. are appropriately made. Further, a new exemplary embodiment can be formed by combining together the components described in the first exemplary embodiment.

Therefore, other exemplary embodiments are exemplified below as a fourth exemplary embodiment.

An HDR video is, for example, a video contained in a Blu-ray Disc, a DVD, an Internet moving image delivery site, broadcasting, or an HDD.

Conversion device 500 (the HDR to pseudo-HDR conversion processor) may be present in a disc player, a disc recorder, a set-top box, a television, a personal computer, or a smartphone. Conversion device 500 may be present in a server device on the Internet.

Display device 600 (the SDR display unit) is, for example, a television, a personal computer, or a smartphone.

Display characteristics information obtained by conversion device 500 may be obtained from display device 600 through an HDMI cable or a LAN cable by using an HDMI or other communication protocols. For the display characteristics information obtained by conversion device 500, display characteristics information included in model information of display device 600, etc. may be obtained through the Internet. Alternatively, a user may set display characteristics information in conversion device 500 by performing a manual operation. Further, display characteristics information may be obtained by conversion device 500 immediately before generation of a pseudo-HDR video (steps S101 to S104) or at timing at which device's initial setting is performed or at which a display is connected. For example, display characteristics information may be obtained immediately before conversion to display luminance values or at timing at which conversion device 500 is connected to display device 600 for the first time by an HDMI cable.

In addition, a CPL and a CAL of the HDR video may be present for content in a one-to-one manner, or may be present for each scene. That is, in the conversion method, luminance information (CPL and CAL) may be obtained that is provided for each of a plurality of scenes of video and that includes, for each scene, at least one of a first maximum luminance value which is a maximum value of luminance values of a plurality of images forming the scene; and an average luminance value which is an average of the luminance values of the plurality of images forming the scene. In first luminance conversion, for each of the plurality of scenes, display luminance values may be decided according to luminance information provided for the scene.

Further, a CPL and a CAL may be included in the same medium (a Blu-ray Disc, a DVD, etc.) as a medium including the HDR video, or conversion device 500 may obtain a CPL and a CAL from a location different from that of the HDR video, such as the Internet. That is to say, luminance information including at least one of a CPL and a CAL may be obtained as meta-information of a video, or may be obtained via a network.

Further, in the first luminance conversion (HPL to DPL) of conversion device 500, fixed values may be used instead of a CPL, a CAL, and display peak luminance (DPL). Further, the fixed values may be changeable from an external source. Further, the CPL, the CAL, and the DPL may be switched among several types. For example, the DPL may only have three types: 200 nit, 400 nit, and 800 nit, or the closest value to display characteristics information may be used.

Further, an HDR EOTF does not need to be SMPTE 2084 and other types of HDR EOTF may be used. Further, maximum luminance of the HDR video (HPL) does not need to be 10,000 nit and may be, for example, 4,000 nit or 1,000 nit.

Further, a bit width of a code value may be, for example, 16, 14, 12, 10, or 8 bits.

Further, inverse SDR EOTF conversion is decided from display characteristics information, but a fixed conversion function (which is also changeable from an external source) may be used. The inverse SDR EOTF conversion may use, for example, a function defined in Rec. ITU-R BT. 1886. Alternatively, types of inverse SDR EOTF conversion may be narrowed down to several types, and the closest type to input and output characteristics of display device 600 may be selected and used.

In addition, for the display mode, a fixed mode may be used and thus the display mode does not need to be included in display characteristics information.

Further, conversion device 500 does not need to transmit setting information, and display device 600 may have fixed display settings or does not need to change the display settings. In this case, display setting unit 601 is not required. Further, the setting information may be flag information representing whether a video is a pseudo-HDR video. For example, when the video is a pseudo-HDR video, settings may be changed to perform brightest display. That is to say, in the setting of display settings (S105), when obtained setting information represents a signal representing a pseudo-HDR video converted by using a DPL, a brightness setting of display device 600 may be switched to a setting for performing brightest display.

Further, the first luminance conversion (HPL to DPL) of conversion device 500 is performed according to, for example, the following formula.

Here, L represents a luminance value normalized to 0 to 1, and S1, S2, a, b, and M are values set based on a CAL, a CPL, and a DPL. In is a natural logarithm. V is a luminance value that is obtained after the conversion and is normalized to 0 to 1. As shown in the example of FIG. 23A, when the CAL is 300 nit, the CPL is 2,000 nit, the DPL is 750 nit, and conversion is not performed up to CAL+50 nit. When the conversion is performed for 350 nit or more, each value is, for example, as follows.

S1=350/10000
S2=2000/10000
M=750/10000
a=0.023
b=S1−a*ln(S1)=0.112105

That is to say, in the first luminance conversion, when an SDR luminance value is between the average luminance value (CAL) and the first maximum luminance value (CPL), a display luminance value corresponding to the HDR luminance value is decided by using the natural logarithm.

A conversion formula can be changed according to content by converting an HDR video using information such as content peak luminance and content average luminance of the HDR video. As a result, conversion is enabled such that HDR gradations are maintained as much as possible. Further, adverse effects such as too dark and too bright can be suppressed. Specifically, gradations are maintained as much as possible by mapping content peak luminance of an HDR video to display peak luminance. Further, overall brightness is not allowed to be changed by unchanging pixel values smaller than or equal to values near an average luminance.

Further, a conversion formula can be changed according to a display environment of the SDR display by converting an HDR video using a peak luminance value and a display mode of an SDR display. A video with HDR-ness (pseudo-HDR video) can be displayed at gradations and brightness similar to those of the original HDR video according to performance of the SDR display. Specifically, display peak luminance is decided by a maximum luminance and a display mode of the SDR display, and an HDR video is converted so as not to exceed the peak luminance value. As a result, display is performed such that gradations of the HDR video are not reduced almost at all until brightness displayable on the SDR display, and luminance values are reduced such that undisplayable brightness becomes displayable brightness.

As a result, undisplayable brightness information is trimmed and displayable brightness gradations are not lowered and thus a video can be displayed in a form close to an original HDR video. For example, for a display with a peak luminance of 1,000 nit, overall brightness is maintained by converting a video to a pseudo-HDR video whose peak luminance is suppressed to 1,000 nit, and luminance values change according to a display mode of the display. For this reason, a luminance conversion formula is changed according to the display mode of the display. When a higher luminance than the peak luminance of the display is allowed for a pseudo-HDR video, the higher luminance may be replaced by the peak luminance on the display side and displayed. In that case, the overall video becomes darker than the original HDR video. On the other hand, when lower luminance than the peak luminance of the display is converted as maximum luminance, the lower luminance is replaced by the peak luminance on the display side, and thus, the overall video becomes brighter than the original HDR video. Moreover, the luminance is lower than the peak luminance on the display side, which means that performance of the display relating to gradations is not fully used.

Further, on the display side, a pseudo-HDR video can be displayed more favorably by switching display settings using setting information. For example, when brightness is set to dark, high luminance display cannot be performed, and thus, HDR-ness is impaired. In that case, performance of the display is fully exerted by changing the display settings or displaying a message urging to change the display settings, and display of a high gradation video is enabled.

In content on Blu-ray, etc., a video signal and a graphics signal such as subtitles or a menu are multiplexed together as pieces of independent data. Upon playback, the pieces of data are decoded individually, and results of the decoding are combined together and displayed. Specifically, a subtitles or menu plane is superimposed onto a video plane.

Here, even when a video signal is an HDR signal, a graphics signal such as subtitles or a menu may be SDR signal. In HPL to DPL conversion of a video signal, the following two ways of conversion (a) and (b) can be made.

(a) A case of performing HPL to DPL conversion after synthesis of graphics
1. A graphics EOTF is converted from an SDR EOTF to an HDR EOTF.
2. Graphics obtained after the EOTF conversion are combined with a video.
3. The HPL to DPL conversion is made on a result of the synthesis.

(b) A case of performing the HPL to DPL conversion before synthesis of graphics
1. A graphics EOTF is converted from an SDR EOTF to an HDR EOTF.
2. The HPL to DPL conversion is made on a video.
3. Graphics obtained after the EOTF conversion and the video obtained after the DPL conversion are synthesized with each other.

In the case of (b), steps 1 and 2 may be interchanged.

In both of the methods (a) and (b), peak luminance of graphics is 100 nit. However, when, for example, a DPL is a high luminance such as 1000 nit, the luminance of the graphics may decrease with respect to a video obtained after the HPL to DPL conversion with the luminance of the graphics remaining at 100 nit. Particularly, negative effects are assumed, such as darkening subtitles to be superimposed on a video. Therefore, also for the graphics, luminance may be converted according to a DPL value. For example, a value of how much percent of the DPL value is to be set is prescribed for the luminance of subtitles or the like may be defined in advance, and the luminance of the subtitles may be converted based on the set value. Graphics, such as a menu, other than the subtitles can also be processed in the same manner.

The above has described a playback operation for an HDR disc that stores only an HDR signal.

Figure 28:
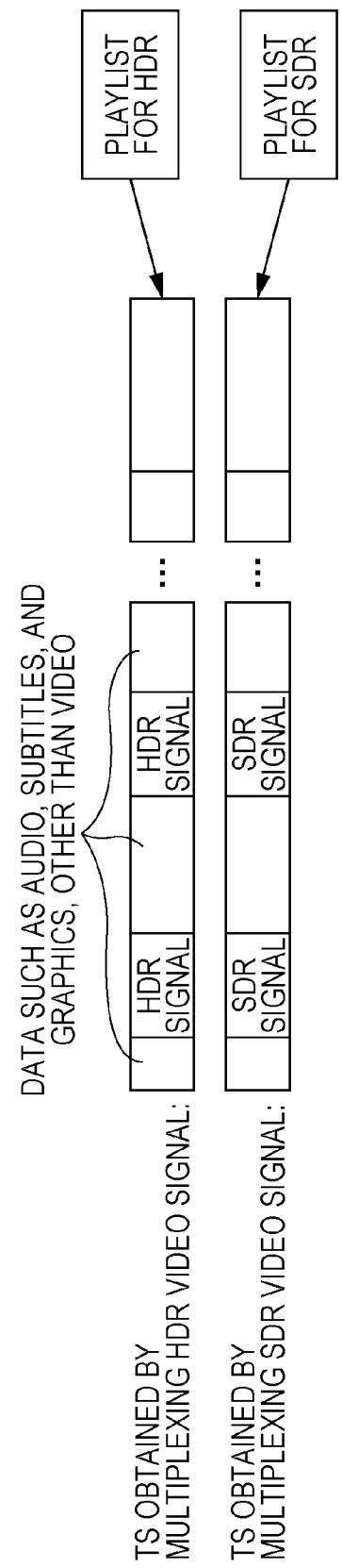
FIG. 28 is a diagram for describing a playback operation to be performed on a dual disc.

Multiplexed data stored on a dual disc which stores both an HDR signal and an SDR signal will be described below with reference to FIG. 28. FIG. 28 is a diagram for describing multiplexed data stored on a dual disc.

On the dual disc, as illustrated in FIG. 28, HDR signals and SDR signals are stored as different multiplexed streams. For example, pieces of data on a plurality of media such as a video, an audio, subtitles, and graphics are stored as one multiplexed stream on an optical disc, such as a Blu-ray, by an MPEG-2 TS-based multiplexing method that is called M2TS. These multiplexed streams are referred to by meta-data for playback control, such as a playlist. Upon playback, a player analyzes meta-data, so that a multiplexed stream to be played or individual language data stored in a multiplexed stream is selected. The present example shows a case in which playlists for HDR and for SDR are stored individually, and each playlist refers to an HDR signal or an SDR signal. Further, identification information representing that both HDR signals and SDR signals are stored may be provided separately.

Both the HDR signal and the SDR signal are multiplexed into the same multiplexed stream. However, since multiplexing needs to be performed so as to satisfy a buffer model such as T-STD (System Target Decoder) defined in MPEG-2 TS, it is particularly difficult to multiplex two pieces of video with a high bit rate within a range of predetermined data reading rates. For this reason, it is desirable that a multiplexed stream is demultiplexed.

Data such as an audio, subtitles, or graphics needs to be stored in each multiplexed stream and thus an amount of data increases compared to a case of multiplexing into one stream. However, for the increase in the amount of data, an amount of video data can be reduced by using a video coding method with a high compression ratio. For example, an improvement in a compression ratio by a factor of 1.6 to 2 is expected by changing MPEG-4 AVC which is used for a conventional Blu-ray to HEVC (High Efficiency Video Coding). Further, only a combination that can fit to a capacity of an optical disc may be allowed as content to be stored on a dual disc by prohibiting storing of two 4Ks. The combination is a combination of two 2Ks or 2K and 4K, such as a combination of 2K HDR and SDR or a combination of 4K SDR and 2K HDR.

In the conversion method of the present disclosure, when an HDR video is displayed on an SDRTV, an "HDR to pseudo-HDR conversion process" is implemented instead of the conversion from the HDR video to the SDR video with 100 nit or less. In this process, conversion is made such that gradations in regions exceeding 100 nit are maintained to a certain degree by using a fact that the peak luminance of the SDRTV that performs display exceeds 100 nit (normally, 200 nit or more), the HDR video is converted to a pseudo-HDR video close to an original HDR, and thus the pseudo-HDR video can be displayed on the SDRTV.

Further, in the conversion method, a conversion method for the "HDR to pseudo-HDR conversion process" may be switched according to display characteristics (a maximum luminance, input and output characteristics, and a display mode) of the SDRTV.

As a method for obtaining display characteristics information, the following methods are considered: (1) display characteristics information is automatically obtained through an HDMI or a network; (2) display characteristics information is generated by allowing the user to input information such as a manufacturer's name and a product number; and (3) display characteristics information is obtained from a cloud or the like by using information such as a manufacturer's name and a product number.

Further, as timing of obtaining display characteristics information in conversion device 500, the following timing is considered: (1) display characteristics information is obtained immediately before making pseudo-HDR conversion; and (2) display characteristics information is obtained when conversion device 500 is connected to display device 600 (SDRTV) for the first time (when a connection is established).

Further, in the conversion method, the conversion method may be switched according to luminance information (a CAL, a CPL) of an HDR video.

For example, as a method for obtaining luminance information of an HDR video in conversion device 500, for example, the following methods are considered: (1) luminance information is obtained as meta-information associated with an HDR video; (2) luminance information is obtained by allowing a user to input title information of content; and (3) luminance information is obtained from a cloud or the like by using the input information input by the user.

Further, for details of the conversion method, (1) conversion is made so as not to exceed a DPL, (2) conversion is made such that a CPL becomes the DPL, (3) luminances lower than or equal to a CAL and a neighborhood of the CAL are not changed, (4) conversion is made by using a natural logarithm, and (5) a clipping process is executed at the DPL.

Further, in the conversion method, in order to enhance the pseudo-HDR effect, display settings of an SDRTV, such as a display mode and a display parameter are transmitted to display device 600 to switch the display settings. For example, a message urging a user to perform display settings may be displayed on a screen.

Fifth Exemplary Embodiment

[5-1. Types of Discs]

Figure 30:
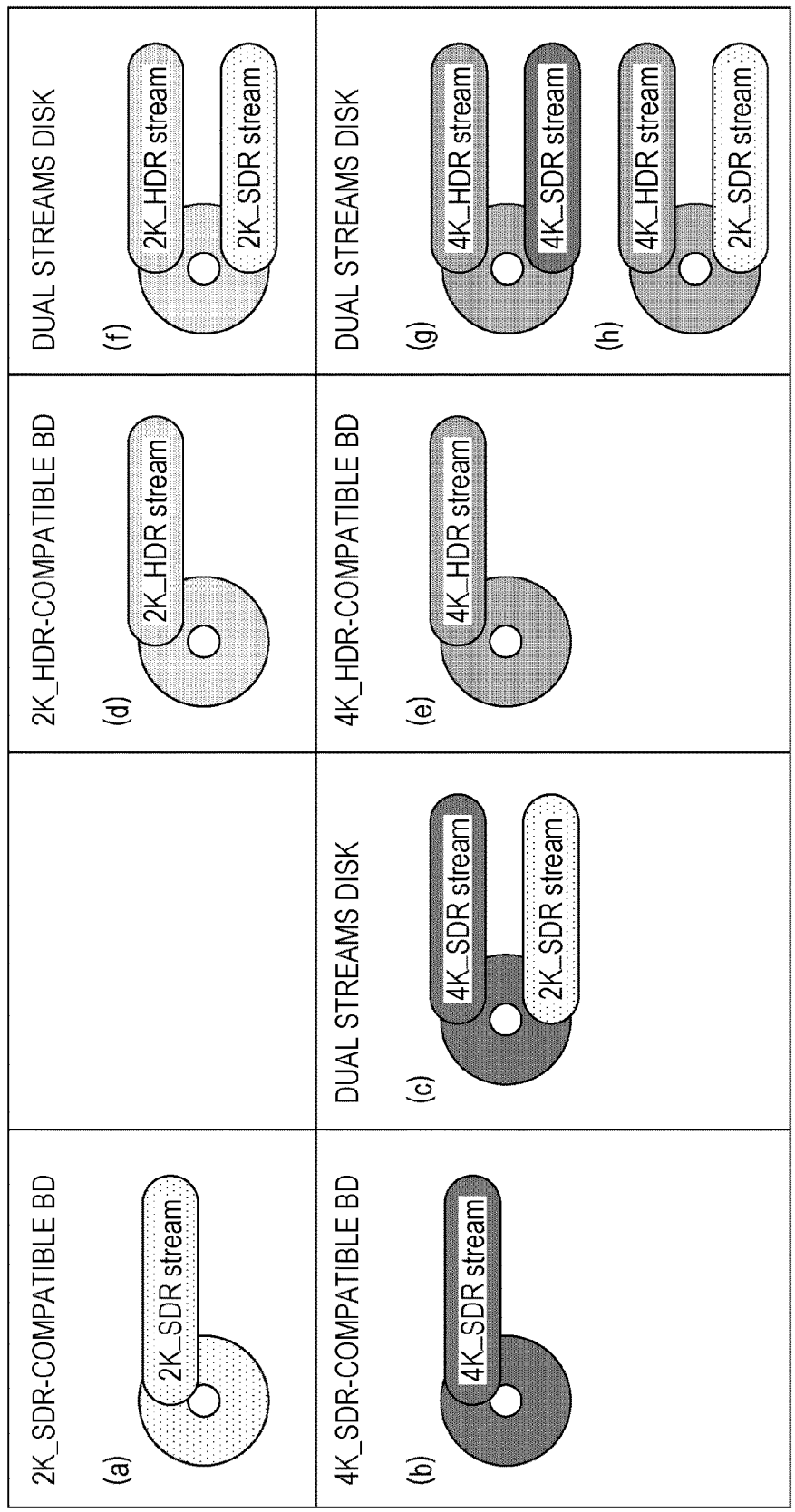
FIG. 30 is a diagram illustrating more details of the types of BDs.

A fifth exemplary embodiment will be described below. As described above, with an achievement of a high resolution and a high luminance range of display devices, plural types of Blu-ray Discs that match with specifications of the display devices are provided. FIG. 29 is a diagram illustrating types of BDs. FIG. 30 is a diagram illustrating more details of the types of BDs. A playback device (a Blu-ray device) plays content recorded on a BD which is inserted into the playback device and displays the content on a display device. As illustrated in FIGS. 29 and 30, in the following third exemplary embodiment, a BD which stores a video signal whose resolution is a first resolution and whose luminance range is a first luminance range is described as a 2K_SDR-compatible BD ((a) of FIG. 30). The video signal whose resolution is the first resolution and whose luminance range is the first luminance range is stored as a stream on the BD. The stream is described as a 2K_SDR stream. The 2K_SDR-compatible BD is a conventional BD.

Further, a BD which stores a video signal whose resolution is a second resolution and whose luminance range is the first luminance range is described as a 4K_SDR-compatible BD. The video signal whose resolution is the second resolution and whose luminance range is the first luminance range is stored as a stream on the BD. The stream is described as a 4K_SDR stream ((b) of FIG. 30).

Likewise, a BD which stores a video signal whose resolution is the first resolution and whose luminance range is a second luminance range is described as a 2K_HDR-compatible BD. The video signal whose resolution is the first resolution and whose luminance range is the second luminance range is stored as a stream on the BD. The stream is described as a 2K_HDR stream ((d) of FIG. 30).

Further, a BD which stores a video signal whose resolution is the second resolution and whose luminance range is the second luminance range is described as a 4K_HDR-compatible BD. The video signal whose resolution is the second resolution and whose luminance range is the second luminance range is stored as a stream on the BD. The stream is described as a 4K_HDR stream ((e) of FIG. 30).

The first resolution is, for example, so-called 2K (1920×1080, 2048×1080) resolution, but may be any resolution including such resolution. In the fifth exemplary embodiment, the first resolution may be simply described as 2K.

Further, the second resolution is so-called 4K (3840×2160, 4096×2160) resolution, but may be any resolution including such resolution. The second resolution is a resolution having a larger number of pixels than that of the first resolution.

The first luminance range is, for example, SDR (a luminance range with a peak luminance of 100 nit) described so far. The second luminance range is, for example, HDR (a luminance range with a peak luminance exceeding 100 nit) described so far. The second luminance range includes the entire first luminance range, and the peak luminance of the second luminance range is higher than the peak luminance of the first luminance range.

As illustrated in (c), (f), (g), and (h) of FIG. 30, a dual-stream disc that is compatible with a plurality of video expressions with a single BD is considered. The dual-stream disc is a BD which stores a plurality of video signals for playing the same content. At least one of the resolution and the luminance range differs between the plurality of video signals.

Specifically, a dual-stream disc illustrated in (c) of FIG. 30 is a BD which stores a 4K_SDR stream and a 2K_SDR stream. A dual-stream disc illustrated in (f) of FIG. 30 is a BD which stores a 2K_HDR stream and a 2K_SDR stream.

A dual-stream disc illustrated in (g) of FIG. 30 is a BD which stores a 4K_HDR stream and a 4K_SDR stream. A dual-stream disc illustrated in (h) of FIG. 30 is a BD which stores a 4K_HDR stream and a 2K_SDR stream.

The dual-stream disc illustrated in (c) of FIG. 30 is not essential because the Blu-ray device can perform down-conversion (hereinafter, also described as down-convert) of resolution from 4K to 2K.

[5-2. Details of the Types of Discs]

Figure 31:
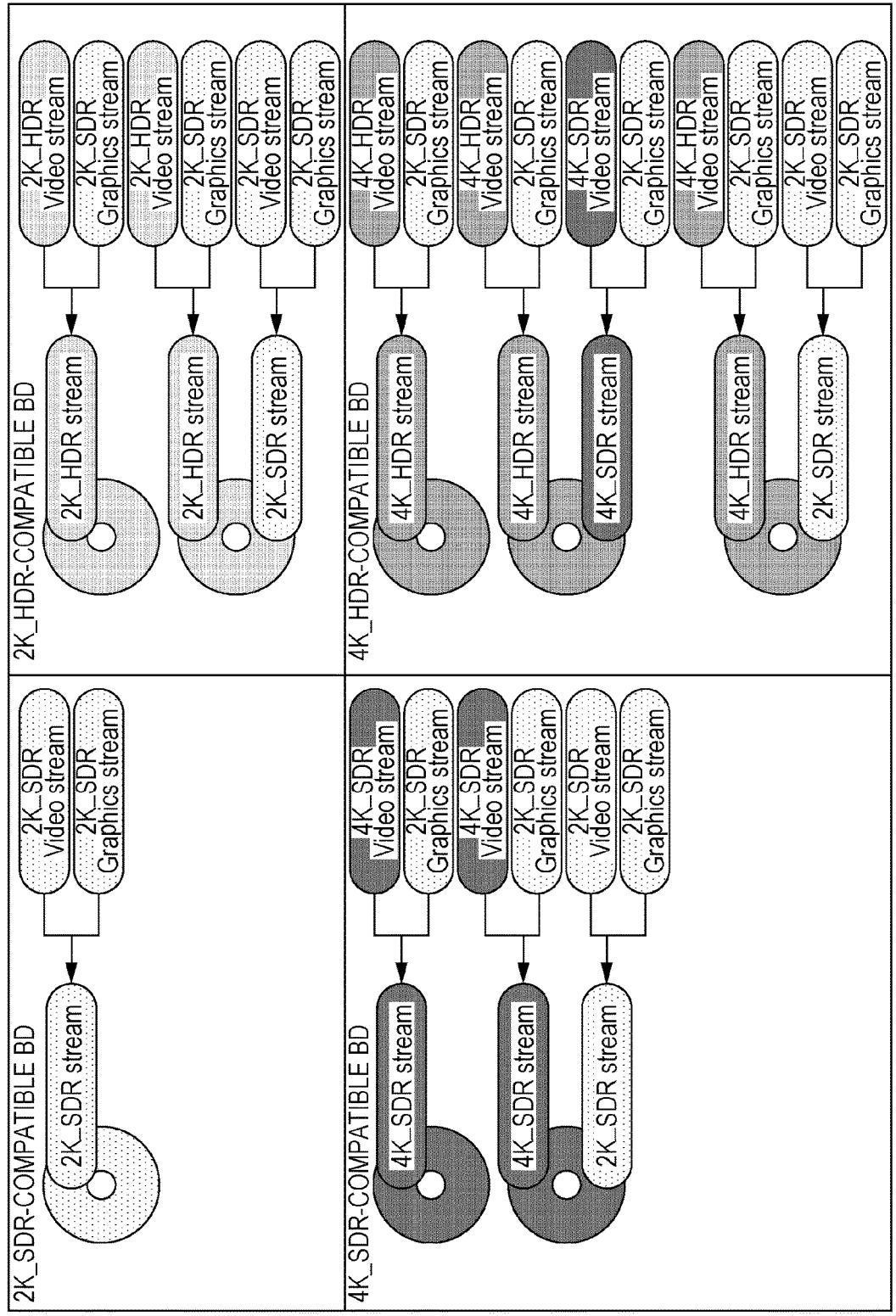
FIG. 31 is a diagram illustrating an example of combinations of video streams and graphics streams recorded on discs including BDs and dual-stream discs.

FIG. 31 is a diagram illustrating an example of a combination of a video stream and a graphics stream recorded on each disc for BDs including dual-stream discs.

In FIG. 31, taking into account trouble of creating content, a graphics stream is recorded at 2K resolution and in an SDR luminance range, regardless of resolution and a luminance range of a corresponding video stream. A graphics stream can be shared among all of a 2K_SDR stream, a 4K_SDR stream, a 2K_HDR stream, and a 4K_HDR stream. In this case, both conversion of a resolution of the graphics stream from 2K to 4K and conversion of a luminance range of the graphics stream from the SDR into the HDR are performed by a Blu-ray device.

Figure 32:
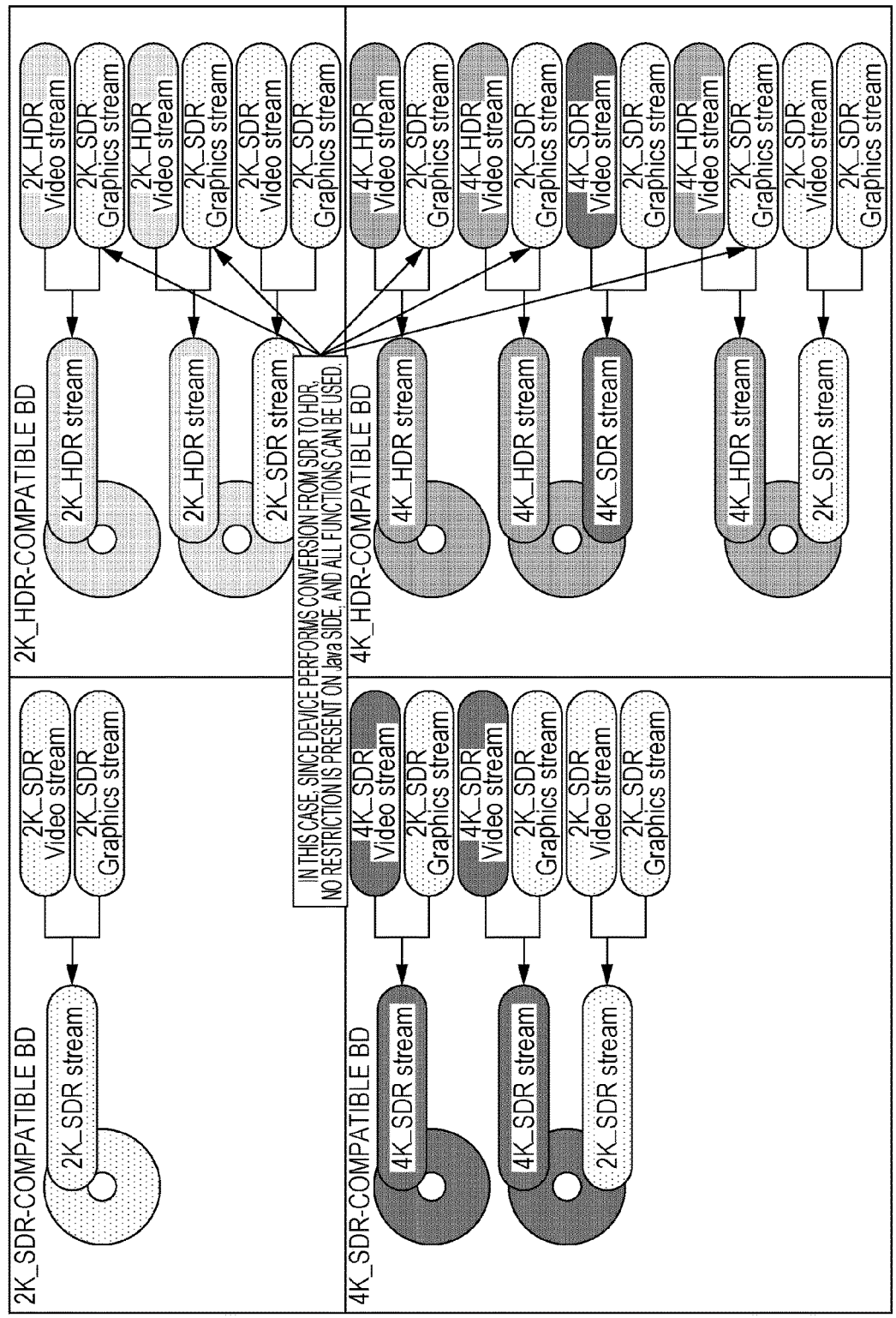
FIG. 32 is a diagram illustrating an example of combinations of video streams and graphics streams recorded on discs including BDs and dual-stream discs.

In this case, as illustrated in FIG. 32, since the Blu-ray device makes conversion from the SDR to the HDR, no restriction is present on a Java side, and all functions can be used.

Figure 33:
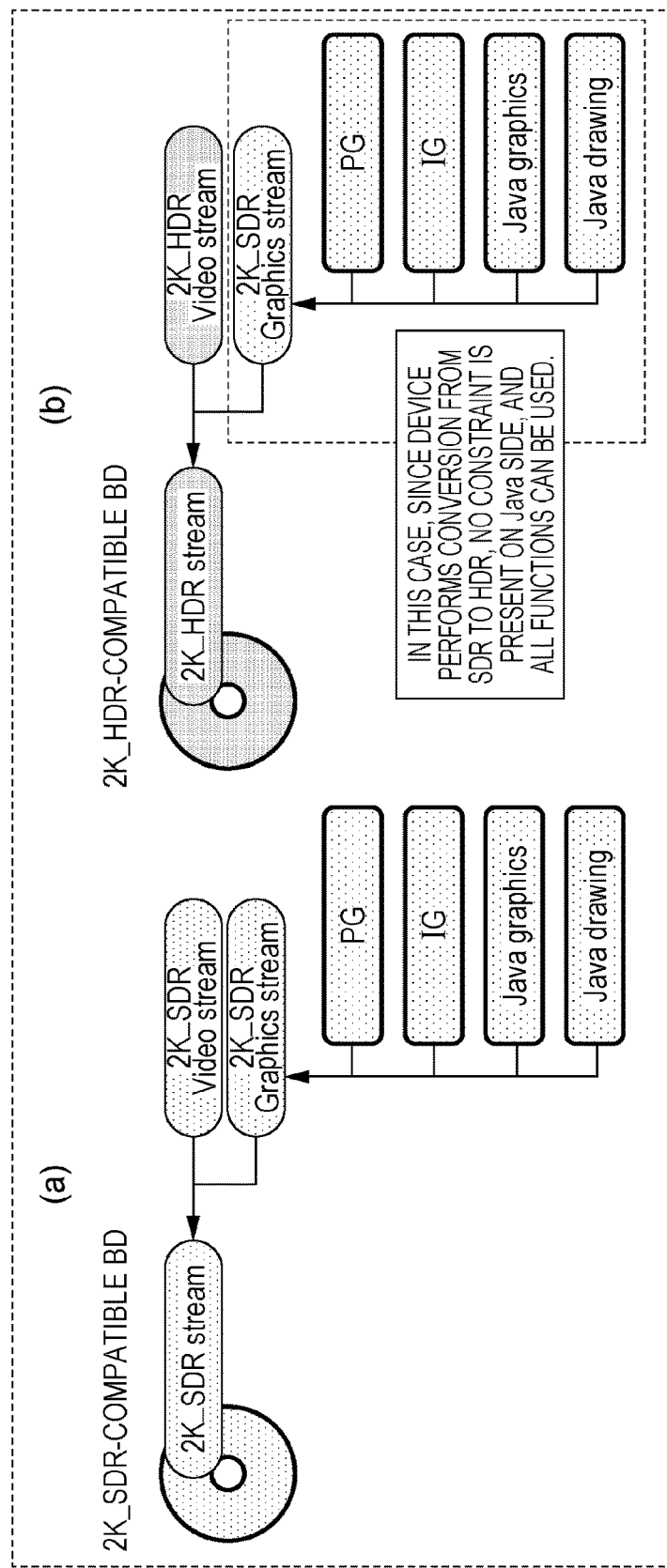
FIG. 33 is a diagram illustrating one example of the graphics stream.

FIG. 33 is a diagram illustrating details of the graphics streams illustrated in FIG. 31. In the example illustrated in FIG. 33, SDR graphics (PG, IG, Java Graphics, Java Drawing) are used also for the HDR video stream. In this case, all functions including a Java drawing command (Java Drawing) are not restrained. Specifically, since the Blu-ray device makes conversion from the SDR to the HDR, no restriction is present on the Java side, and all functions can be used.

Figure 34:
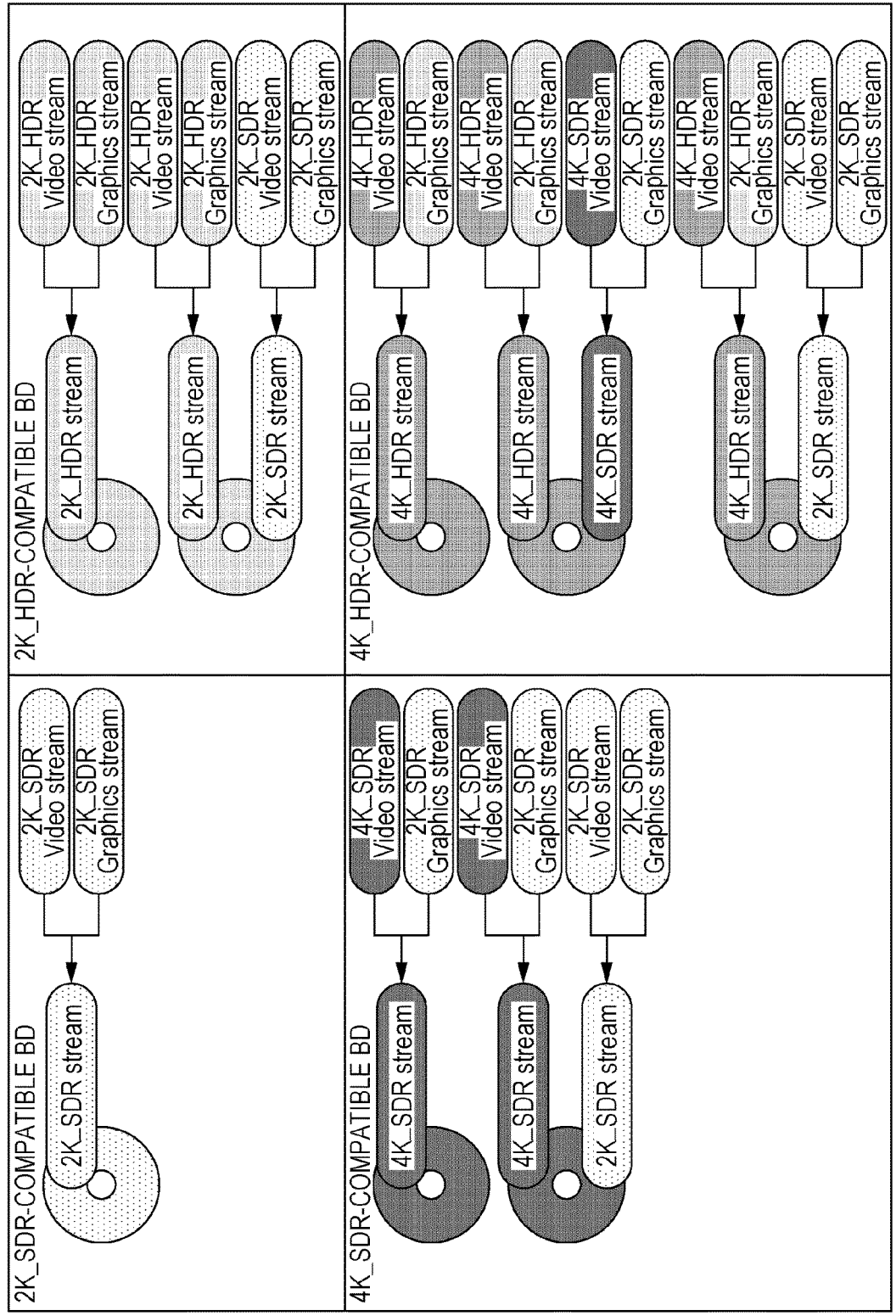
FIG. 34 is a diagram illustrating an example of combinations of video streams and graphics streams recorded on discs including a BD and a dual-stream disc.

FIG. 34 is a diagram illustrating examples of a combination of a video stream and a graphics stream recorded on each disc for BDs including dual-stream discs.

In FIG. 34, taking into account trouble of creating content (BD), a graphics stream is recorded at 2K resolution regardless of a resolution of a corresponding video stream. A graphics stream can be shared between a 2K_SDR stream and a 4K_SDR stream. However, a graphics stream is recorded in a luminance range that matches with a luminance range of a corresponding video stream. When a video stream is an HDR video stream, an HDR graphics stream is recorded. When a video stream is an SDR video stream, an SDR graphics stream is recorded. Conversion of a graphics stream from the SDR to the HDR is made upon creation of content.

Figure 35:
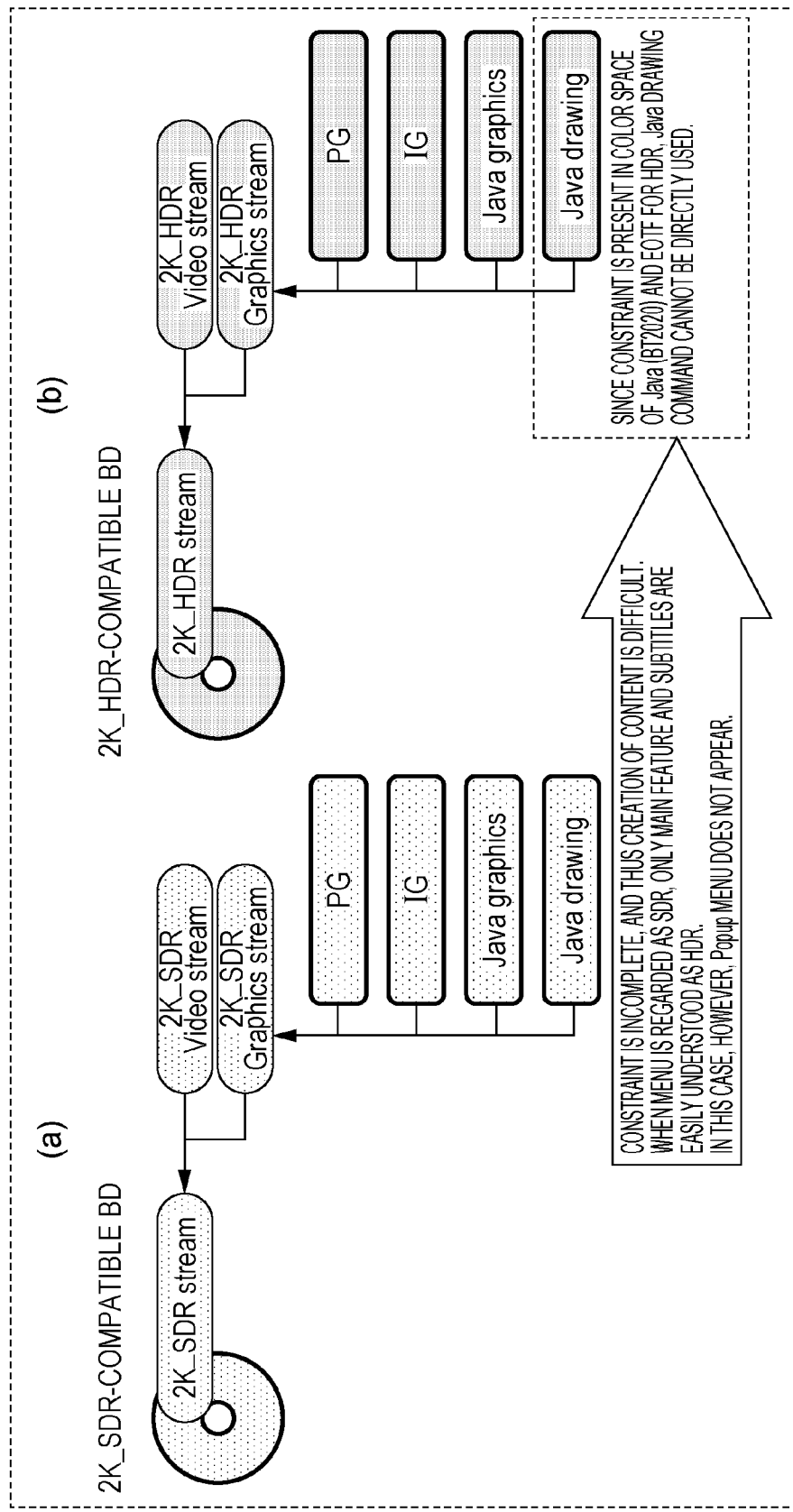
FIG. 35 is a diagram illustrating examples of the graphics streams.

FIG. 35 is a diagram illustrating details of graphics streams illustrated in FIG. 34.

An SDR graphics stream and an HDR graphics stream have the same basic specifications of a graphics stream, but the HDR graphics stream has constraints such as Java color space (BT 2020 for 4K) and an EOTF (EOTF for HDR). For this reason, the Java drawing command cannot be used as it is.

That is to say, a 4K_SDR-compatible BD, a 2K_HDR-compatible BD, and a 4K_HDR-compatible BD need to inhibit the Java drawing command.

In specification of values of colors and luminances, the Java drawing command can be used by specifying values that assume results of EOTF conversion (SDR→HDR), color space (BT709→BT2020) conversion or the like.

In this case, different graphics streams should be created according to whether the video stream is an SDR or HDR stream or whether the color space is BT709 or BT2020, and thus the creation of content is difficult. Therefore, it is easily understood that a menu is the SDR, and only a main feature and subtitles are HDR.

Figure 36:
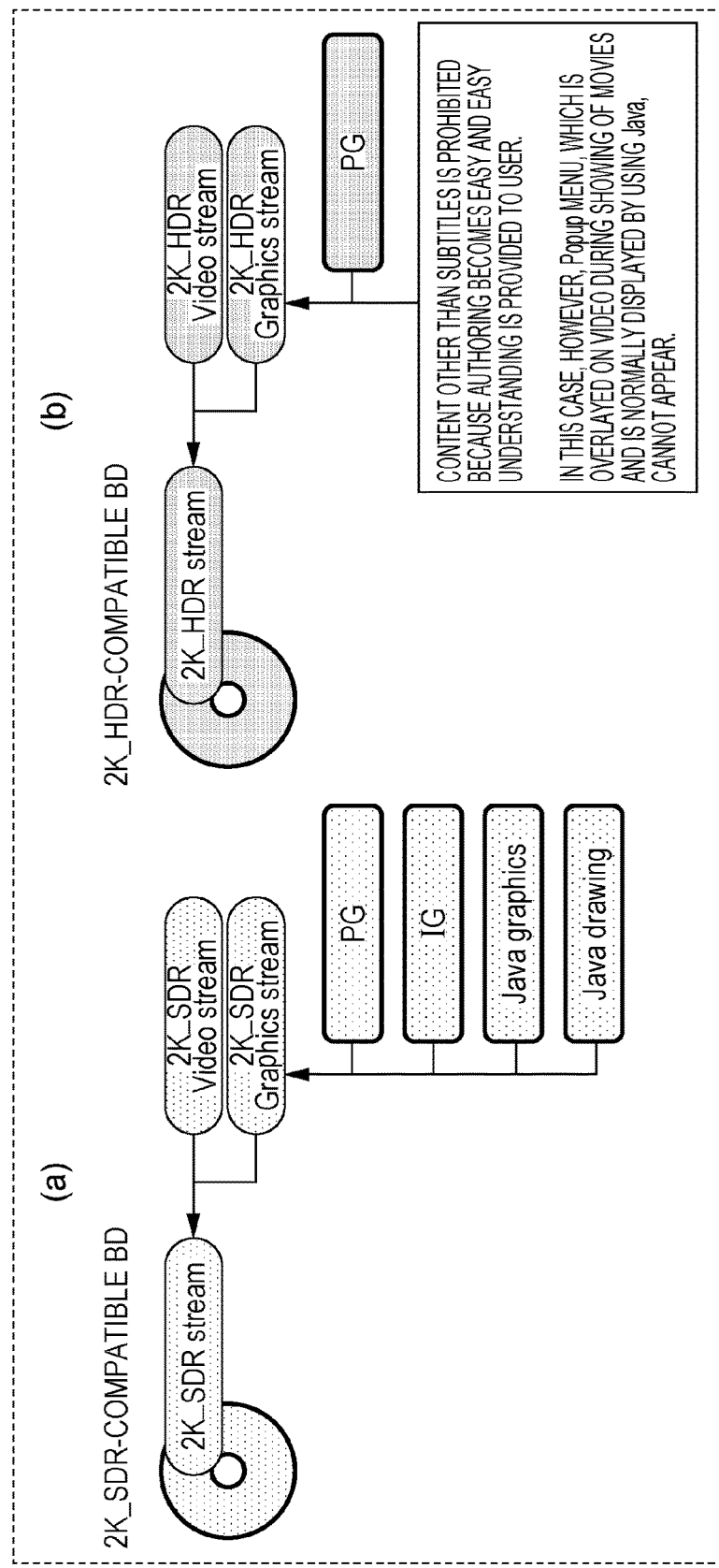
FIG. 36 is a diagram illustrating examples of the graphics streams.

That is to say, as illustrated in FIG. 36, prohibition against use of graphics other than subtitles (PG) makes authoring easy and provides easy understanding to a user. In this case, however, normal display using Java cannot be performed nor a Popup menu to be overlaid on a video and displayed cannot be made to appear during the playback of the video stream.

Figure 37:
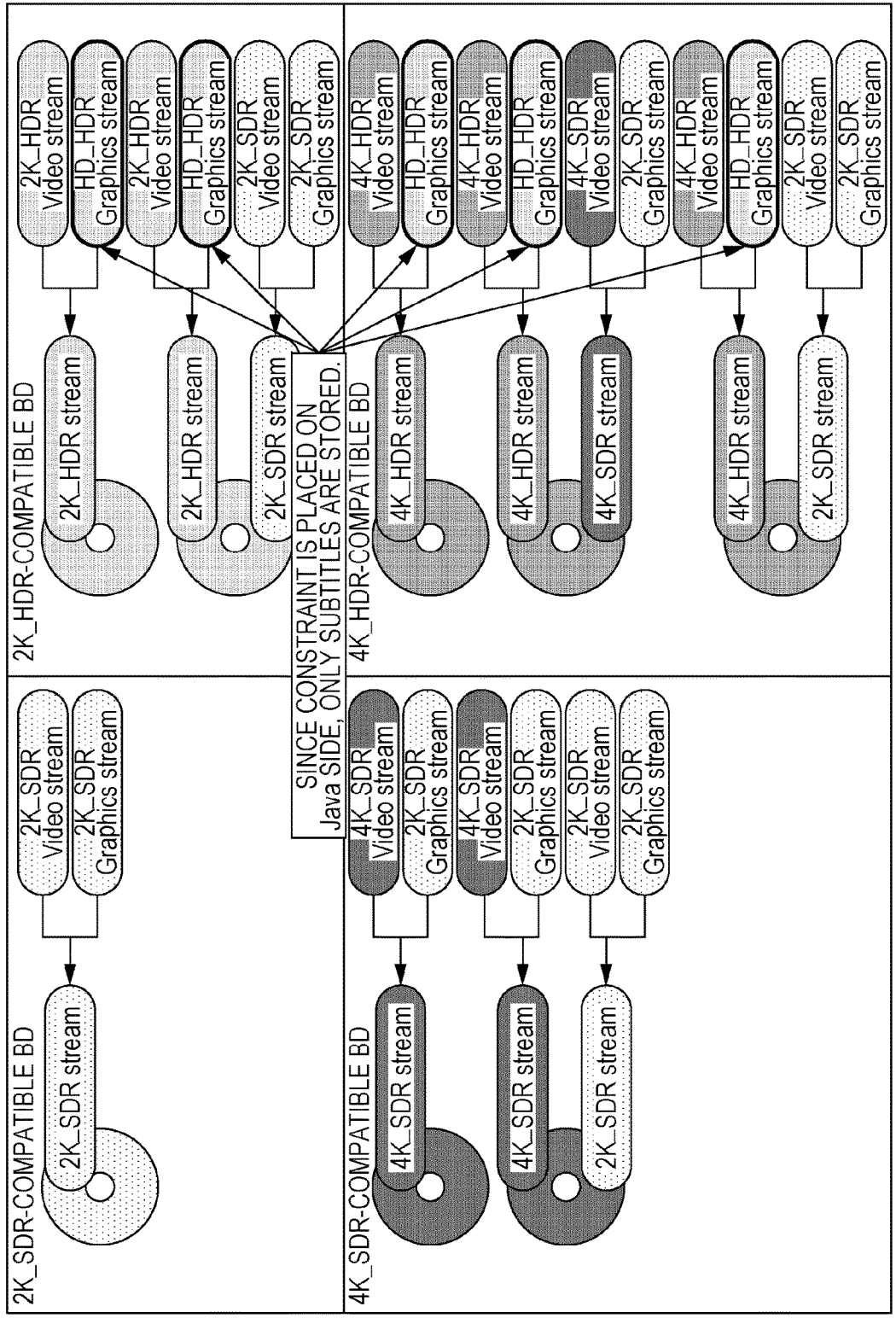
FIG. 37 is a diagram illustrating examples of combinations of video streams and graphics streams recorded on discs including BDs and dual-stream discs.

Further, as illustrated in FIG. 37, in a case of a 2K_HDR Graphics Stream, since constraint is placed on the Java side, only subtitles (PG) is stored.

Figure 38:
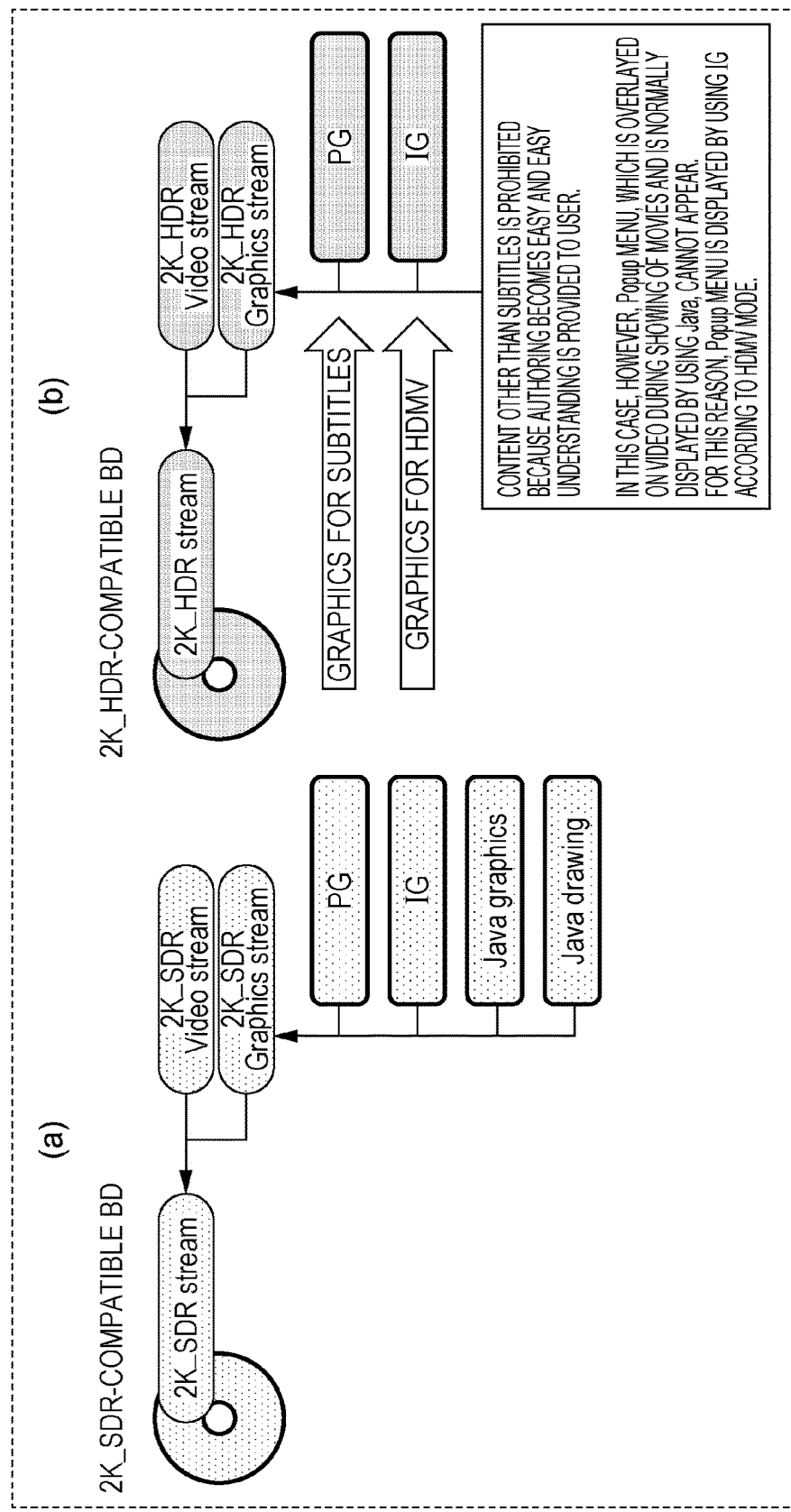
FIG. 38 is a diagram illustrating examples of graphics streams.

As another example, as illustrated in FIG. 38, in a case of playing an HDR video, not Java but an HDMV mode is used so that a Popup menu may be displayed by IG. As a result, a Popup menu cannot be made to appear by using Java, but a Popup menu can be made to appear by IG using the HDMV mode.

[5-3. Operation of Playback Device]

As a playback device (a data playback device), two types of devices will be described below. These two devices are a device having a function for converting graphics of an SDR signal to graphics of an HDR signal so as to output the graphics, and a device without this function. Such playback devices treat an HDR signal as a video image, and also an SDR signal or an HDR signal as graphics such as a menu and subtitles to be overlaid on a video.

In this case, in the playback device (the player) without a conversion and output function, for example, graphics are processed in a format of the SDR signal. As a result, playback video quality is deteriorated or luminance of a menu or subtitles is different from luminance intended by a creator of content, and thus the video is difficult for a user to visually recognize. In order to solve this problem, it is considered that both graphics content of an HDR signal and graphics content of an SDR signal are prepared on a content creation side and are provided as a Blu-Ray disc.

The playback device is not limited to a player such as a BD device and may be a display device such as a TV.

FIG. 39 is a flowchart illustrating a process in the playback device. The playback device reads and executes a playback control program. The playback control program is stored in a disc and is described by a playback control programming language that is called BD-J (BD-Java) or HDMV. The process illustrated in FIG. 39 is executed by the playback control program.

The playback control program first plays a menu and presents a playback selection menu of a video of a main feature to the user. When the user specifies playback of the main feature video of the HDR signal, the playback control program determines whether the playback device is compatible with HDR graphics (has a function for executing HDR graphics) (S401).

When the playback device is compatible with the HDR graphics (Yes at S401), the playback control program plays graphics content of the HDR signal (S403).

On the other hand, when the playback device is not compatible with the HDR graphics (No at S401), the playback control program determines whether the playback device has a function for converting the graphics of the SDR signal to the graphics of the HDR signal (S402). Specifically, the playback control program checks a register value of the playback device. For example, a player register No. 25 (a register with 32-bit length called PSR25) represents whether the playback device has a function for converting the graphics of the SDR signal to the graphics of the HDR signal and outputting the graphics. The playback control program checks a value of this register so as to determine whether the playback device has the conversion and output function.

In the playback device having the conversion and output function (Yes at S402), the playback control program plays a playlist #A that is prepared for converting the graphics of the SDR signal to the graphics of the HDR signal and outputting the graphics. As a result, the playback device converts the graphics of the SDR signal to the graphics of the HDR signal and simultaneously outputs the converted graphics of the HDR signal (S404).

On the other hand, in the playback device without the conversion and output function (No at S402), the playback control program plays a playlist #B including a graphics signal of a pseudo-HDR signal prepared to omit this conversion process. Specifically, the playback device plays subtitles and an HDMV menu using a CLUT prepared for the HDR signal (S405).

In the Blu-ray disc, three types of graphics including subtitles (Presentation Graphics), graphics (BD-J Graphics) such as a menu by BD-J, and graphics such as a menu by HDMV (Interactive Graphics) can be used. When a playlist is selected and played according to presence/non-presence of the conversion and output function as described above, in a playlist for the playback device without the conversion and output function, a CLUT (a color conversion table in which a correspondence relationship among index numbers, colors and luminances is defined) to be used for subtitles (Presentation Graphics) and a menu (Interactive Graphics) by HDMV is devised. Specifically, when the playback device outputs the graphics of the SDR signal, a CLUT prepared for the SDR signal is used, and when the playback device outputs the graphics of the HDR signal, another CLUT prepared for the HDR signal is used. That is to say, although compatibility with the HDR is not easy because a color space is constrained in Java, subtitles and a menu using the HDMV are compatible with the HDR luminance range by using an HDR CLUT. As a result, a problem such that graphics videos of a menu and subtitles are difficult to visually recognize can be avoided inexpensively in the playback device that cannot convert the graphics of the SDR signal to the graphics of the HDR signal.

The playback device according to the exemplary embodiment displays a video in the first luminance range (the HDR) with graphics being superimposed on the video.

The playback device determines whether the playback device has a function for converting first graphics in a second luminance range (the SDR) narrower than the first luminance range (the HDR) to second graphics in the first luminance range (the HDR) (S402). Specifically, the playback device executes the playback control program so that whether the playback device has the function is determined. Further, whether the playback device has the function is determined by checking a register that stores information representing whether the playback device has the function through the playback control program. Further, the playback device obtains a video in the first luminance range (the HDR), the first graphics in the second luminance range (the SDR), and the playback control program from a disc.

When the playback device has the function, the playback device converts the first graphics to the second graphics, and displays the video with the second graphics being superimposed on the video (S404).

Further, when the playback device does not have the function, the playback device displays the video with third graphics different from the second graphics being superimposed on the video. Specifically, the playback device generates the third graphics by using the color conversion table for first luminance range (S405). In the color conversion table (the CLUT) for the first luminance range (the HDR), associated colors associated with numbers are included in the first luminance range. In other words, the color conversion table can express luminance values that are not included in the second luminance range (the SDR) but are included in the first luminance range.

When the playback device does not have the function, the playback device does not execute the conversion process on graphics, and may display the video with the first graphics in the second luminance range (the SDR) being superimposed on the video. That is to say, the third graphics may be the first graphics.

As described above, four cases including 4K and SDR videos, 2K and HDR videos, 4K and HDR videos as well as basic 2K and SDR videos are present. As a result, a complicated authoring operation and an internal process in the playback device are required.

Further, in a case of a Blu-ray that stores an HDR video, when graphics for subtitles and a menu, graphics for Java, and a drawing process for Java are processed as HDR content, the Blu-ray is under various constraints such that display cannot be performed because an HDR color space is not defined in Java.

This exemplary embodiment describes a case where the playback device (the player) has the function for converting graphics from the SDR to the HDR and a case where the playback device does not have the function. When the playback device has the conversion function, all graphics-related processes are executed on an SDR signal, the processed results are converted from the SDR to the HDR, and the obtained HDR graphics are synthesized with an HDR video. As a result, all processes using Java can be executed, and high-quality graphics can be provided.

On the other hand, when the playback device does not have the conversion function, a Java process cannot be executed on an HDR signal, and thus a process for a Popup menu or the like cannot be executed. For this reason, an HDMV mode is called from Java, and HDR graphics (subtitles, a Popup menu and the like) are processed in the HDMV mode. As a result, even an HDR video can provide a user experience similar to an SDR video using a simple authoring process.

For example, in each of the above-described exemplary embodiments, each component may be configured by dedicated hardware, or may be implemented by executing a software program suitable for each component. Each component may be implemented by a program executor, such as a CPU or a processor, reading and executing a software program recorded in a recording medium, such as a hard disk or a semiconductor memory.

Although conversion methods and conversion devices according to one or a plurality of aspects of the present disclosure are described above based on the exemplary embodiments, the present disclosure is not limited to the exemplary embodiments. A mode where various modifications one skilled in the art comes up with are made to the present exemplary embodiments, or a mode formed by combining together components of different exemplary embodiments may also be included in a range of one or the plurality of aspects of the present disclosure, without departing from the spirit and scope of the present disclosure.

The present disclosure can be applied to playback devices such as Blu-ray devices.

What is claimed is:

1. A playback device comprising:
   a first remapper that reads a video signal having a first luminance range from a recording medium, performs electro-optical transfer function (EOTF) conversion associated with the first luminance range on a code value represented by a luminance signal in the video signal to obtain a first luminance value, and converts the first luminance value obtained by the EOTF conversion into a second luminance value associated with a second luminance range different in maximum value from the first luminance range;
   a second remapper that reads a graphics signal having the first luminance range from the recording medium and performs the EOTF conversion associated with the first luminance range on a code value represented by a luminance signal in the graphics signal to obtain a third luminance value, the second remapper not performing conversion on the third luminance value obtained by the EOTF conversion;
   a synthesizer that synthesizes the video signal having the second luminance value converted by the first remapper with the graphics signal having the third luminance value not converted by the second remapper; and
   an outputter that outputs a signal synthesized by the synthesizer to a display device.

2. The playback device according to claim 1, wherein the first remapper performs the EOTF conversion using a table representing an association relationship between the first luminance value in the first luminance range and the second luminance value in the second luminance range.

3. The playback device according to claim 1, wherein the first luminance range is a high dynamic range (HDR), and the second luminance range is a standard dynamic range (SDR).

4. The playback device according to claim 1, wherein the first luminance range is an HDR, and the second luminance range is a luminance range displayable by the display device.

5. A playback method comprising:
   a first remap step of reading a video signal having a first luminance range from a recording medium, performing electro-optical transfer function (EOTF) conversion associated with the first luminance range on a code value represented by a luminance signal in the video signal to obtain a first luminance value, and converting the first luminance value obtained by the EOTF conversion into a second luminance value associated with a second luminance range different in maximum value from the first luminance range;
   a second remap step of reading a graphics signal having the first luminance range from the recording medium and performing the EOTF conversion associated with the first luminance range on a code value represented by a luminance signal in the graphics signal to obtain a third luminance value, the second remap step not including performing conversion on the third luminance value obtained by the EOTF conversion;
   a synthesis step of synthesizing the video signal having the second luminance value converted in the first remap step with the graphics signal having the third luminance value not converted in the second remap step; and
   an output step of outputting a signal synthesized in the synthesis step to a display device.

* * * * *